US010575186B2

(12) United States Patent
Ode et al.

(10) Patent No.: US 10,575,186 B2
(45) Date of Patent: Feb. 25, 2020

(54) RADIO COMMUNICATION SYSTEM, BASE STATION, AND COMMUNICATION TERMINAL

(71) Applicant: FUJITSU LIMITED, Kawasaki-shi, Kanagawa (JP)

(72) Inventors: Takayoshi Ode, Yokohama (JP); Shinichiro Aikawa, Yokohama (JP); Yoshiaki Ohta, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/805,833

(22) Filed: Nov. 7, 2017

(65) Prior Publication Data

US 2018/0063721 A1 Mar. 1, 2018

Related U.S. Application Data

(63) Continuation of application No. PCT/JP2015/063827, filed on May 13, 2015.

(51) Int. Cl.
*H04W 16/14* (2009.01)
*H04W 72/04* (2009.01)
*H04W 16/32* (2009.01)

(52) U.S. Cl.
CPC ........ *H04W 16/14* (2013.01); *H04W 72/0453* (2013.01); *H04W 16/32* (2013.01); *H04W 72/04* (2013.01); *H04W 72/048* (2013.01)

(58) Field of Classification Search
CPC ............. H04W 16/14; H04W 72/0453; H04W 72/048; H04W 16/32; H04W 72/04
See application file for complete search history.

(56) References Cited

U.S. PATENT DOCUMENTS 8,483,155 B1 7/2013 Banerjea et al.
2002/0198977 A1 12/2002 Cho
(Continued)

FOREIGN PATENT DOCUMENTS

JP 2003-18642 A 1/2003
JP 2008-103959 A 5/2008
(Continued)

OTHER PUBLICATIONS

Extended European search report with supplementary European search report and the European search opinion issued by the European Patent Office for corresponding European Patent Application No. 15891862.3-1215, dated Apr. 5, 2018.
(Continued)

*Primary Examiner* — Dady Chery
(74) *Attorney, Agent, or Firm* — Myers Wolin, LLC.

(57) ABSTRACT

A base station includes a terminal capability information controlling unit that controls whether or not a first frequency is to be used for communication; a radio link controlling unit that, when the first frequency is to be used for the communication, performs communication by using the first frequency and a second frequency; and a radio link control information generating unit (160) that, when the first frequency is to be used by the terminal capability information controlling unit for the communication, notifies a communication terminal that the first frequency is to be used. The communication terminal includes a controlling unit that, when being notified that the first frequency is to be used, performs communication by using the first frequency and the second frequency.

6 Claims, 32 Drawing Sheets

(56) References Cited

U.S. PATENT DOCUMENTS

| | | |
|---|---|---|
| 2004/0240525 A1 | 12/2004 | Karabinis et al. |
| 2007/0223611 A1 | 9/2007 | Ode et al. |
| 2009/0213806 A1 | 8/2009 | Ode |
| 2010/0008402 A1 | 1/2010 | Sugawara et al. |
| 2010/0029216 A1* | 2/2010 | Jovicic ............... H04B 7/2615 455/68 |
| 2010/0246506 A1 | 9/2010 | Krishnaswamy |
| 2011/0206032 A1 | 8/2011 | Uemura et al. |
| 2011/0256868 A1 | 10/2011 | Nogami et al. |
| 2012/0094681 A1 | 4/2012 | Freda et al. |
| 2013/0016639 A1 | 1/2013 | Xu et al. |
| 2013/0077554 A1 | 3/2013 | Gauvreau et al. |
| 2013/0083762 A1* | 4/2013 | Adachi ............... H04W 48/18 370/329 |
| 2013/0163543 A1 | 6/2013 | Freda et al. |
| 2014/0087748 A1 | 3/2014 | Hong et al. |
| 2015/0131536 A1 | 5/2015 | Kaur et al. |
| 2016/0249333 A1 | 8/2016 | Freda et al. |

FOREIGN PATENT DOCUMENTS

| | | |
|---|---|---|
| JP | 2013-516859 A | 5/2013 |
| JP | 2013-545365 A | 12/2013 |
| JP | 2014-500685 A | 1/2014 |
| JP | 2014-529276 A | 10/2014 |
| JP | 2015-505436 A | 2/2015 |
| WO | 2006/046307 A1 | 5/2006 |
| WO | 2008/056425 A1 | 5/2008 |
| WO | 2008/090603 A1 | 7/2008 |
| WO | 2009/020017 A1 | 2/2009 |
| WO | 2010/073468 A1 | 7/2010 |

OTHER PUBLICATIONS

3GPP TS 23.003 V8.16.0, "3rd Generation Partnership Project; Technical Specification Group Core Network and Terminals; Numbering, addressing and identification (Release 8)", Mar. 2012.

Ericsson et al, "Study on Licensed-Assisted Access using LTE", Agenda Item: 14.1.1, 3GPP TSG-RAN Meeting #65, R1-141664, Edinburgh, Scotland, Sep. 9-12, 2014.

Etri, "Scenarios and Requirements for LAA", Agenda Item: 7.1, 3GPP TSG-RAN WG2 Meeting #89, R2-150234, Athens, Greece, Feb. 9-13, 2015.

LG Electronics, "Protocol Aspects for LAA", Agenda Item: 7.1, 3GPP TSG-RAN WG2 Meeting #89, R2-150398, Athens, Greece, Feb. 9-13, 2015.

Huawei (Rapporteur), "TP for TR 36.889 v0.1.0 Study on licensed-assisted access using LTE", Agenda Item: 7.1, 3GPP TSG-RAN WG2 Meeting #89bis, R2-150727, Bratislava, Slovakia, Apr. 20-24, 2015.

International Search Report with Written Opinion of the International Searching Authority issued for corresponding International Patent Application No. PCT/JP2015/063827, dated Aug. 11, 2015, with English translation.

Notice of Reasons of Refusal issued by the Japan Patent Office for corresponding Japanese Patent Application No. 2017-517552, dated Sep. 3, 2019, with a full English translation.

* cited by examiner

FIG.5

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 | | | |
| 1 | 1 | 2 | 35 | 5 | 7 | 69 | 10 | 13 | 103 | 16 | 20 | 137 | 23 | 28 | | | |
| 2 | 2 | 3 | 36 | 6 | 8 | 70 | 11 | 14 | 104 | 17 | 21 | 138 | 24 | 29 | | | |
| 3 | 3 | 4 | 37 | 7 | 9 | 71 | 12 | 15 | 105 | 18 | 22 | 139 | 25 | 30 | | | |
| 4 | 4 | 5 | 38 | 8 | 10 | 72 | 13 | 16 | 106 | 19 | 23 | 140 | 0 | 6 | | | |
| 5 | 5 | 6 | 39 | 9 | 11 | 73 | 14 | 17 | 107 | 20 | 24 | 141 | 1 | 7 | | | |
| 6 | 6 | 7 | 40 | 10 | 12 | 74 | 15 | 18 | 108 | 21 | 25 | 142 | 2 | 8 | | | |
| 7 | 7 | 8 | 41 | 11 | 13 | 75 | 16 | 19 | 109 | 22 | 26 | 143 | 3 | 9 | | | |
| 8 | 8 | 9 | 42 | 12 | 14 | 76 | 17 | 20 | 110 | 23 | 27 | 144 | 4 | 10 | | | |
| 9 | 9 | 10 | 43 | 13 | 15 | 77 | 18 | 21 | 111 | 24 | 28 | 145 | 5 | 11 | | | |
| 10 | 10 | 11 | 44 | 14 | 16 | 78 | 19 | 22 | 112 | 25 | 29 | 146 | 6 | 12 | | | |
| 11 | 11 | 12 | 45 | 15 | 17 | 79 | 20 | 23 | 113 | 26 | 30 | 147 | 7 | 13 | | | |
| 12 | 12 | 13 | 46 | 16 | 18 | 80 | 21 | 24 | 114 | 0 | 5 | 148 | 8 | 14 | | | |
| 13 | 13 | 14 | 47 | 17 | 19 | 81 | 22 | 25 | 115 | 1 | 6 | 149 | 9 | 15 | | | |
| 14 | 14 | 15 | 48 | 18 | 20 | 82 | 23 | 26 | 116 | 2 | 7 | 150 | 10 | 16 | | | |
| 15 | 15 | 16 | 49 | 19 | 21 | 83 | 24 | 27 | 117 | 3 | 8 | 151 | 11 | 17 | | | |
| 16 | 16 | 17 | 50 | 20 | 22 | 84 | 25 | 28 | 118 | 4 | 9 | 152 | 12 | 18 | | | |
| 17 | 17 | 18 | 51 | 21 | 23 | 85 | 26 | 29 | 119 | 5 | 10 | 153 | 13 | 19 | | | |
| 18 | 18 | 19 | 52 | 22 | 24 | 86 | 27 | 30 | 120 | 6 | 11 | 154 | 14 | 20 | | | |
| 19 | 19 | 20 | 53 | 23 | 25 | 87 | 0 | 4 | 121 | 7 | 12 | 155 | 15 | 21 | | | |
| 20 | 20 | 21 | 54 | 24 | 26 | 88 | 1 | 5 | 122 | 8 | 13 | 156 | 16 | 22 | | | |
| 21 | 21 | 22 | 55 | 25 | 27 | 89 | 2 | 6 | 123 | 9 | 14 | 157 | 17 | 23 | | | |
| 22 | 22 | 23 | 56 | 26 | 28 | 90 | 3 | 7 | 124 | 10 | 15 | 158 | 18 | 24 | | | |
| 23 | 23 | 24 | 57 | 27 | 29 | 91 | 4 | 8 | 125 | 11 | 16 | 159 | 19 | 25 | | | |
| 24 | 24 | 25 | 58 | 28 | 30 | 92 | 5 | 9 | 126 | 12 | 17 | 160 | 20 | 26 | | | |
| 25 | 25 | 26 | 59 | 0 | 3 | 93 | 6 | 10 | 127 | 13 | 18 | 161 | 21 | 27 | | | |
| 26 | 26 | 27 | 60 | 1 | 4 | 94 | 7 | 11 | 128 | 14 | 19 | 162 | 22 | 28 | | | |
| 27 | 27 | 28 | 61 | 2 | 5 | 95 | 8 | 12 | 129 | 15 | 20 | 163 | 23 | 29 | | | |
| 28 | 28 | 29 | 62 | 3 | 6 | 96 | 9 | 13 | 130 | 16 | 21 | 164 | 24 | 30 | | | |
| 29 | 29 | 30 | 63 | 4 | 7 | 97 | 10 | 14 | 131 | 17 | 22 | 165 | 0 | 7 | | | |
| 30 | 0 | 2 | 64 | 5 | 8 | 98 | 11 | 15 | 132 | 18 | 23 | 166 | 1 | 8 | | | |
| 31 | 1 | 3 | 65 | 6 | 9 | 99 | 12 | 16 | 133 | 19 | 24 | 167 | 2 | 9 | | | |
| 32 | 2 | 4 | 66 | 7 | 10 | 100 | 13 | 17 | 134 | 20 | 25 | - | - | - | | | |
| 33 | 3 | 5 | 67 | 8 | 11 | 101 | 14 | 18 | 135 | 21 | 26 | - | - | - | | | |

FIG.18A

| TERMINAL CATEGORIES | Maximum number of DL-SCH transport block bits received within a TTI | Maximum number of bits of a DL-SCH transport block received within a TTI | Total number of soft channel bits | Maximum number of supported layers for spatial multiplexing in DL | Supported modulations | Aggregated cell operation | Aggregated Transmission Bandwidth ( $N_{RB}$ ) | Unlicensed band |
|---|---|---|---|---|---|---|---|---|
| 1 | 51024 | 51024 | 1237248 | 2 | QPSK | Not applicable | ≤100 | Not applicable |
| 2 | 102048 | 75376 | 1237248 | 2 | QPSK,16QAM | Not applicable | ≤200 | Not applicable |
| 3 | 299552 | 149776 | 3667200 | 4 | QPSK | applicable | ≤200 | Not applicable |
| 4 | 2998560 | 299856 | 35982720 | 8 | QPSK,16QAM | applicable | ≤400 | Not applicable |
| 5 | 51024 | 51024 | 1237248 | 2 | QPSK | Not applicable | ≤100 | applicable |
| 6 | 102048 | 75376 | 1237248 | 2 | QPSK,16QAM | Not applicable | ≤200 | applicable |
| 7 | 299552 | 149776 | 3667200 | 4 | QPSK | applicable | ≤200 | applicable |
| 8 | 2998560 | 299856 | 35982720 | 8 | QPSK,16QAM | applicable | ≤400 | applicable |

FIG.18B

| TERMINAL CATEGORIES | Maximum number of DL-SCH transport block bits received within a TTI | Maximum number of bits of a DL-SCH transport block received within a TTI | Total number of soft channel bits | Maximum number of supported layers for spatial multiplexing in DL | Supported modulations | Aggregated cell operation | Aggregated Transmission Bandwidth [$N_{RB}$] | Unlicensed band | |
|---|---|---|---|---|---|---|---|---|---|
| | | | | | | | | 2.4GHz (ISM band) | 5GHz |
| 1 | 51024 | 51024 | 1237248 | 2 | QPSK | Not applicable | ≤100 | Not applicable | Not applicable |
| 2 | 102048 | 75376 | 1237248 | 2 | QPSK, 16QAM | Not applicable | ≤200 | Not applicable | Not applicable |
| 3 | 299552 | 149776 | 3667200 | 4 | QPSK | applicable | ≤200 | Not applicable | Not applicable |
| 4 | 2998560 | 298856 | 35982720 | 8 | QPSK, 16QAM | applicable | ≤400 | Not applicable | Not applicable |
| 5 | 51024 | 51024 | 1237248 | 2 | QPSK | Not applicable | ≤100 | applicable | Not applicable |
| 6 | 102048 | 75376 | 1237248 | 2 | QPSK, 16QAM | Not applicable | ≤200 | applicable | Not applicable |
| 7 | 299552 | 149776 | 3667200 | 4 | QPSK | applicable | ≤200 | applicable | Not applicable |
| 8 | 2998560 | 298856 | 35982720 | 8 | QPSK, 16QAM | applicable | ≤400 | Not applicable | applicable |
| 9 | 51024 | 51024 | 1237248 | 2 | QPSK | Not applicable | ≤100 | Not applicable | applicable |
| 10 | 102048 | 75376 | 1237248 | 2 | QPSK, 16QAM | applicable | ≤200 | Not applicable | applicable |
| 11 | 299552 | 149776 | 3667200 | 4 | QPSK | applicable | ≤200 | Not applicable | applicable |
| 12 | 2998560 | 298856 | 35982720 | 8 | QPSK, 16QAM | applicable | ≤400 | Not applicable | applicable |
| 13 | 51024 | 51024 | 1237248 | 2 | QPSK | Not applicable | ≤100 | applicable | applicable |
| 14 | 102048 | 75376 | 1237248 | 2 | QPSK, 16QAM | Not applicable | ≤200 | applicable | applicable |
| 15 | 299552 | 149776 | 3667200 | 4 | QPSK | applicable | ≤200 | applicable | applicable |
| 16 | 2998560 | 298856 | 35982720 | 8 | QPSK, 16QAM | applicable | ≤400 | applicable | applicable |

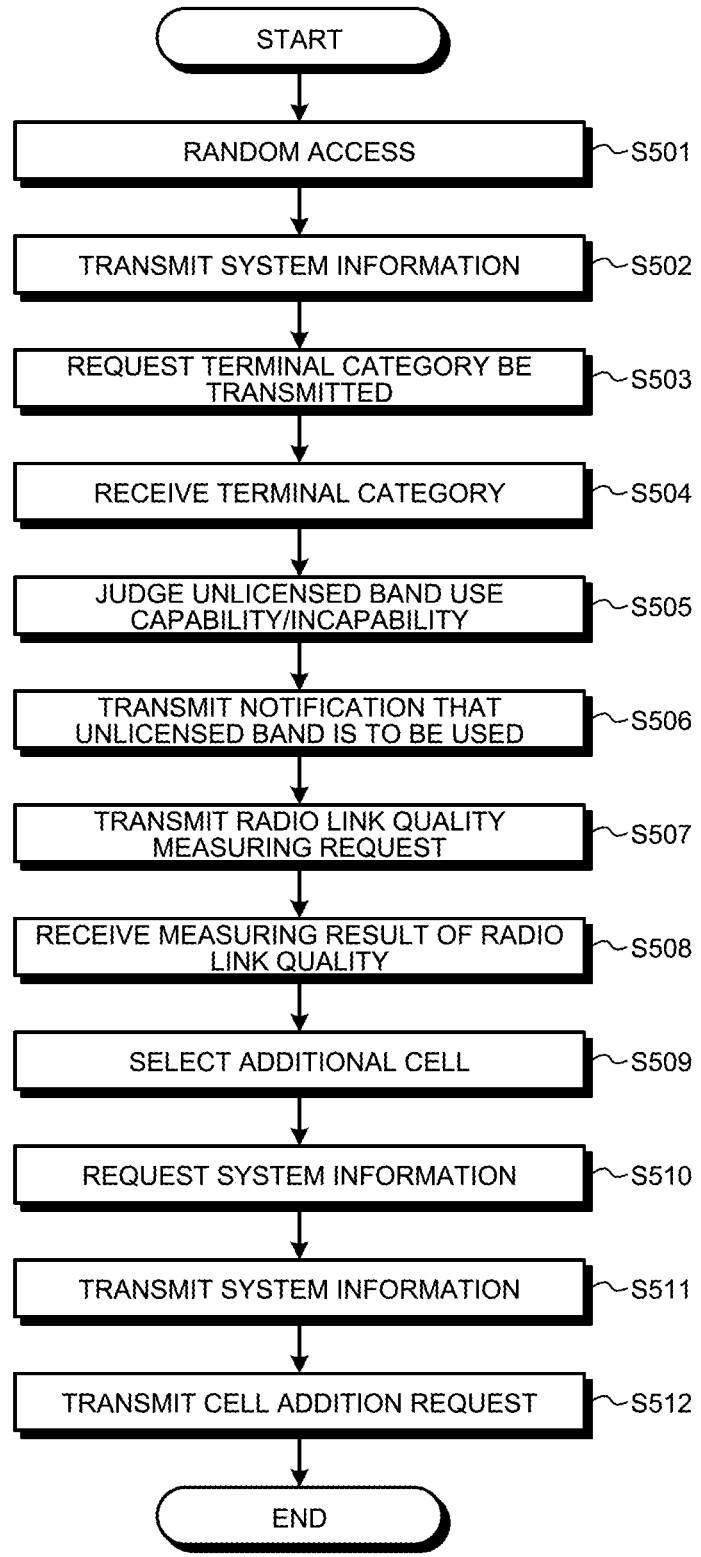

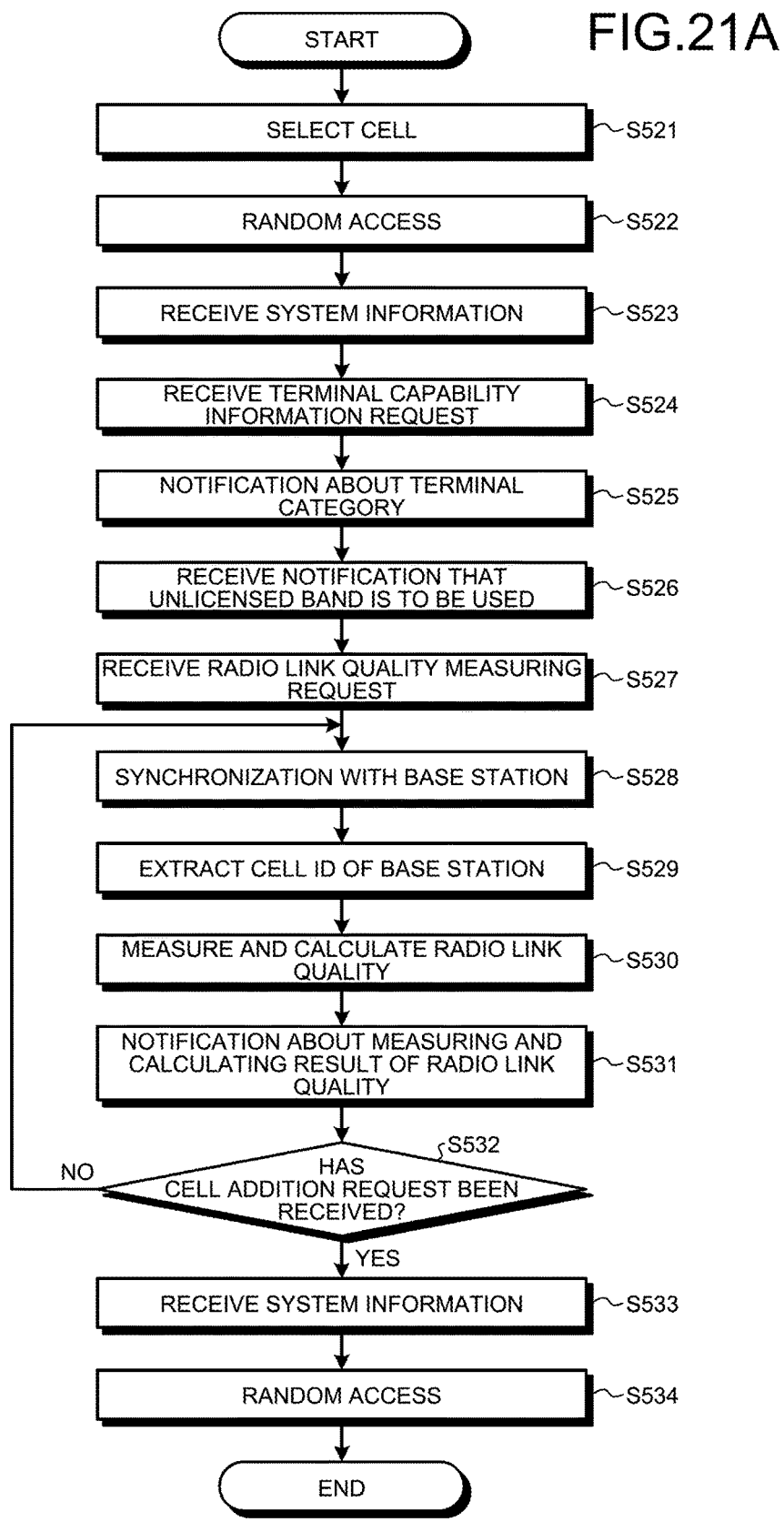

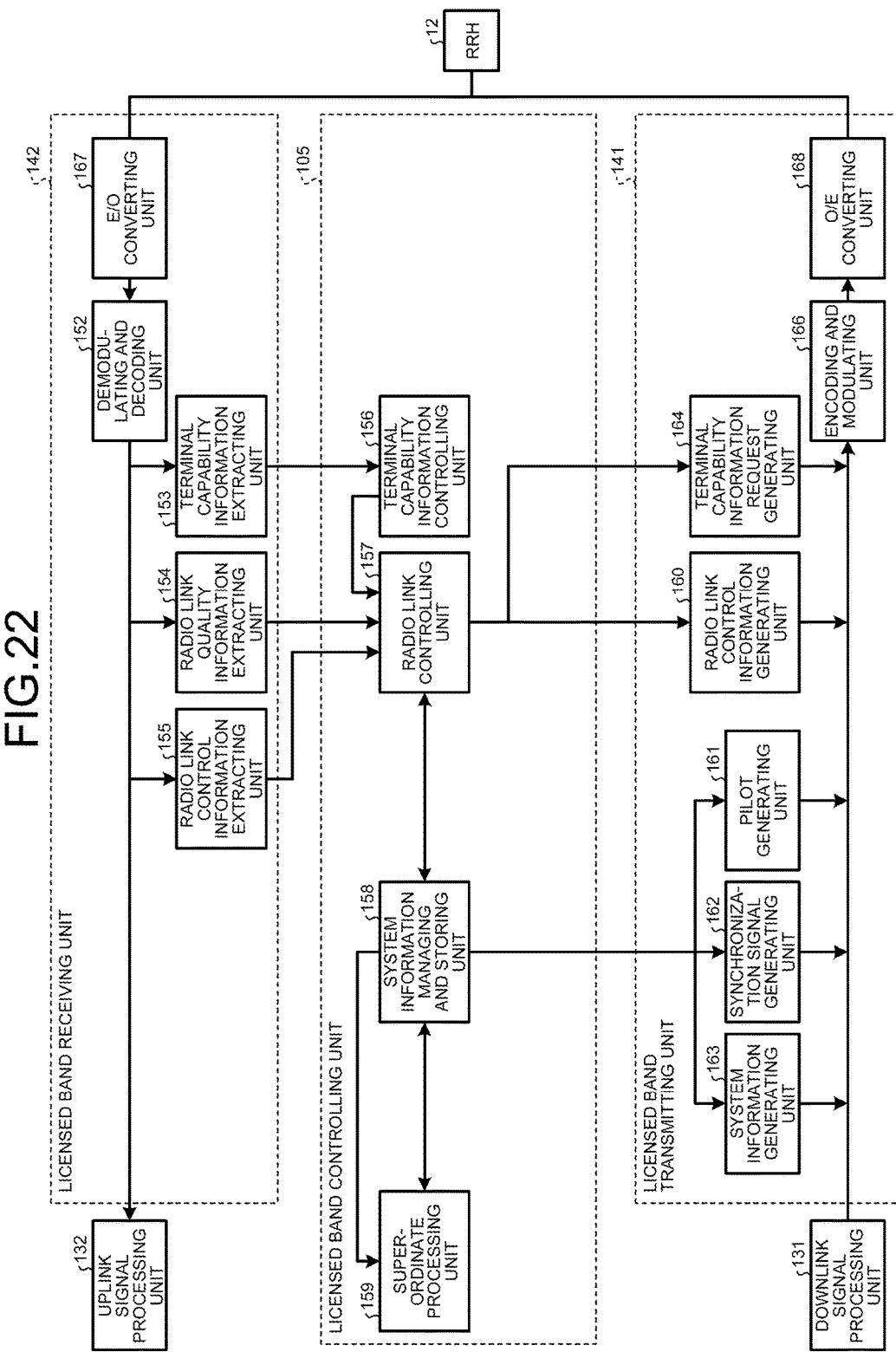

RADIO COMMUNICATION SYSTEM, BASE STATION, AND COMMUNICATION TERMINAL

This application is continuation application of International Application PCT/JP2015/063827 filed on May 13, 2015 and designating the U.S., the entire contents of which are incorporated herein by reference.

FIELD

The present invention relates to a radio communication system, a base station, a communication terminal, and a radio communication system controlling method.

BACKGROUND

At present, 3rd Generation Partnership Project (3GPP) is reviewing the specifications of Long Term Evolution (LTE) systems and LTE-Advanced systems. For LTE, the specifications of LTE Releases 8 to 12 have been defined. In Japan, various telecommunications carriers are providing services on the basis of Release 8.

Further, LTE-Advanced systems (release 10 and later), which are developed forms of LTE systems, have currently been reviewed. The specifications have been defined up to Release 12, and Release 13 is being reviewed. In Korea, services were started in June 2013. In Japan, one telecommunications carrier started a service in June 2014, and another telecommunications carrier also started a service in March 2015.

In LTE Release 10, i.e., LTE-Advanced systems, a configuration described below, for example, may be used. An LTE-Advance system includes a base station (or a base station apparatus; both of which will hereinafter be referred to as a "base station") called an "evolved Node B (eNB)" and a communication terminal (or a terminal; both of which will hereinafter be referred to as a "communication terminal") called a "User Equipment (UE)". Further, the base station serves as a transmitting apparatus (a transmitter or a transmitting station) that performs downlink transmission to the communication terminal and also serves as a receiving apparatus (a receiver or a receiving station) that receives uplink signals from the terminal. Similarly, the communication terminal serves as a receiving apparatus (a receiver or a receiving station) that receives downlink transmission from the base station and also serves as a transmitting apparatus (a transmitter or a transmitting station) that performs uplink transmission to the base station. Further, the LTE-Advanced system includes a Mobility Management Entity (MME) configured with a controlling apparatus that connects to the Internet called a core network. Further, the LTE-Advanced system includes a Serving Gate Way (S-GW) configured with a server used for transferred data such as user data. Further, the LTE-Advanced system includes S1 serving as an interface between the MME/S-GW and the eNB, as well as X2 serving as an interface between eNBs. In this situation, S1 and X2 are each an interface using Transmission Control Protocol/Internet Protocol (TCP/IP).

Further, the base station has one cell, which is a communication area, and performs communication with any of the communication terminals contained in the cell. Also, as a result of communication performed between base stations, communication terminals contained in mutually the same cell or mutually different cells are able to communicate with one another. In this regard, because each base station has only one band, the terms "base station", "cell", and "band" may be treated as having the same meaning in the explanations below.

Further, other examples of configurations of LTE-Advanced systems include the following: An LTE-Advanced system includes an HeNB (Home eNB) of which the cell is smaller than regular cells and which may be installed indoor (e.g., in a home or an office) and an HeNB GW serving as a server for the HeNB. Further, the LTE-Advanced system may include Si serving as an interface between the MME/S-GW and the eNB and HeNB. Further, the LTE-Advanced system may include X2 serving as an interface between eNBs, between HeNBs, and among the eNB, an X2-GW, and the HeNB. Further, for the communication between a base station and a communication terminal, a relay apparatus (a relay node) may be used to realize a relay transfer.

For these LTE-Advanced systems, a technique called Carrier Aggregation (CA) has been proposed. In LTE systems, it is possible to set an uplink/downlink bandwidth (or a system bandwidth) to 1.4 MHz, 3 MHz, 5 MHz, 10 MHz, 15 MHz, or 20 MHz. The band set in this situation is defined as a component carrier. The reason why the plurality of bandwidths are set is that the configuration is based on the premise that bandwidths allocated to conventional systems such as Global System for Mobile communication (GSM [registered trademark]) systems and Wideband Code Division Multiple Access (W-CDMA) systems will be used without any modification applied thereto.

However, it is desirable to configure LTE systems so as to be able to transfer data at higher speeds than in the conventional GSM and W-CDMA systems. For this reason, it is desirable to configure LTE systems to have a wider bandwidth than the conventional systems. Generally speaking, bands used in radio communication systems vary in accordance with circumstances in each country. Further, because the countries in Europe border one another by land, the frequency bands being used are adjusted among countries in consideration of interference. As a result, the bandwidths that are usable in radio communication systems in each country are small in number and chopped in small pieces. To cope with this situation, for the purpose of realizing wider bands in LTE systems, a method has been introduced to obtain wider bands by integrating the small and chopped-up bands together. The method for obtaining wider bands by integrating the small and chopped-up bands together is the CA process. In other words, the CA is a technique by which communication is performed between at least one transmitting apparatus and at least one receiving apparatus by using a plurality of frequency bands at the same time and is a technique by which communication is performed between one transmitting apparatus and at least one receiving apparatus by using a plurality of communication frequency bands at the same time. As long as these conditions are satisfied, possible configurations of the radio communication system of the present disclosure are not limited to those using the CA.

When a CA process is performed, a cell using a main cell is set. This cell is called a primary cell. The primary cell may be referred to as the first cell, the first band, a main band, or a main cell. In the following sections, a primary cell will be referred to as a "PCell".

In a CA process, a cell is added to or integrated with the PCell. The additional cell is called a secondary cell. The secondary cell may be referred to as the second cell, a secondary band, an extended band, or a subband. In the following sections, a secondary cell will be referred to as an "SCell".

These cells are obtained by dividing a band allocated to a system (e.g., W-CDMA or LTE) into sections on the basis of the frequency bandwidth structuring the system (a system bandwidth). It is possible to multiplex users in each band, i.e., to realize multiple access. Further, by scheduling radio resources of data channels that use each of the bands and allocating the radio resources to one or more terminals, it is possible to realize user multiplex. These cells can structure one system. In other words, these cells are different from using blocks (sets or clusters) that are obtained by putting multiple subcarriers together to form allocation units of radio resources for the purpose of realizing user multiplex in an Orthogonal Frequency-Division Multiple Access (OFDMA) scheme.

In CA processes defined in LTE Releases 10 to 12, it is possible to set seven SCells at maximum. In other words, it is possible to realize a CA process by using eight Component Carriers (CCs) at maximum, including a PCell. That is to say, the CA process is a technique used for integrating the PCell with at least one SCell. At present, it is considered to set the maximum number of SCells to 32. Further, CA processes may be classified depending on whether the frequencies of the PCell and the SCell are continuous or not continuous, and whether the frequencies are included in mutually the same frequency band or not. Further, CA processes may be classified depending on whether control information used for data communication that uses an SCell is transferred by the SCell or transferred by a PCell or another SCell. In this situation, the data communication using an SCell uses a Physical Downlink Shared Channel (PDSCH), which is a downlink radio shared channel. Further, the control information for the data communication using an SCell is transmitted by using a Physical Downlink Control Channel (PDCCH), which is a downlink radio control channel.

In addition, as a method for further increasing the communication capacity, it has been put into practice to reduce the number of communication terminals contained in each cell and to increase the communication speed of each communication terminal, by reducing the size of each cell to a smaller area. Such cells having a smaller area are called micro cells, pico cells, femtocells, or small cells. Further, a configuration has been introduced in which, when a CA process is introduced, the PCell is arranged to be a macro cell (a large-area cell), whereas a cell having a smaller area as described above is used as the SCell.

The configuration of the CA process in which the PCell is configured with a macro cell, while the SCell is configured with a cell which has a smaller area and at least a part of which overlaps the PCell may be referred to as an umbrella cell configuration or a hierarchical cell configuration. Examples of methods for realizing the umbrella cell configuration include the following: One method is to connect the PCell and the SCell to each other by using an X2 interface, which is an inter-base-station interface and to transfer user data between the PCell and the SCell. Another method is to perform a signal processing process in the PCell, to convert either a baseband signal or a radio signal into an optical signal, and to connect the PCell and the SCell to each other. Yet another method is to connect the PCell and the SCell to each other with regular radio communication. It is possible to select and use any of these methods depending on the purpose of use and application.

Further, for cellular systems, the frequency bands to be used are determined by law, in consideration of circumstances in each country, on the basis of international allocations of frequencies. Examples of cellular systems include Wideband Code Division Multiple Access (W-CDMA), LTE, LTE-Advanced, and Worldwide Interoperability for Microwave Access (WiMAX) (registered trademark). Further, the frequency bands thereof are assigned to telecommunications carriers by using methods such as an auction among the telecommunications carriers. In other words, as a result of designating a frequency band to be used and giving a license to each telecommunications carrier, each of the telecommunications carriers is permitted to use the designated frequency band for use. The frequency bands of which the use is permitted in this manner are called "licensed bands".

In contrast, there is another system in which it is possible to perform communication without having a license, by performing the communication with transmission power equal to or lower than a maximum transmission power level determined by law. This system is called a specified low power system. Further, there are also frequency bands in which frequencies can freely be used without a license, as long as the transmission power is equal to or lower than a level determined by law, such as an Industry Science Medical (ISM) band or the 5 GHz band. These frequency bands that are usable without a license are called "unlicensed bands". Examples of systems that use unlicensed bands include a Wireless Fidelity (Wi-Fi) (The institute of Electrical and Electronics Engineers, Inc. [IEEE] 802.11a).

Unlicensed bands are freely used by a large number of systems such as a plurality of Wi-Fi systems. Accordingly, on the basis of the philosophy of the Radio Act which states that communication of other systems shall not be hindered, Wi-Fi uses, for example, Carrier Sense Multiple Access/Collison Avoidance (CSMA/CA). CSMA/CA is a scheme by which, before data or the like is transmitted on a certain frequency, it is checked to see whether or not the frequency is being used by any other system. With this arrangement, it is possible to prevent the hindrance on other communication activities. Further, in an unlicensed band, no specific system is able to use a frequency in an exclusive manner.

In this regard, as mentioned above, the CA process is introduced to LTE-Advanced for the purpose of increasing the communication volume. Further, by increasing the frequency bands in use and by making the frequency higher, the goal of increasing the communication volume has been addressed. An example of increasing the frequency bands in use is realized by adding the 3.5 GHz band to the 1.7 GHz used by mobile phones and the like. However, we are facing a situation where only increasing the frequency bands in use is not able to address the goal of increasing the communication volume. In other words, because the frequency resources are finite, a problem is arising where usable frequencies may be exhausted.

To cope with this situation, conventional techniques are known by which an unlicensed band and a licensed band are used. For example, according to a conventional technique, on the basis of registered system IDs, a licensed band is used outdoor, whereas an unlicensed band is used indoor. Further, according to another conventional technique, a carrier aggregation process is performed by using a licensed band and an unlicensed band. According to yet another conventional technique, a carrier aggregation process is performed in a licensed band and an unlicensed band while using group IDs, and a synchronization process is performed by using the licensed band.

Examples of techniques related to LTE include a conventional technique by which control is exercised while using numbers or IDs in an LTE network.

Patent Document 1: Japanese Laid-open Patent Publication No. 2003-018642

Patent Document 2: Japanese National Publication of International Patent Application No. 2015-505436

Patent Document 3:Japanese National Publication of International Patent Application No. 2014-500685

Patent Document 4: Japanese Patent No. 4515460

Non Patent Document 1: TS23.003V8.16.0 "3rd Generation Partnership Project; Technical Specification Group Core Network and Terminals; Numbering, addressing and identification (Release 8)"

Non Patent Document 2: TS23.003V8.16.0 "3rd Generation Partnership Project; Technical Specification Radio Access Network Meeting *65 RP-141664 Edinburgh, Scotland, 9-12 September 2014"

According to the conventional techniques, however, a problem remains as to how the communication terminal is made to recognize the frequency of the unlicensed band as the frequency to be used in the communication. For example, according to the conventional technique by which a licensed band is used outdoor, while an unlicensed band is used indoor, the procedure of having the communication terminal recognize the frequency of the unlicensed band is not taken into consideration. For this reason, it is difficult to perform communication while ensuring that the unlicensed band is used.

Further, also according to the conventional technique by which the CA is implemented by using a licensed band and an unlicensed band, the procedure of having the communication terminal recognize the frequency of the unlicensed band is not taken into consideration. For this reason, also with this conventional technique, it is difficult to perform communication while ensuring that the unlicensed band is used.

Further, also according to the conventional technique by which the CA is implemented between a licensed band and an unlicensed band while using group IDs so as to perform a synchronization process by using the licensed band, the procedure of having the communication terminal recognize the frequency of the unlicensed band is not taken into consideration. For this reason, also with this conventional technique, it is difficult to perform communication while ensuring that the unlicensed band is used.

In view of the circumstances described above, it is an object of the present disclosure to provide a radio communication system, a base station, a communication terminal, and a radio communication system controlling method capable of performing communication while ensuring that an unlicensed band is used.

SUMMARY

According to an aspect of the embodiments, A radio communication system including a base station and a communication terminal, wherein the base station includes: a controlling unit that controls whether or not a first frequency is to be used for communication; a first communicating unit that, when the first frequency is not to be used for the communication, performs communication by using a second frequency and that, when the first frequency is to be used for the communication, performs communication by using the first frequency and the second frequency at a same time; and a notifying unit that, when the first frequency is to be used for the communication, notifies the communication terminal of the first frequency, and the communication terminal includes: a second communicating unit that, when being notified of the first frequency by the notifying unit, performs communication by using the first frequency and the second frequency.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates a mapping table indicating a correspondence relationship among a cell ID group $N^{(1)}_{ID}$, $M_0$ values, and $m_1$ values.

FIG. 18A is a table illustrating examples of terminal categories.

FIG. 18B is a table illustrating other examples of terminal categories.

FIG. 20 is a flowchart illustrating a CA process performed by a base station according to a second embodiment.

FIG. 21A is a flowchart illustrating a CA process performed by a communication terminal according to the second embodiment.

FIG. 22 is a block diagram of a Centralized Base Band Unit (CBBU) of a base station according to a third embodiment.

DESCRIPTION OF EMBODIMENTS

Embodiments of a radio communication system, a base station, a communication terminal, and a radio communication system controlling method of the present disclosure will be explained in detail below, with reference to the drawings. The radio communication system, the base station, the communication terminal, and the radio communication system controlling method of the present disclosure are not limited by the embodiments described below. In other words, although an LTE system is explained as an example below, possible embodiments are not limited to LTE systems. The present disclosure is also applicable to other systems such as W-CDMA systems and fifth-generation mobile communication systems. Further, the present disclosure is not limited to multiple access schemes such as Time Division Multiple Access (TDMA), CDMA, OFDMA, Single Carrier Frequency-Division Multiple Access (SC-FDMA), and Non-orthogonal Multiple Access (NOMA). Furthermore, the radio communication system controlling method is not limited, either.

First Embodiment

Figure 1:
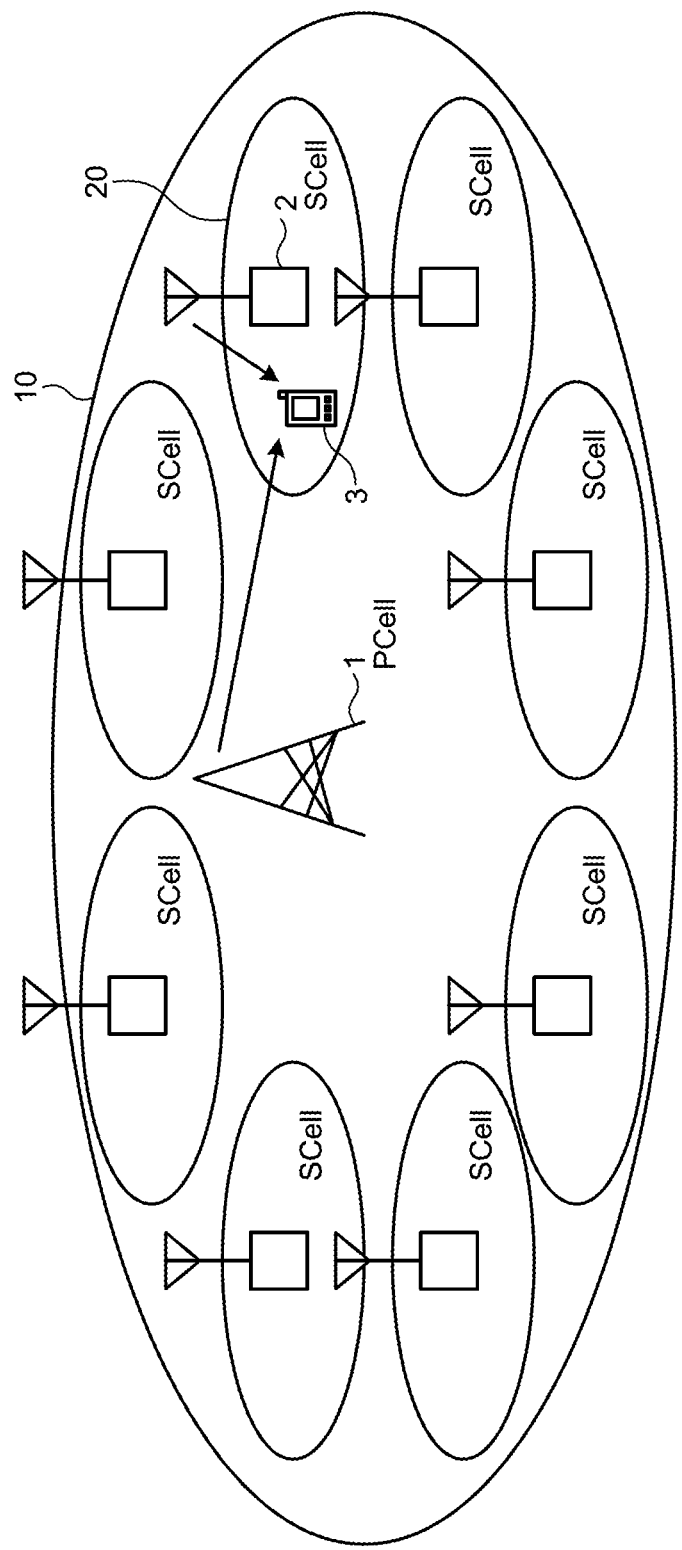
FIG. 1 is a schematic diagram of a radio communication system according to a first embodiment.

FIG. 1 is a schematic diagram of a radio communication system according to a first embodiment. As illustrated in FIG. 1, the radio communication system according to the first embodiment includes a base station 1, a base station 2, and a communication terminal 3.

The base station 1 has a cell 10 serving as a PCell. The base station 2 has a cell 20 serving as an SCell. Present in the cell 10 serving as the PCell are cells 20 serving as a plurality of SCells. The base station 1 and the base station 2 are connected to each other in a wired manner or in a wireless manner (by radio) and are capable of transmitting and receiving data to and from each other. Alternatively, the base station 1 and the base station 2 may be configured together as one base station. In that situation, the base station 1 and the base station 2 are connected to each other on the inside of an apparatus (e.g., via an interface within the apparatus) so as to be able to transmit and receive data to and from each other.

In this regard, in a conventional CA process, for example, the base station 1 is set with a plurality of CCs so that the CA process is performed among the CCs of mutually the same base station (i.e., the base station 1). Currently, however, unlike the conventional example, performing a CA process between the base station 1 and another base station, for example, has been discussed. It means that Dual Cell High Speed Downlink Packet Access (DC-HSDPA) is implemented between the base station 1 and the other station. Implementing DC-HSDPA between the base station 1 and the other station has been defined as a specification and is called either Dual Band (DB)-HSDPA or DB-DC-HSDPA. Further, Four Carrier (4C)-HSDPA, which uses four frequencies, is also defined as a specification.

The abovementioned schemes such as DC-HSDPA, DB-DC-HSDPA, and 4C-HSDPA are considered to be equivalent to the CA. In the following sections, although the CA is used as an example, the present disclosure is applicable to DC-HSDPA, DB-DC-HSDPA, and 4C-HSDPA, unless noted otherwise.

Figure 2:
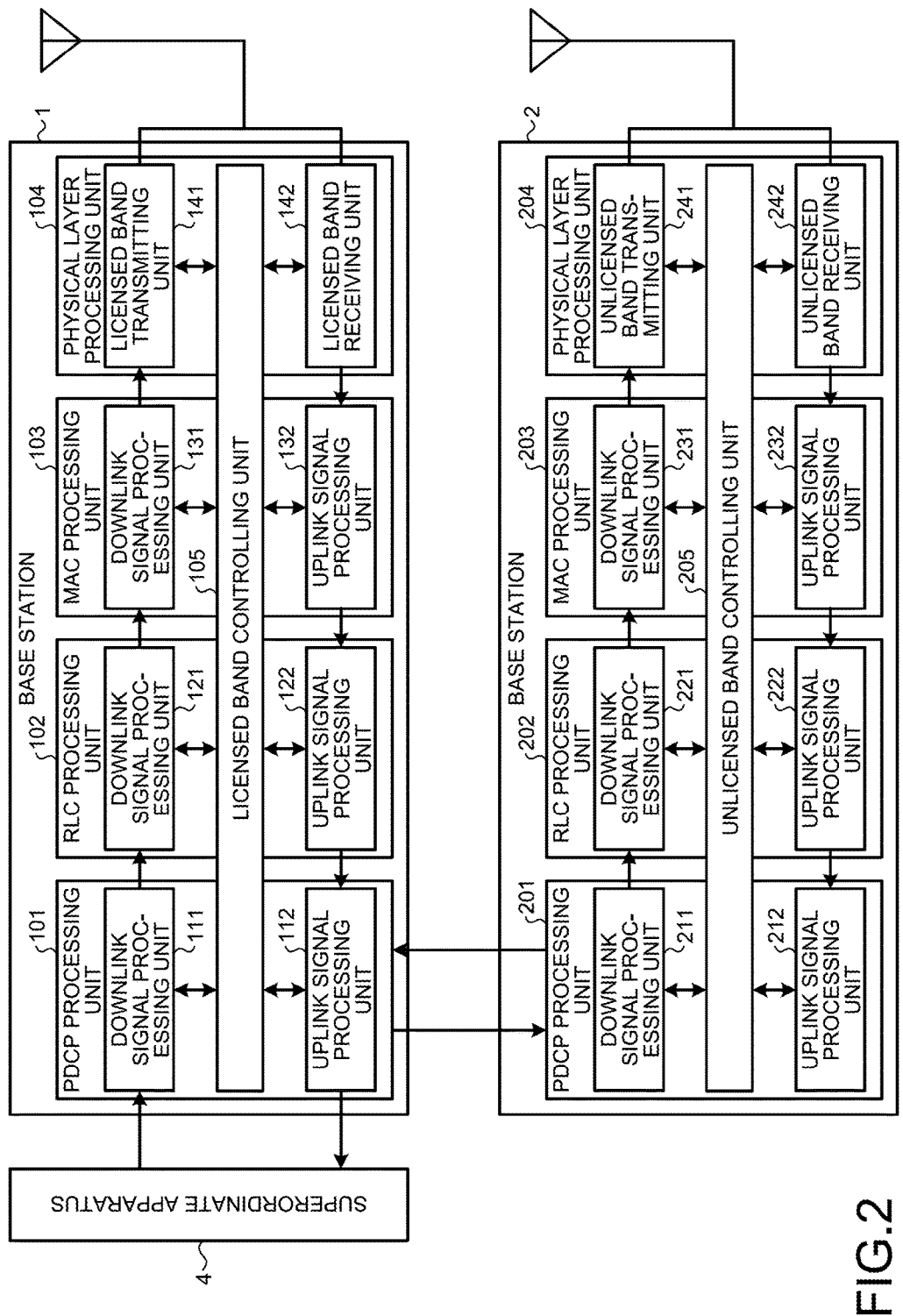
FIG. 2 is a block diagram of base stations according to the first embodiment.

Next, details of the base station 1 and the base station 2 will be explained, with reference to FIG. 2. FIG. 2 is a block diagram of the base stations according to the first embodiment.

As illustrated in FIG. 2, the base station 1 includes a Packet Data Convergence Protocol (PDCP) processing unit 101, a Radio Link Control (RLC) processing unit 102, a Media Access Control (MAC) processing unit 103, and a physical layer processing unit 104. Further, the base station 1 includes a licensed band controlling unit 105. The licensed band controlling unit 105 operates in collaboration with other processing units. For that reason, the licensed band controlling unit 105 is depicted in the drawings as extending over the processing units, for the sake of convenience in illustration; however, in actuality, the licensed band controlling unit 105 is a processing unit separate from the other processing units. However, it is also acceptable to decompose the parts collaborating with the other processing units and to consider those parts as parts of the other processing units.

Further, the base station 2 includes a PDCP processing unit 201, an RLC processing unit 202, a MAC processing unit 203, and a physical layer processing unit 204. In addition, the base station 2 includes an unlicensed band controlling unit 205.

The PDCP processing units 101 and 201 each communicate with a upper layer apparatus 4 via a radio interface by using a network protocol. The upper layer apparatus 4 includes, for example, an MME and an S-GW. The upper layer apparatus 4 may be considered as a core network. The PDCP processing units 101 and 201 each have functions of compressing header information of data, ciphering and deciphering data, providing integrity protection and integrity verification of control information. The PDCP processing unit 101 includes a downlink signal processing unit 111 and an uplink signal processing unit 112. Further, the PDCP processing unit 201 includes a downlink signal processing unit 211 and an uplink signal processing unit 212. In the following sections, the PDCP processing unit 101 will be explained more specifically in an example.

The downlink signal processing unit 111 receives an input of a signal such as user data from the upper layer apparatus 4. Further, the downlink signal processing unit 111 divides a data packet represented by the received signal into segments (called segmentation), appends PDCP headers such as sequence numbers thereto, and generates PDCP Protocol Data Units (PDUs) (RLC Service Data Units (SDUs)). After that, the downlink signal processing unit 111 outputs the processed transmission signal to a downlink signal processing unit 121 included in the RLC processing unit 102.

The uplink signal processing unit 112 receives an input of a signal such as user data from an uplink signal processing unit 122 included in the RLC processing unit 102. Further, the uplink signal processing unit 112 concatenates the received PDCP PDUs (RLC SDUs) together, removes the PDCP headers, and regenerates the PDCP SDUs, i.e., an IP packet. After that, the uplink signal processing unit 112 transmits the signal resulting from the process, to the upper layer apparatus 4.

Further, the PDCP processing unit 101 and the PDCP processing unit 201 communicate with each other by using PDCP SDUs.

The RLC processing units 102 and 202 each have, among others, an Auto Repeat Request (ARQ) function (a resending process) and a function of controlling the resending process of signals. The RLC processing unit 102 includes the downlink signal processing unit 121 and the uplink signal processing unit 122. Further, the RLC processing unit 202 includes a downlink signal processing unit 221 and an uplink signal processing unit 222. In the following sections, the RLC processing unit 102 will be explained more specifically in an example.

The downlink signal processing unit 121 included in the RLC processing unit 102 receives an input of the PDCP PDUs, which are the signal processed by the downlink signal processing unit 111 included in the PDCP processing unit 101. The downlink signal processing unit 121 divides the received PDCP PDUs (RLC SDUs) into segments, appends RLC headers such as sequence numbers thereto, and generates RLC PDUs. After that, the downlink signal processing unit 121 outputs the generated RLC PDUs to a downlink signal processing unit 131 included in the MAC processing unit 103.

The uplink signal processing unit 122 included in the RLC processing unit 102 receives an input of the RLC PUDs (MAC SDUs), which is the signal processed by an uplink signal processing unit 132 included in the MAC processing unit 103. The uplink signal processing unit 122 concatenates the received RLC PDUs together, removes the RLC headers, and regenerates the RLC SDUs (the PDCP PDUs). After that, the uplink signal processing unit 122 outputs the regenerated RLC SDUs to the uplink signal processing unit 112 included in the PDCP processing unit 101.

The MAC processing units 103 and 203 each have a function of implementing a Hybrid ARQ (HARQ) with the MAC of the communication terminal 3. Further, the MAC processing units 103 and 203 each also have a scheduling function of determining which communication terminal uplink and downlink data transfers are to be performed with and selecting a data volume to be transferred, a radio resource to be used, a modulation method, an encoding ratio, and the like for the data transfers. Further, the MAC processing units 103 and 203 each have a function of implementing random access and radio link control. The MAC processing unit 103 includes the downlink signal processing unit 131 and the uplink signal processing unit 132. Further, the MAC processing unit 203 includes a downlink signal processing unit 231 and an uplink signal processing unit 232. In the following sections, the MAC processing unit 103 will be explained more specifically in an example.

The downlink signal processing unit 131 included in the MAC processing unit 103 receives an input of the MAC SDUs (the RLC PDUs) from the RLC processing unit 102. The downlink signal processing unit 131 divides the MAC SDUs into segments (called segmentation), appends MAC headers such as sequence numbers thereto, and generates MAC PDUs. Further, according to information about the scheduling of signals, the downlink signal processing unit 131 performs a signal scheduling process, i.e., allocates signals to radio resources. After that, the downlink signal processing unit 131 outputs the MAC PDUs to a licensed band transmitting unit 141 included in the physical layer processing unit 104.

According to the scheduling, the uplink signal processing unit 132 included in the MAC processing unit 103 receives an input of the MAC PDUs from a licensed band receiving unit 142 included in the physical layer processing unit 104. After that, the uplink signal processing unit 132 concatenates the MAC PDUs together, removes the MAC headers, and regenerates the MAC SDUs (the RLC PDUs). After that, the uplink signal processing unit 132 outputs the regenerated MAC SDUs to the uplink signal processing unit 122 included in the RLC processing unit 102.

In a radio physical layer, the physical layer processing units 104 and 204 each perform a synchronization process, an equalizing process, a modulating/demodulating process, an error correction code process, and a Radio Frequency (RF) controlling process. The physical layer processing unit 104 includes the licensed band transmitting unit 141 and the licensed band receiving unit 142. Further, the physical layer processing unit 204 includes an unlicensed band transmitting unit 241 and an unlicensed band receiving unit 242. The physical layer processing units 104 and 204 correspond to an example of the "first communicating unit".

When a W-CDMA system is used, the base station 1 is structured with the MAC processing unit 103 and the physical layer processing unit 104, while a Radio Network Controller (RNC) includes the PDCP processing unit 101 and the RLC processing unit 102. In that situation, the RLC processing unit 102 further has a function of handover control and the like. In a W-CDMA system, the base station 2 also has the same configuration.

Figure 3:
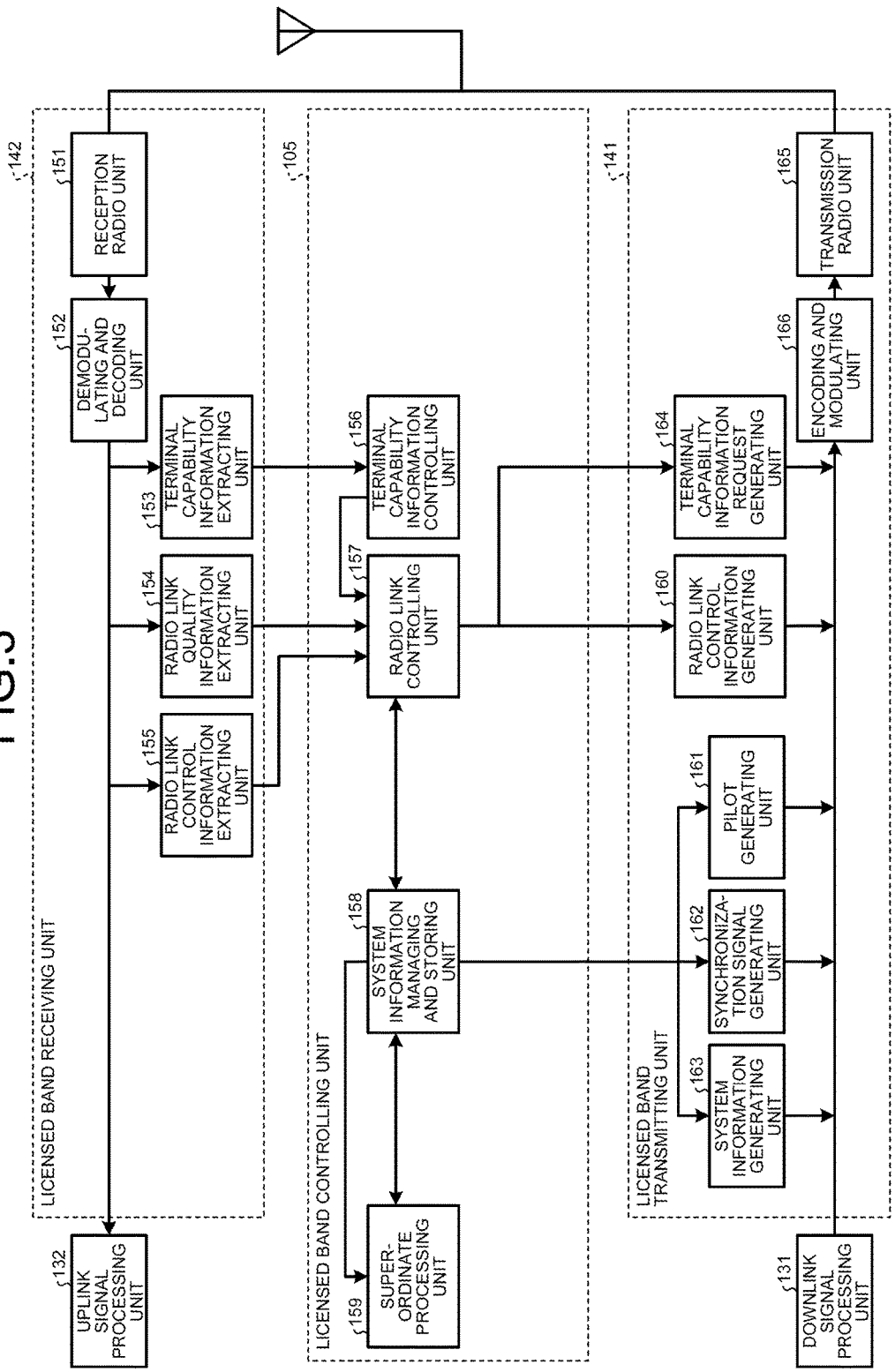
FIG. 3 is a block diagram illustrating details of a physical layer processing unit and a licensed band controlling unit.

Next, details of the physical layer processing unit 104 will be explained, with reference to FIG. 3. FIG. 3 is a block diagram illustrating details of the physical layer processing unit and the licensed band controlling unit. For the licensed band controlling unit 105, however, FIG. 3 illustrates only some of the functions in detail that are involved in the physical layer processing processes.

The licensed band receiving unit 142 includes a reception radio unit 151, a demodulating and decoding unit 152, a terminal capability information extracting unit 153, a radio link quality information extracting unit 154, and a radio link control information extracting unit 155.

The reception radio unit 151 receives, via an antenna, a signal sent from the communication terminal 3. Further, the reception radio unit 151 amplifies the received signal and further converts the signal on a radio frequency into a baseband signal. After that, the reception radio unit 151 outputs the signal converted into the baseband signal to the demodulating and decoding unit 152.

The demodulating and decoding unit 152 receives an input of the signal from the reception radio unit 151. After that, the demodulating and decoding unit 152 performs a demodulating process on the received signal. Further, the demodulating and decoding unit 152 performs a decoding process on the signal resulting from the demodulating process. After that, the demodulating and decoding unit 152 outputs the signal resulting from the processes, to the uplink signal processing unit 132.

The terminal capability information extracting unit 153 extracts terminal capability information from the signal sent from the demodulating and decoding unit 152. The terminal capability information includes information indicating whether or not the communication terminal 3 is capable of using an unlicensed band. After that, the terminal capability information extracting unit 153 outputs the extracted terminal capability information to a terminal capability information controlling unit 156. In this situation, being capable of using an unlicensed band (hereinafter "unlicensed band use capability/incapability") denotes whether or not the terminal is, as a function thereof, capable of performing communication by using an unlicensed band. Accordingly, the capability/incapability is different from being able/unable to use an unlicensed band based on radio environment such as radio link quality.

The radio link quality information extracting unit 154 extracts radio link quality information including a Reference Signal Received Power (RSRP) level from the signal sent from the demodulating and decoding unit 152. After that, the radio link quality information extracting unit 154 outputs the extracted radio link quality information to a radio link controlling unit 157.

In this situation, the radio link quality is a collective term for a reception power level, a pilot reception power level, reception quality, and pilot reception quality. The reception power level may be a level of reception electric field strength. Further, the radio link quality may be referred to as channel state information (CSI). The pilot reception power level may be expressed by, for example, an RSRP level for an LTE system and may be expressed by a Common Pilot Channel Received Signal Code Power (CPICH RSCP) level for a W-CDMA system. The reception quality may be expressed by a Signal-to-Interference Ratio (SIR), for example. The pilot reception quality may be expressed by, for example, a Reference Signal Received Quality (RSRQ) level for an LTE system and may be expressed by a value called Common Pilot Channel received energy per chip divided by the power density (CPICH Ec/N0) for a W-CDMA system.

When the SCell is caused to select the communication terminal 3, the radio link quality information extracting unit 154 extracts radio link quality information of one or more cells, from the signal sent from the demodulating and decoding unit 152. After that, the radio link quality information extracting unit 154 outputs the extracted radio link quality information to the radio link controlling unit 157.

The radio link control information extracting unit 155 extracts a radio link control signal including a random access preamble, from the signal sent from the demodulating and decoding unit 152. Subsequently, the radio link control information extracting unit 155 obtains the random access preamble from the radio link control signal. After that, the radio link control information extracting unit 155 outputs the random access preamble to the radio link controlling unit 157.

Subsequently, the radio link control information extracting unit 155 extracts an input of a scheduled transmission sent from the communication terminal 3 as a response to the random access preamble, from the signal sent from the demodulating and decoding unit 152. After that, the radio link control information extracting unit 155 outputs the scheduled transmission to the radio link controlling unit 157.

The radio link control information extracting unit 155 extracts control information used by the cell 20 for establishing a radio link, from the signal sent from the demodulating and decoding unit 152. Further, the radio link control information extracting unit 155 outputs the extracted control information to be used by the cell 20 for establishing a radio link, to the radio link controlling unit 157.

The licensed band controlling unit 105 includes the terminal capability information controlling unit 156, the radio link controlling unit 157, a system information managing and storing unit 158, and a upper layer processing unit 159.

By using the terminal capability information, the terminal capability information controlling unit 156 judges whether or not the communication terminal 3 is capable of using an unlicensed band. After that, the terminal capability information controlling unit 156 notifies the radio link controlling unit 157 of whether or not the communication terminal 3 is capable of using an unlicensed band. The terminal capability information controlling unit 156 corresponds to an example of the "controlling unit".

The radio link controlling unit 157 receives an input of the random access preamble from the radio link control information extracting unit 155. After that, the radio link controlling unit 157 exercises control to return a random access response in response to the random access preamble. More specifically, for example, the radio link controlling unit 157 generates a Timing Advanced Indicator (TAI) used for controlling transmission timing of the communication terminal 3 and exercises control to request aperiodic radio link measuring processes and radio link measuring result reporting processes. Further, the radio link controlling unit 157 outputs control information for the random access response to a radio link control information generating unit 160.

Further, the radio link controlling unit 157 receives an input of the scheduled transmission from the radio link control information extracting unit 155. After that, the radio link controlling unit 157 exercises control to transmit a contention resolution to the communication terminal 3. Subsequently, the radio link controlling unit 157 outputs control information for the contention resolution to the radio link control information generating unit 160.

When the random access is completed and a radio link has been established between the device of its own and the communication terminal 3, the radio link controlling unit 157 instructs a terminal capability information request generating unit 164 to transmit a terminal capability information request. After that, the radio link controlling unit 157 receives an input of the information indicating whether or not the communication terminal 3 is capable of using an unlicensed band, from the terminal capability information controlling unit 156. After that, by using the unlicensed band use capability/incapability information, the radio link controlling unit 157 identifies the communication terminal 3 and identifies a terminal category. For example, the radio link controlling unit 157 has a list that has terminal categories therein and was generated by categorizing terminals according to the unlicensed band use capability/incapability thereof and the like. The radio link controlling unit 157 instructs the radio link control information generating unit 160 to generate control information used for issuing a notification that an unlicensed band is to be used. Further, the radio link controlling unit 157 instructs the radio link control information generating unit 160 to issue a notification about the terminal category of the communication terminal 3.

After that, the radio link controlling unit 157 notifies the system information managing and storing unit 158 that an unlicensed band is to be used for the communication terminal 3.

Further, when having determined an aperiodic radio link quality measuring process is to be performed, which is not compliant with a measuring periodic cycle (or a measuring result report periodic cycle; both of which will hereinafter be referred to as a "measuring periodic cycle"), the radio link controlling unit 157 notifies the radio link control information generating unit 160 of the radio link quality measuring process. In that situation, the radio link controlling unit 157 transmits conditions for measuring the radio link quality to the radio link control information generating unit 160. The conditions for measuring the radio link quality (or issuing a notification about a radio link quality measuring result) may include, for example, a measuring periodic cycle and/or a radio resource (e.g., the entire system bandwidth or a partial bandwidth in the system bandwidth) to be measured.

Further, in response to the request for the aperiodic radio link quality measuring process, the radio link controlling unit 157 receives an input of a radio link quality measuring and calculating result from the radio link control information extracting unit 155. After that, on the basis of the obtained radio link quality, the radio link controlling unit 157 selects a communication terminal to which downlink data is to be transmitted. In the present example, a situation will be explained in which the radio link controlling unit 157 selects the communication terminal 3. After that, the radio link controlling unit 157 selects a data volume, a radio resource to be used, a modulation method to be used, an encoding ratio, and/or the like that are to be applied when the downlink data is transmitted to the communication terminal 3. In this situation, the radio resource to be used is a radio resource structured in a frequency axis direction and a time axis direction, when an LTE system is used. In contrast, the radio resource to be used is a spreading code when a W-CDMA system is used. Subsequently, the radio link controlling unit 157 outputs the selection results to the radio link control information generating unit 160.

Further, the radio link controlling unit 157 receives inputs of pilot signals transmitted from communication terminals including the communication terminal 3, from the radio link control information extracting unit 155. After that, the radio link controlling unit 157 measures and calculates uplink radio link quality from the received pilot signals. Subsequently, on the basis of the radio link quality, the radio link controlling unit 157 selects a communication terminal that is to perform an uplink data transfer. This process may generally be referred to as a scheduling process. Only the part of the process to select a terminal may be referred to as a scheduling process. In the present example, a situation will be explained in which the radio link controlling unit 157 selects the communication terminal 3 as a communication terminal that is to perform the uplink data transfer, on the basis of the radio link quality.

Subsequently, the radio link controlling unit 157 selects a data volume, a radio resource to be used, a modulation method to be used, an encoding ratio, and/or the like that are to be applied when the communication terminal 3 transmits the uplink data. In this situation, the radio resource to be used is a radio resource structured in a frequency axis direction and a time axis direction, when an LTE system is used. In contrast, the radio resource to be used is a spreading code when a W-CDMA system is used. Subsequently, the radio link controlling unit 157 outputs the selection results to the radio link control information generating unit 160.

Further, the radio link controlling unit 157 monitors the radio link quality extracted by the radio link quality information extracting unit 154. After that, when the radio link quality satisfies a predetermined condition such as the condition where the difference between the transfer speed to or from the communication terminal 3 and a predetermined transfer speed exceeds a threshold value, the radio link controlling unit 157 determines that a CA process is to be performed. After that, the radio link controlling unit 157 notifies the upper layer processing unit 159 that the CA process is to be performed.

Subsequently, the radio link controlling unit 157 receives an input of radio link quality information between one or more cells and the communication terminal 3 from the radio link quality information extracting unit 154. After that, the radio link controlling unit 157 selects an SCell on the basis of the obtained radio link quality information. In the present example, a situation will be explained in which the radio link controlling unit 157 selects the cell 20 as an SCell. Subsequently, the radio link controlling unit 157 instructs the radio link control information generating unit 160 to request control information used for establishing a radio link from the base station 2. In this situation, the control information used for establishing a radio link may be, for example, a dedicated random access preamble (hereinafter, "dedicated preamble") to be individually assigned to a terminal or control information used for random access. Further, the control information used for establishing a radio link includes system information. The system information includes conditions for measuring the radio link quality, cell selection information, neighboring cell information including one or more cell IDs, Multicast Broadcast Single Frequency Network (MBSFN)-related information, network identification information, and CA-related information. Further, the system information include: information that is broadcast (or transmitted) as control information used in common among any communication terminals 3 that are either connected to the cell or attempting to connect to the cell; and information that is issued as a notification (transmitted) to serve as control information provided for the individual communication terminal 3 that is either connected to the cell or attempting to connect to the cell. The system information may be considered as control information. Further, in LTE systems (including LTE-advanced systems) and W-CDMA systems, what corresponds to the system information is referred to as a system information block (e.g., a Master Information Block (MIB) or a System Information Block (SIB)) obtained by putting pieces of system information together.

Subsequently, the radio link controlling unit 157 receives an input of the control information to be used by the cell 20 for establishing a radio link, from the radio link control information extracting unit 155. After that, the radio link controlling unit 157 instructs the radio link control information generating unit 160 to issue a notification about the control information to be used for establishing a radio link.

After that, the radio link controlling unit 157 receives an input of the random access preamble for the cell 20 from the radio link control information extracting unit 155. Further, the radio link controlling unit 157 exercises control to return a random access response in response to the random access preamble for the cell 20. After that, the radio link controlling unit 157 outputs the control information for the random access response related to the cell 20, to the radio link control information generating unit 160. As a result of this process, the base station 1 establishes a radio link with the communication terminal 3, while using the cell 20 as an SCell. The radio link controlling unit 157 corresponds to an example of the "notifying unit".

The upper layer processing unit 159 performs a controlling process over the PDCP processing unit 101, the RLC processing unit 102, and the MAC processing unit 103.

The licensed band transmitting unit 141 includes the terminal capability information request generating unit 164, the radio link control information generating unit 160, a pilot generating unit 161, a synchronization signal generating unit 162 and a system information generating unit 163, a transmission radio unit 165, and an encoding and modulating unit 166.

When the random access is completed and the radio link has been established between the device of its own and the communication terminal 3, the terminal capability information request generating unit 164 receives an instruction from the radio link controlling unit 157 instructing that a terminal capability information request be transmitted. After that, the terminal capability information request generating unit 164 generates a terminal capability information request. Subsequently, the terminal capability information request generating unit 164 outputs the generated terminal capability information request to the encoding and modulating unit 166 so as to transmit the request to the communication terminal 3.

The radio link control information generating unit 160 receives an input of the control information for the random access response, from the radio link controlling unit 157. After that, the radio link control information generating unit 160 generates the random access response by using the obtained control information. Subsequently, the radio link control information generating unit 160 outputs the generated random access response to the encoding and modulating unit 166 so as to transmit the random access response to the communication terminal 3.

The radio link control information generating unit 160 receives an input of the control information for the contention resolution from the radio link controlling unit 157. After that, by using the obtained control information, the radio link control information generating unit 160 generates the contention resolution. Subsequently, the radio link control information generating unit 160 outputs the generated contention resolution to the encoding and modulating unit 166 so as to transmit the contention resolution to the communication terminal 3.

The radio link control information generating unit 160 receives the notification about a radio link quality measuring process that is not compliant with the measuring periodic cycle, from the radio link controlling unit 157. In that situation, the radio link control information generating unit 160 also obtains the conditions for measuring the radio link quality, from the radio link controlling unit 157. After that, the radio link control information generating unit 160 generates a radio link measuring request by using the conditions for measuring the radio link quality. Subsequently, the radio link control information generating unit 160 outputs the generated radio link measuring request to the encoding and modulating unit 166 so as to transmit the request to the communication terminal 3.

Further, the radio link control information generating unit 160 receives, from the radio link controlling unit 157, an input of the selection results regarding the data volume, the radio resource to be used, the modulation method to be used, the encoding ratio, and/or the like that are to be applied when the downlink data is transmitted to the communication terminal 3. After that, the radio link control information generating unit 160 generates downlink control information including the selection results. Subsequently, the radio link control information generating unit 160 outputs the generated downlink control information including the selection results to the encoding and modulating unit 166 so as to transmit the downlink control information to the communication terminal 3.

Further, the radio link control information generating unit 160 receives, from the radio link controlling unit 157, an input of the selection results regarding the data volume, the radio resource to be used, the modulation method to be used, the encoding ratio, and/or the like that are to be applied when the communication terminal 3 transmits the uplink data. After that, the radio link control information generating unit 160 generates uplink control information including the selection results. Subsequently, the radio link control information generating unit 160 outputs the generated uplink control information including the selection results to the encoding and modulating unit 166 so as to transmit the uplink control information to the communication terminal 3.

Further, the radio link control information generating unit 160 receives an instruction from the radio link controlling unit 157 instructing that control information used for issuing a notification that an unlicensed band is to be used be generated. After that, the radio link control information generating unit 160 generates an unlicensed band use notification. Subsequently, the radio link control information generating unit 160 outputs the generated unlicensed band use notification to the encoding and modulating unit 166 so as to transmit the notification to the communication terminal 3. Further, the radio link control information generating unit 160 receives an instruction from the radio link controlling unit 157 instructing that the communication terminal 3 be notified of the terminal category. After that, the radio link control information generating unit 160 generates control information for issuing a notification about the terminal category. Subsequently, the radio link control information generating unit 160 outputs the control information for issuing the notification about the terminal category to the encoding and modulating unit 166 so as to transmit the control information to the communication terminal 3.

Further, when a CA process is to be performed, the radio link control information generating unit 160 receives an instruction from the radio link controlling unit 157 instructing that the control information used for establishing the radio link be requested from the base station 2. After that, the radio link control information generating unit 160 generates the request for the control information used for establishing the radio link. Subsequently, the radio link control information generating unit 160 outputs the generated request for the control information used for establishing the radio link to the encoding and modulating unit 166 so as to transmit the request to the base station 2.

Further, the radio link control information generating unit 160 receives an instruction from the radio link controlling unit 157 instructing that the control information used by the cell for establishing the radio link be issued as a notification. After that, the radio link control information generating unit 160 generates control information for issuing the notification about the control information used by the cell 20 for establishing the radio link. Subsequently, the radio link control information generating unit 160 outputs the generated control information for issuing the notification about the control information used by the cell 20 for establishing the radio link, to the encoding and modulating unit 166 so as to transmit the control information to the base station 2. In that situation, together with the control information, the radio link control information generating unit 160 may also provide the communication terminal 3 with a notification about the cell information of the cell 20 including, for example, cell control information such as a cell ID. Alternatively, the radio link control information generating unit 160 may separately provide a notification about information related to the network to which the cell 20 is connected such as network identification information.

Further, the radio link control information generating unit 160 receives an input of the control information for the random access response related to the cell 20, from the radio link controlling unit 157. After that, the radio link control information generating unit 160 generates a random access response related to the cell 20, by using the obtained control information. Subsequently, the radio link control information generating unit 160 outputs the generated random access response related to the cell 20 to the encoding and modulating unit 166 so as to transmit the random access response to the communication terminal 3.

Figure 4:
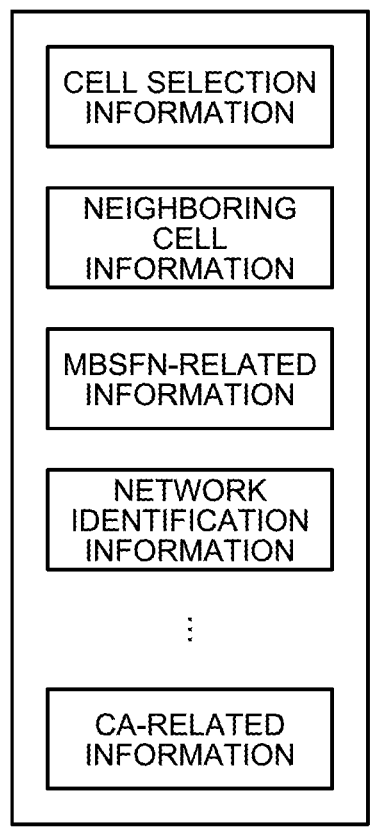
FIG. 4 is a drawing illustrating an example of system information.

The system information managing and storing unit 158 stores therein and manages system information including the conditions for measuring the radio link quality, the cell selection information, the neighboring cell information including one or more cell IDs, the MBSFN-related information, the network identification information, the CA-related information, and/or the like. The contents of the system information stored in the system information managing and storing unit 158 are illustrated in FIG. 4, for example. FIG. 4 is a drawing illustrating an example of the system information. The conditions for measuring the radio link quality include, for example, a bandwidth to be measured, a measuring periodic cycle, information about the cell to be measured, and/or the like. The network identification information is information identifying the network to which the base station 1 belongs.

In this situation, the cell IDs may be referred to as cell identifiers, C(cell)-IDs, physical cell IDs, PC (physical cell)-IDs, or PCIDs. Each of the cell IDs is an ID used for identifying a cell. The cell IDs are each used for identifying a cell in the radio link quality measuring process or a handover process. In an LTE system, by receiving a synchronization signal in a standby cell or a connected cell, the communication terminal 3 is able to recognize the cell ID of the cell.

For example, the cell IDs may be configured in an LTE system in the following manner: There are 168 groups each made up of three cell IDs, so that it is possible to set 504 cell IDs in total. The cell IDs are calculated by using Mathematical Formula (1) presented below.

$$N_{ID}^{cell}=3N_{ID}^{(1)}+N_{ID}^{(2)}$$

$$N_{ID}^{(1)}\ 0\ \text{to}\ 167$$

$$N_{ID}^{(2)}\ 0\ \text{to}\ 2 \quad (1)$$

3GPP does not define how to assign cell IDs. In other words, even for a single LTE system, for example, the method for assigning cell IDs may be different among different telecommunications carriers. In the formula above, $N^{(2)}_{ID}$ is considered as the group number of the cell ID, whereas $N^{(1)}_{ID}$ is considered as a number within the group.

After the link is established or before the random access process is performed, the system information generating unit 163 obtains the network identification information from the system information managing and storing unit 158. After that, the system information generating unit 163 generates system information by using the obtained network identification information. The system information also includes control information related to random access. Subsequently, the system information generating unit 163 outputs the generated system information including the network identification information to the encoding and modulating unit 166 so as to transmit the system information to the communication terminal 3.

Further, the system information generating unit 163 obtains the conditions for measuring the radio link quality from the system information managing and storing unit 158. After that, the system information generating unit 163 generates the obtained measuring conditions for measuring the radio link quality, into system information. Subsequently, the system information generating unit 163 outputs the generated system information including the measuring conditions for measuring the radio link quality to the encoding and modulating unit 166 so as to transmit the system information to the communication terminal 3. In this situation, the system information generating unit 163 may provide the communication terminal with the system information as a notification serving as individual control information for each of the communication terminals or may transmit the system information as common control information that is provided in common to all or a part of the communication terminals that are standing by (camping) in the cell 10 or being connected to the cell 10. Further, the system information may include a measured bandwidth, priority levels for selecting cells, and/or the like.

The synchronization signal generating unit 162 calculates a synchronization signal (a synchronization signal sequence) on the basis of the cell IDs stored in the system information managing and storing unit 158. A synchronization signal unit may be configured with one signal (symbol), but is usually configured with a plurality of signals (symbols). Accordingly, the synchronization signal can be called a synchronization signal sequence, but will hereinafter be generally referred to as a "synchronization signal". After that, the synchronization signal generating unit 162 outputs the generated synchronization signal to the encoding and modulating unit 166 so as to transmit the synchronization signal to the communication terminal 3. In an LTE system, two types of synchronization signals are defined as the synchronization signal. One is called the first synchronization signal (a Primary Synchronization Signal [PSS]); whereas the other is called the second synchronization signal (a Secondary Synchronization Signal [SSS]). In an LTE system, no synchronization channel is present, and only the synchronization signal is defined. It is noted, however, that the two types of synchronization signals are, in actuality, each configured with a plurality of symbols. The present disclosure is similarly applicable to synchronization channels to transfer synchronization signals.

The pilot generating unit 161 calculates a pilot signal (a pilot signal sequence). Similarly, a pilot signal unit (a pilot or a pilot symbol) may be configured with one signal (symbol), but is usually configured with a plurality of signals (symbols). Accordingly, the pilot signal can be called a pilot signal sequence, but will hereinafter be generally referred to as a "pilot signal". After that, the pilot generating unit 161 outputs the generated pilot signal to the encoding and modulating unit 166 so as to transmit the pilot signal to the communication terminal 3. The present disclosure is similarly applicable to a pilot channel that transfers the pilot signal.

Next, a process of calculating the PSS and the SSS will be explained. A method for calculating the PSS can be defined in Mathematical Formula (2) and Table (1) presented below. In other words, the PSS is calculated on the basis of the group number $N^{(2)}_{ID}$ of the cell ID.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (2)$$

TABLE 1

| $N_{ID}^{(2)}$ | Root index $u$ |
|---|---|
| 0 | 25 |
| 1 | 29 |
| 2 | 34 |

Further, the PSS is a Zadoff-Chu sequence (Zadoff-Chu codes). The Zadoff-Chu sequence represents a Constant Amplitude Zero Auto Correlation waveform (CAZAC) and is a sequence that is made of periodic complex signals of the complement of 1 and has an autocorrelation of zero. In this situation, the PSS is expressed by mapping the signals of the 62 complex numbers calculated from the above in the frequency axis direction (a sub-carrier direction) of Orthogonal Frequency-Division Multiple Access (OFDMA). The PSS is not scrambled.

The process of mapping the signals of the 62 complex numbers is performed according to Mathematical Formula (3) below.

$$a_{k,l} = d(n), n = 0, \ldots, 61 \quad (3)$$
$$k = n - 31 + \frac{N_{RB}^{DL} N_{sc}^{RB}}{2}$$

In Mathematical Formula (3), (k,l) is a resource element in the symbols in OFDMA used for transmitting the PSS.

Further, for example, when the frame structure is of Type 1, the PSS is mapped in the frequency direction (i.e., the sub-carrier direction), at the last symbols of slots 0 and 10, i.e., at l=6 in a normal subframe. More specifically, the PSS is arranged in the range of ±31 symbols from the frequency center of the six Resource Blocks (RBs) positioned at the center. The PSS is not arranged in the five symbols at each of the two ends.

Due to the positional arrangement at the last symbol in the time axis direction, the communication terminal 3 is able to identify the head of each slot. In other words, by using Mathematical Formula (4) presented below, the communication terminal 3 is able to bring slots into synchronization.

$$a_{k,l} = d(n), n = 0, \ldots, 61 \quad (4)$$
$$k = n - 31 + \frac{6 \times 12}{2}$$
$$= n - 5$$

Further, a method for calculating the SSS can be implemented in the following procedure: The expressions d(0), . . . d(61) can be expressed with two binary sequences having a length of 31 that can be calculated by using a scramble sequence derived from the PSS. The two binary sequences having a length of 31 and defining the SSS can be defined between subframes 0 and 5 by using Mathematical Formula (5) presented below. The binary sequences may also be considered as sequences obtained by scrambling sequences derived from calculations.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad (5)$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Mathematical Formula (5), $0 \leq n \leq 30$ is satisfied. Further, it is possible to express $m_0$ and $m_1$ by using the cell ID group $N^{(1)}_{ID}$ as indicated in Mathematical Formula (6) below.

$$m_0 = m' \bmod 31 \quad (6)$$
$$m_1 = (m_0 + \lfloor m'/31 \rfloor + 1) \bmod 31$$
$$m' = N_{ID}^{(1)} + q(q+1)/2, \ q = \left\lfloor \frac{N_{ID}^{(1)} + q'(q'+1)/2}{30} \right\rfloor,$$
$$q' = \lfloor N_{ID}^{(1)}/30 \rfloor$$

These expressions can be represented as indicated in the mapping table in FIG. 5. FIG. 5 illustrates a mapping table indicating a correspondence relationship among the cell ID groups $N^{(1)}_{ID}$, $m_0$ values, and $m_1$ values.

Further, it is possible to express $S_0^{(m0)}(n)$ and $S_1^{(m1)}(n)$ as indicated in Mathematical Formula (7).

$$s_0^{(m0)}(n) = \tilde{s}((n+m_o) \bmod 31)$$

$$s_1^{(m1)}(n) = \tilde{s}((n+m_1) \bmod 31) \quad (7)$$

Further, the terms in Mathematical Formula (7) satisfy Mathematical Formula (8) presented below.

$$\tilde{s}(i) = 1 - 2x(i), \ 0 \leq i \leq 30$$

$$x(\bar{i}+5) = (x(\bar{i}+2) + x(\bar{i})) \bmod 2, \ 0 \leq \bar{i} \leq 25 \quad (8)$$

In Mathematical Formula (8), the initial values are x(0)=0, x(1)=0, x(2)=0, x(3)=0, and x(4)=1.

Further, it is possible to express $c_0(n)$ and $c_1(n)$, which are two scramble sequences dependent on the PSS, by using Mathematical Formula (9) presented below.

$$c_0(n) = \tilde{c}((n+N_{ID}^{(2)}) \bmod 31)$$

$$c_1(n) = \tilde{c}((n+N_{ID}^{(2)}+3) \bmod 31) \quad (9)$$

In Mathematical Formula (9), $N^{(2)}_{ID} \in \{0, 1, 2\}$ corresponds to one element of the cell ID group $N^{(1)}_{ID}$. Further, the terms in Mathematical Formula (9) satisfy Mathematical Formula (10) presented below.

$$\tilde{c}(i) = 1 - 2x(i), \ 0 \le i \le 30$$

$$x(\bar{i}+5) = (x(\bar{i}+3) + x(\bar{i})) \bmod 2, \ 0 \le \bar{i} \le 25 \quad (10)$$

In Mathematical Formula (10), the initial values are $x(0)=0$, $x(1)=0$, $x(2)=0$, $x(3)=0$, and $x(4)=1$.

Further, it is possible to express the scramble sequences $Z_1^{(m0)}(n)$ and $Z_1^{(m1)}(n)$ by using Mathematical Formula (11) presented below.

$$z_1^{(m0)}(n) = \tilde{z}((n + (m_0 \bmod 8)) \bmod 31)$$

$$z_1^{(m1)}(n) = \tilde{z}((n + (m_1 \bmod 8)) \bmod 31) \quad (11)$$

In Mathematical Formula (11), $m_0$ and $m_1$ are values obtained from the mapping table in FIG. 5. Further, the terms in Mathematical Formula (11) satisfy Mathematical Formula (12) presented below.

$$\tilde{z}(i) = 1 - 2x(i), \ 0 \le i \le 30$$

$$x(\bar{i}+5) = (x(\bar{i}+4) + x(\bar{i}+2) + x(\bar{i}+1) + x(\bar{i})) \bmod 2, \ 0 \le \bar{i} \le 25 \quad (12)$$

In Mathematical Formula (12), the initial values are $x(0)=0$, $x(1)=0$, $x(2)=0$, $x(3)=0$, and $x(4)=1$.

As explained above, it is possible to express the SSS by using the mutually-different calculation formulae between when the transmission is performed by using subframe number 0 (i.e., slot number 0) and when the transmission is performed by using subframe number 5 (i.e., slot number 10). Further, the calculation formulae for the SSS are different between the generated complex signals identified with odd ordinal numbers and the generated complex signals identified with even ordinal numbers. Further, similarly to the PSS, the SSS is a signal sequence configured with 62 complex numbers.

Further, $c_o(n)$ and $c_1(n)$ each denote either a maximal length sequence (an M sequence) or a Pseudo Noise (PN) sequence and are calculated by using the number $N^{(1)}_{ID}$ which is a number in the group number $N^{(2)}_{ID}$ to which the cell ID belongs.

Similarly, $S_0^{(m0)}(n)$ and $S_1^{(m1)}(n)$ are also M sequences and are calculated from the number $N^{(1)}_{ID}$ of the group to which the cell ID belongs as well as $m_0$ and $m_1$ derived from $N^{(1)}_{ID}$ and the mapping table in FIG. 5.

Next, a process of mapping the SSS will be explained. The sequence d(n) expressing the SSS is mapped over resource elements as indicated in Mathematical Formula (13) presented below.

$$a_{k,l} = d(n), \ n = 0, \ldots, 61 \quad (13)$$

$$k = n - 31 + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

In Mathematical Formula (13), it is possible to express the resource elements (k,l) by using Mathematical Formula (14) presented below.

$$k = n - 31 + \frac{N_{RB}^{DL} N_{sc}^{RB}}{2} \quad (14)$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

$$n = -5, -4, \ldots, -1, 62, 63, \ldots, 66$$

Accordingly, for example, when Type 1 (i.e., Frequency Division Duplex [FDD]) is used, the SSS is arranged at the second-to-last symbol of slots 0 and 10. In this situation, the last symbol is $N_{symb}^{DL} - 1$, where "DL" denotes downlink, while "symb" stands for symbol and denotes a symbol in the time axis direction. Further, similarly to the PSS, the SSS is arranged at the center in the frequency axis direction, i.e., in the range of ±31 symbols from the center frequency of the six RBs positioned at the center of the bandwidth. Further, because the transmitted SSS is different between slot 0 and slot 10, it is possible to identify the head of each radio frame.

Next, a process of calculating the pilot signal will be explained. In the present example, a Cell-specific Reference Signal (CRS), which is a pilot signal used in common to the cells, i.e., used in common among the terminals that are either connected to the cell or attempting to connect to the cell, will be explained. Although not explained below, a method for calculating a pilot signal is also similarly defined for a UE-specific reference signal, which is a pilot signal for an individual terminal (which may be referred to as a Dedicated Reference Signal [DRS]). Furthermore, a method for calculating a pilot signal is also similarly defined for a pilot used for transmitting Multimedia Broadcast and Multicast Service (MBMS) data. The present disclosure is also applicable to any of these pilot signals, unless noted otherwise.

It is possible to express the pilot signal by using Mathematical Formula (15) presented below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (15)$$

$$m = 0, 1, \ldots, 2N_{RB}^{max,DL} - 1$$

In Mathematical Formula (15), $n_s$ denotes a slot number of the radio frame, whereas l denotes the OFDMA symbol number of the slot. In Mathematical Formula (15), c(i) denotes a gold sequence among Pseudo-random Noise (PN) sequences (or Pseudo-random sequences) of which the initial value is equal to a value expressed in Mathematical Formula (16A) presented below. The gold sequence is generated by connecting together two PN sequences having mutually-different initial values.

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad (16A)$$

$$N_{CP} = \begin{cases} 1 & \text{for normal } CP \\ 0 & \text{for extended } CP \end{cases}$$

It is possible to calculate Mathematical Formula (16A) on the basis of the slot number Ns, the ID, and 1-bit information indicating the CP length.

In this situation, it is possible to calculate the gold sequence by using Mathematical Formula (16B) presented below.

$$c(n) = (x_1(n+N_C) + x_2(n+N_C)) \bmod 2$$

$$x_1(n+31) = (x_1(n+3) + x_1(n)) \bmod 2$$

$$x_2(n+31)=(x_2(n+3)+x_2(n+2)+x_2(n+1)+x_2(n)) \bmod 2 \quad (16B)$$

In this situation, the gold sequence has two initial values. One of the two initial values can be expressed by Mathematical Formula (16A). The other initial value of the gold sequence is $X_1(0)=1$, $X_1(n)=0$.

Further, the pilot signal is mapped over $a^{(p)}_{k,1}$, which is used as a reference symbol related to an antenna port p in the slot ns and can be defined as indicated in Mathematical Formula (17) presented below.

$$a^{(p)}_{k,l} = r_{l,n_s}(m') \quad (17)$$
$$k = 6m + (v + v_{shift}) \bmod 6$$
$$l = \begin{cases} 0, N^{DL}_{symb} - 3 & \text{if } p \in \{0, 1\} \\ 1 & \text{if } p \in \{2, 3\} \end{cases}$$
$$m = 0, 1, \ldots, 2 \cdot N^{DL}_{RB} - 1$$
$$m' = m + N^{max,DL}_{RB} - N^{DL}_{RB}$$

In Mathematical Formula (17), it is possible to express v as indicated in Mathematical Formula (18) presented below. The same is true with $v_{shift}$.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad (18)$$

Figure 6:
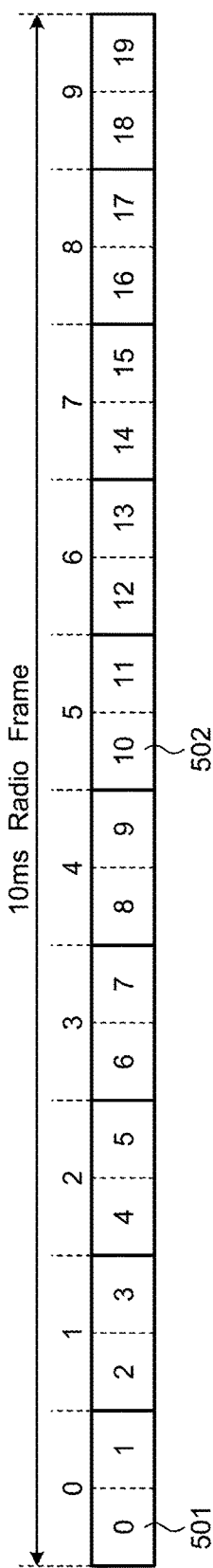
FIG. 6 is a drawing illustrating a structure of a frame.
Figure 7:
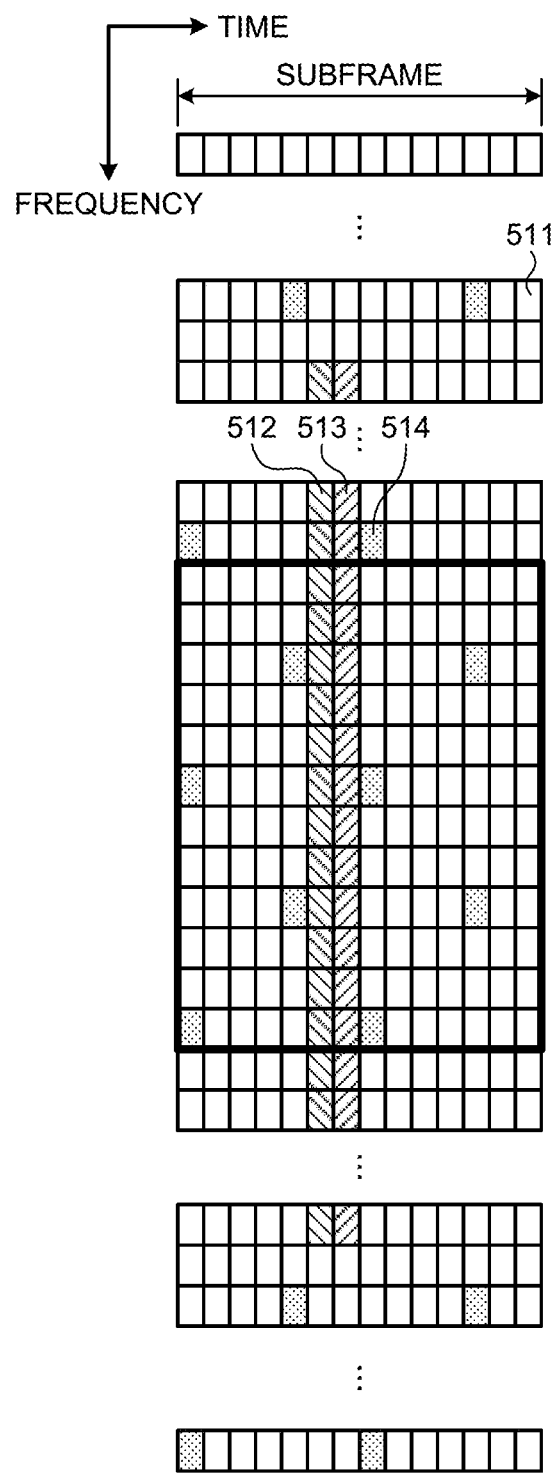
FIG. 7 is a drawing for explaining positional arrangements of a Primary Synchronization Signal (PSS), a Secondary Synchronization Signal (SSS), and a pilot signal in one subframe.

Further, processes of mapping the PSS, the SSS, and the pilot signal will be explained, with reference to FIGS. 6 and 7. FIG. 6 is a drawing illustrating a structure of a frame. FIG. 7 is a drawing for explaining positional arrangements of the PSS, the SSS, and the pilot signal in one subframe. In the following sections, an example of FDD will be explained.

In FIG. 6, the numbers in the upper row are numbers of subframes. In FIG. 6, the numbers in the lower row are slot numbers of the time slots. As illustrated in FIG. 6, a 10-ms radio frame includes ten subframes. Further, two slots are assigned to each of the subframes.

Further, over slots 0 and 10 indicated with the reference numerals 501 and 502, the PSS and the SSS are mapped as indicated in FIG. 7. FIG. 7 illustrates an enlarged view of slot 0. A grid frame 511 in FIG. 7 indicates a resource element. Further, in FIG. 7, the vertical direction expresses frequencies, whereas the horizontal direction expresses time. A region 512 denotes the sixth symbol in slot 0 over which the SSS is mapped. A region 513 denotes the seventh symbol in slot 0 over which the PSS is mapped. The pilot signal is mapped over A region 514.

The encoding and modulating unit 166 receives inputs of various types of signals from the downlink signal processing unit 131, the terminal capability information request generating unit 164, the radio link control information generating unit 160, the pilot generating unit 161, the synchronization signal generating unit 162, and the system information generating unit 163. The encoding and modulating unit 166 performs an encoding process and a modulating process on the input signals. Further, the encoding and modulating unit 166 maps each of the input signals over a radio frame, a slot, or a subframe. The encoding and modulating unit 166 outputs the mapped signals to the transmission radio unit 165.

The transmission radio unit 165 receives an input of each of the signals mapped over a radio frame, a slot, or a subframe, from the encoding and modulating unit 166. After that, the transmission radio unit 165 converts the frequency of each of the mapped signals into a radio frequency. Furthermore, the transmission radio unit 165 amplifies the mapped signals. Subsequently, the transmission radio unit 165 transmits the mapped signals to the communication terminal 3, via an antenna.

Figure 8:
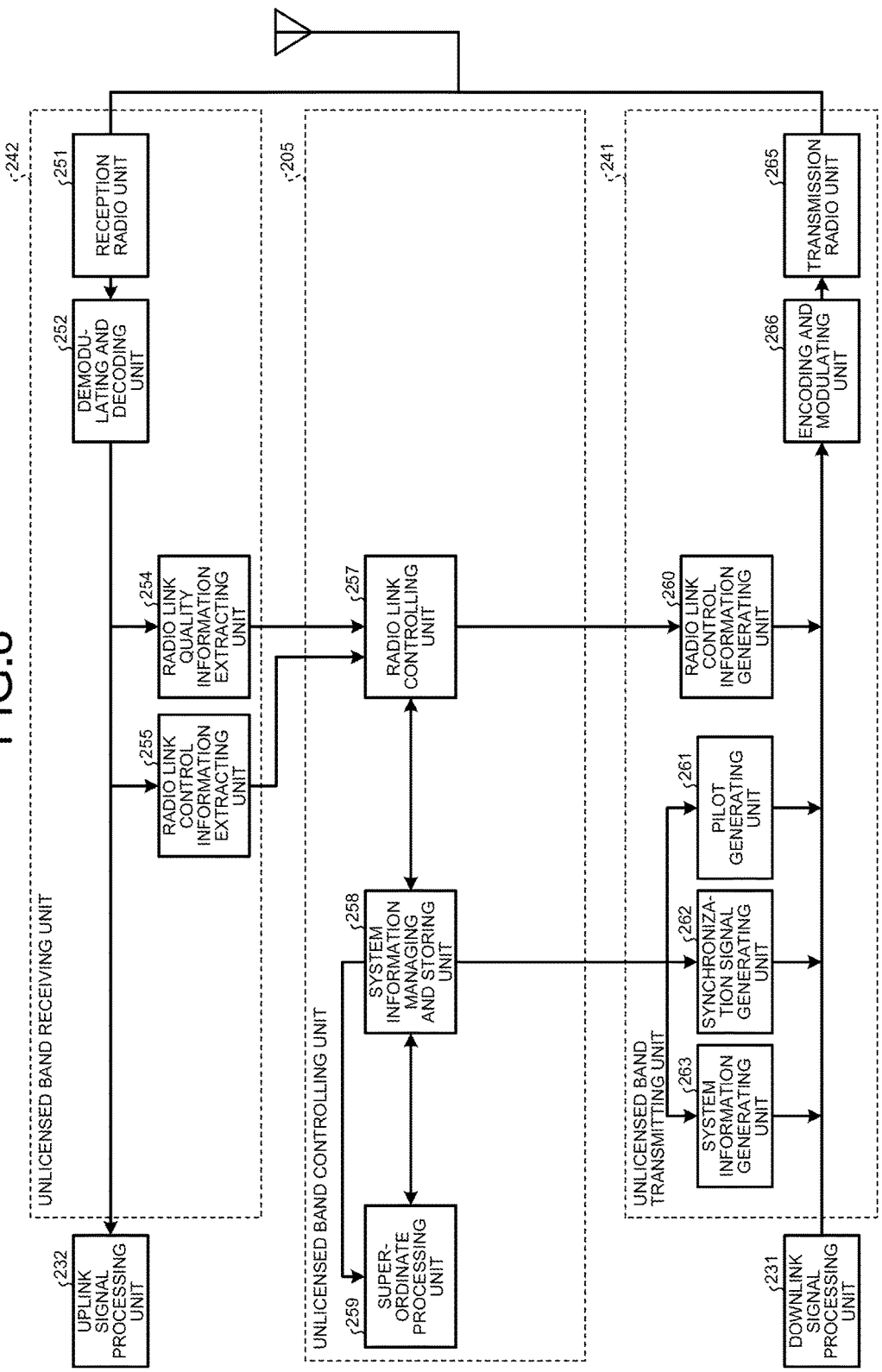
FIG. 8 is a block diagram illustrating details of a physical layer processing unit and an unlicensed band controlling unit.

Next, details of the physical layer processing unit 204 included in the base station 2 will be explained, with reference to FIG. 8. FIG. 8 is a block diagram illustrating details of the physical layer processing unit and the unlicensed band controlling unit. For the unlicensed band controlling unit 205, however, FIG. 8 illustrates only some of the functions in detail that are involved in the physical layer processing processes. The base station 2 performs the following processes on the SCell.

The unlicensed band receiving unit 242 includes a reception radio unit 251, a demodulating and decoding unit 252, a radio link quality information extracting unit 254, and a radio link control information extracting unit 255.

The reception radio unit 251 receives a signal sent from the communication terminal 3 via an antenna. After that, the reception radio unit 251 amplifies the received signal and further converts the signal on a radio frequency to a baseband signal. After that, the reception radio unit 251 outputs the signal converted into the baseband signal to the demodulating and decoding unit 252.

The demodulating and decoding unit 252 receives an input of the signal from the reception radio unit 251. After that, the demodulating and decoding unit 252 performs a demodulating process on the received signal. Further, the demodulating and decoding unit 252 performs a decoding process on the signal resulting from the demodulating process. After that, the demodulating and decoding unit 252 outputs the signal resulting from the processes, to the uplink signal processing unit 232.

The radio link quality information extracting unit 254 extracts radio link quality information including an RSRP level from the signal sent from the demodulating and decoding unit 252. After that, the radio link quality information extracting unit 254 outputs the extracted radio link quality information to a radio link controlling unit 257.

The radio link control information extracting unit 255 extracts a radio link control signal including a random access preamble, from the signal sent from the demodulating and decoding unit 252. Subsequently, the radio link control information extracting unit 255 obtains the random access preamble from the radio link control signal. After that, the radio link control information extracting unit 255 outputs the random access preamble to the radio link controlling unit 257.

Subsequently, the radio link control information extracting unit 255 extracts an input of a scheduled transmission sent from the communication terminal 3 as a response to the random access preamble, from the signal sent from the demodulating and decoding unit 252. After that, the radio link control information extracting unit 255 outputs the scheduled transmission to the radio link controlling unit 257.

The unlicensed band controlling unit 205 includes the radio link controlling unit 257, a system information managing and storing unit 258, and a upper layer processing unit 259.

The radio link controlling unit 257 receives a request for the control information used for establishing a radio link such as a dedicated preamble from the radio link control information extracting unit 255. After that, the radio link controlling unit 257 outputs the control information used for establishing a radio link to a radio link control information generating unit 260. Further, the radio link controlling unit 257 obtains a system information request from within the request for the control information used for establishing a radio link. After that, the radio link controlling unit 257 outputs the system request to a system information generating unit 263 via the system information managing and storing unit 258.

Further, when having determined that a radio link quality measuring process that is not compliant with the measuring periodic cycle is to be performed, the radio link controlling unit 257 notifies the radio link control information generating unit 260 of the radio link quality measuring process. In that situation, the radio link controlling unit 257 transmits conditions for measuring the radio link quality to the radio link control information generating unit 260.

In response to the request for the aperiodic radio link quality measuring process, the radio link controlling unit 257 receives an input of a radio link quality measuring and calculating result from the radio link control information extracting unit 255. After that, on the basis of the obtained radio link quality, the radio link controlling unit 257 selects a communication terminal to which downlink data is to be transmitted. In the present example, a situation will be explained in which the radio link controlling unit 257 selects the communication terminal 3. After that, the radio link controlling unit 257 selects a data volume, a radio resource to be used, a modulation method to be used, an encoding ratio, and/or the like that are to be applied when the downlink data is transmitted to the communication terminal 3. Subsequently, the radio link controlling unit 257 outputs the selection results to the radio link control information generating unit 260.

Further, the radio link controlling unit 257 receives inputs of pilot signals transmitted from communication terminals including the communication terminal 3, from the radio link control information extracting unit 255. After that, the radio link controlling unit 257 measures and calculates uplink radio link quality from the received pilot signals. Subsequently, on the basis of the radio link quality, the radio link controlling unit 257 selects a communication terminal that is to perform an uplink data transfer. In the present example, a situation will be explained in which the radio link controlling unit 257 selects the communication terminal 3 as a communication terminal that is to perform the uplink data transfer, on the basis of the radio link quality.

Subsequently, the radio link controlling unit 257 selects a data volume, a radio resource to be used, a modulation method to be used, an encoding ratio, and/or the like that are to be applied when the communication terminal 3 transmits the uplink data. Subsequently, the radio link controlling unit 257 outputs the selection results to the radio link control information generating unit 260.

The upper layer processing unit 259 performs a controlling process over the PDCP processing unit 201, the RLC processing unit 202, and the MAC processing unit 203.

The unlicensed band transmitting unit 241 includes the radio link control information generating unit 260, a pilot generating unit 261, a synchronization signal generating unit 262, the system information generating unit 263, a transmission radio unit 265, and an encoding and modulating unit 266.

The radio link control information generating unit 260 receives the notification about the radio link quality measuring process that is not compliant with the measuring periodic cycle, from the radio link controlling unit 257. In that situation, the radio link control information generating unit 260 also obtains the conditions for measuring the radio link quality, from the radio link controlling unit 257. After that, the radio link control information generating unit 260 generates a radio link measuring request by using the conditions for measuring the radio link quality. Subsequently, the radio link control information generating unit 260 outputs the generated radio link measuring request to the encoding and modulating unit 266 so as to transmit the request to the communication terminal 3.

Further, the radio link control information generating unit 260 receives, from the radio link controlling unit 257, an input of selection results regarding the data volume, the radio resource to be used, the modulation method to be used, the encoding ratio, and/or the like that are to be applied when the downlink data is transmitted to the communication terminal 3. After that, the radio link control information generating unit 260 generates downlink control information including the selection results. Subsequently, the radio link control information generating unit 260 outputs the generated downlink control information including the selection results to the encoding and modulating unit 266 so as to transmit the downlink control information to the communication terminal 3.

Further, the radio link control information generating unit 260 receives, from the radio link controlling unit 257, an input of selection results regarding the data volume, the radio resource to be used, the modulation method to be used, the encoding ratio, and/or the like that are to be applied when the communication terminal 3 transmits the uplink data. After that, the radio link control information generating unit 260 generates uplink control information including the selection results. Subsequently, the radio link control information generating unit 260 outputs the generated uplink control information including the selection results to the encoding and modulating unit 266 so as to transmit the uplink control information to the communication terminal 3.

The system information managing and storing unit 258 stores therein and manages the conditions for measuring the radio link quality, the cell selection information, the neighboring cell information, the MBSFN-related information, the network identification information, the CA-related information, and/or the like.

The system information generating unit 263 receives the system information request from the radio link controlling unit 257 via the system information managing and storing unit 258. After that, the system information generating unit 263 obtains information such as the network identification information from the system information managing and storing unit 258. Further, the system information generating unit 263 generates system information by using the obtained network identification information and the like. Subsequently, the system information generating unit 263 outputs the generated system information including the network identification information to the encoding and modulating unit 266 so as to transmit the system information to the base station 1.

Further, the system information generating unit 263 obtains the conditions for measuring the radio link quality from the system information managing and storing unit 258. After that, the system information generating unit 263 generates the obtained measuring conditions for measuring the radio link quality, into system information. Subsequently, the system information generating unit 263 outputs the generated system information including the measuring conditions for measuring the radio link quality to the encoding and modulating unit 266 so as to transmit the system information to the base station 1.

The synchronization signal generating unit 262 obtains the cell IDs of peripheral cells of the communication terminal 3, from the system information managing and storing unit 258. After that, the synchronization signal generating unit 262 calculates a synchronization signal (a synchronization signal sequence). Subsequently, the synchronization signal generating unit 262 outputs the generated synchronization signal to the encoding and modulating unit 266, so as to transmit the synchronization signal to the communication terminal 3.

After the unlicensed band use notification is transmitted to the communication terminal 3, the pilot generating unit 261 calculates a pilot signal (a pilot signal sequence). After that, the pilot generating unit 261 outputs the generated pilot signal to the encoding and modulating unit 266, so as to transmit the pilot signal to the communication terminal 3.

It is noted, however, that the base station 2 using an unlicensed band performs processes that are different from those performed in a cell using a licensed band. The unlicensed band may also be used by another system. Accordingly, when an unlicensed band is used, i.e., when a transmission is performed by using a frequency in an unlicensed band, it is checked to see whether the frequency is not being used. More specifically, the radio link controlling unit 257 receives, from the radio link quality information extracting unit 254, an input of radio link quality information of the signal received by the reception radio unit 251 on a frequency in the unlicensed band. After that, the radio link controlling unit 257 judges whether or not such a radio signal that is not noise and is significant is present in the signal received on the frequency in the unlicensed band. For example, the radio link controlling unit 257 determines that a significant radio signal is present, i.e., the frequency is being used by another party, when a Received Signal Strength Indicator (RSSI) obtained by using an amplifier is equal to or larger than a threshold value or when the output of a wave detector is equal to or larger than a threshold value. In that situation, the radio link controlling unit 257 does not perform transmission using the frequency for a certain period of time. The "significant radio signal" means that the signal is not noise such as thermal noise.

When having determined that the unlicensed band is being used by another party and that transmission is impossible, the radio link controlling unit 257 further checks to see whether or not another frequency in the unlicensed band is similarly being used by another party. Alternatively, the radio link controlling unit 257 may check to see whether or not the frequency is similarly being used by another party when a predetermined period of time has elapsed. The predetermined period of time may be regulated as certain time intervals by law.

On the contrary, when having determined that the unlicensed band is not being used by any other party, the radio link controlling unit 257 instructs the synchronization signal generating unit 262 and the pilot generating unit 261, via the system information managing and storing unit 258, to transmit (to broadcast) the synchronization signal and the pilot. The method of confirming prior to transmission, in this manner, that no collision will occur is called "Listen before Talk (LBT)" or "CSMA/CA".

The encoding and modulating unit 266 receives inputs of various types of signals from the downlink signal processing unit 231, the radio link control information generating unit 260, the pilot generating unit 261, the synchronization signal generating unit 262, and the system information generating unit 263. The encoding and modulating unit 266 performs an encoding process and a modulating process on the input signals. Further, the encoding and modulating unit 266 maps each of the input signals over a radio frame, a slot, or a subframe. The encoding and modulating unit 266 outputs the mapped signals to the transmission radio unit 265.

The transmission radio unit 265 receives an input of each of the signals mapped over a radio frame, a slot, or a subframe, from the encoding and modulating unit 266. After that, the transmission radio unit 265 converts the frequency of each of the mapped signals into a radio frequency. Furthermore, the transmission radio unit 265 amplifies the mapped signals. Subsequently, the transmission radio unit 265 transmits the mapped signals to the communication terminal 3, via an antenna.

In the explanation above, the data transfer is controlled in the same manner for both the PCell and the SCell. However, another arrangement is also acceptable in which the user data is not transferred in the PCell, whereas the user data is transferred only in the SCell. Yet another arrangement is also acceptable in which the system information is transferred only in the PCell, whereas the system information is not transferred in the SCell.

Figure 9:
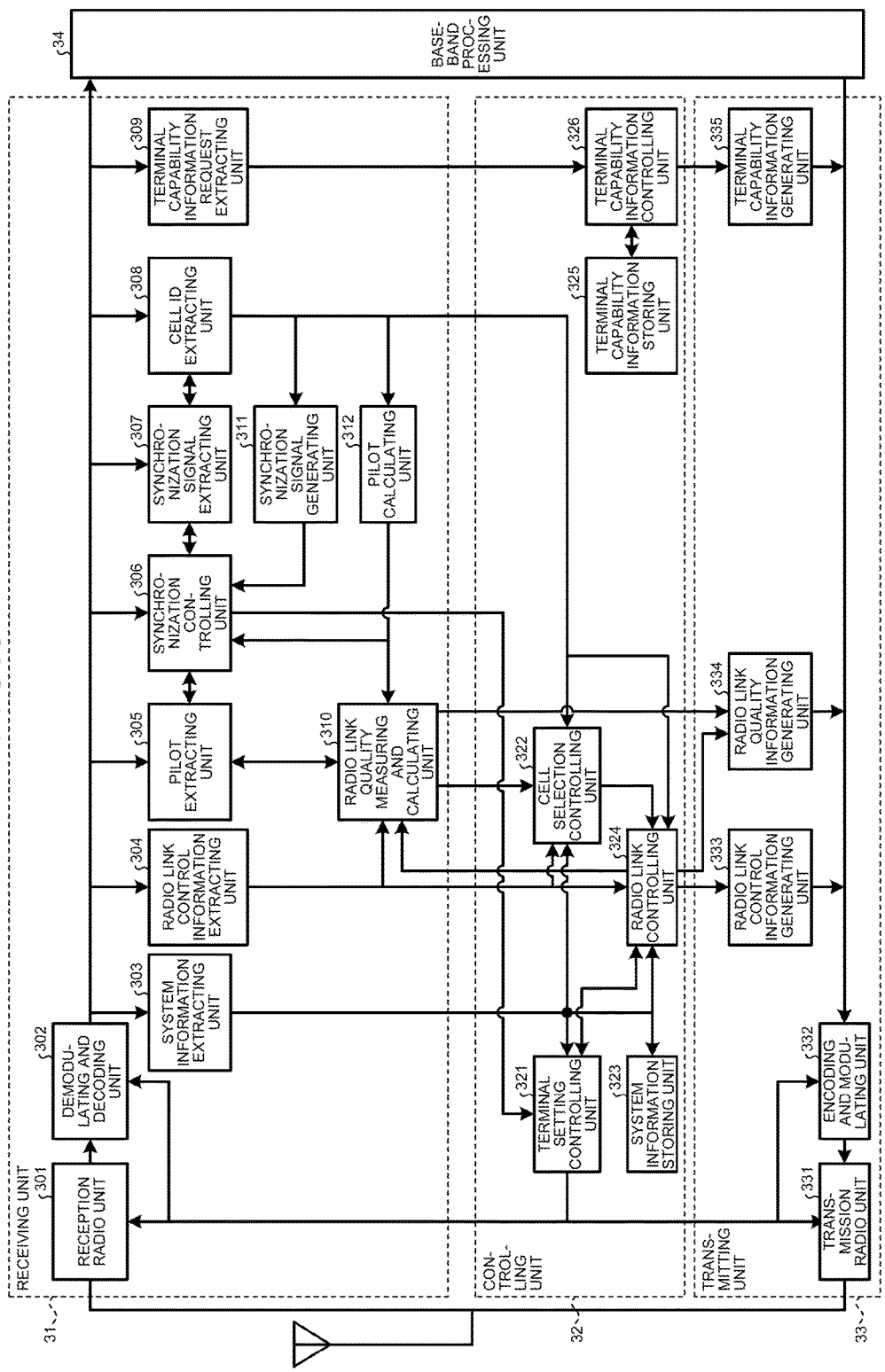
FIG. 9 is a block diagram illustrating a communication terminal.

Next, the communication terminal 3 will be explained with reference to FIG. 9. FIG. 9 is a block diagram illustrating the communication terminal. The communication terminal 3 includes a receiving unit 31, a controlling unit 32, a transmitting unit 33, and a baseband processing unit 34. Another arrangement is also acceptable in which the system information is transferred only in the PCell, whereas the system information is not transferred in the SCell.

The receiving unit 31 includes a reception radio unit 301, a demodulating and decoding unit 302, a system information extracting unit 303, a radio link control information extracting unit 304, a pilot extracting unit 305, a synchronization controlling unit 306, and a synchronization signal extracting unit 307. Further, the receiving unit 31 includes a cell ID extracting unit 308, a terminal capability information request extracting unit 309, a radio link quality measuring and calculating unit 310, a synchronization signal generating unit 311, and a pilot calculating unit 312.

The reception radio unit 301 receives signals sent from the base stations 1 and 2 via an antenna. In this situation, the reception radio unit 301 receives, from a terminal setting controlling unit 321, an instruction about the frequency band to be received. After that, the reception radio unit 301 amplifies the received signal and further converts the signal at a radio frequency into a baseband signal. After that, the reception radio unit 301 outputs the signal converted into the baseband signal to the demodulating and decoding unit 302.

The demodulating and decoding unit 302 receives an input of the signal from the reception radio unit 301. After that, the demodulating and decoding unit 302 performs a demodulating process on the received signal. Further, the demodulating and decoding unit 302 performs a decoding process on the signal resulting from the demodulating process. By using either predetermined modulating and encoding schemes or methods corresponding to modulating and encoding schemes instructed by the terminal setting controlling unit 321, the demodulating and decoding unit 302 performs the demodulating process and the decoding process. After that, the demodulating and decoding unit 302 outputs the signal resulting from the processes, to the baseband processing unit 34.

The system information extracting unit 303 extracts the system information regularly transmitted from the base station 1 or 2, from the signal sent from the demodulating and decoding unit 302. After that, the system information extracting unit 303 stores the extracted system information into a system information storing unit 323. Further, the system information extracting unit 303 outputs the extracted system information to the terminal setting controlling unit 321, a cell selection controlling unit 322, and a radio link controlling unit 324.

The radio link control information extracting unit 304 extracts control information of Layer 1 (L1)/Layer 2 (L2) transmitted by the base station 1 or 2 while using PDCCH, from the signal sent from the demodulating and decoding unit 302. The control information includes information indicating an allocation of uplink (UL) radio resources and the modulating and encoding schemes that are applied. Also, the control information includes an unlicensed band use notification. Further, the radio link control information extracting unit 304 outputs the extracted control information to the radio link controlling unit 324.

Further, the radio link control information extracting unit 304 extracts the radio link quality measuring request from the signal sent from the demodulating and decoding unit 302. After that, the radio link control information extracting unit 304 outputs the extracted radio link quality measuring request to the radio link controlling unit 324.

Further, the radio link control information extracting unit 304 extracts a radio link control request transmitted from the base station 1 or 2, from the signal sent from the demodulating and decoding unit 302. After that, the radio link control information extracting unit 304 outputs the radio link control request to the radio link quality measuring and calculating unit 310 and the radio link controlling unit 324.

On the basis of the timing of the radio frame or the slot detected by the synchronization controlling unit 306. The pilot extracting unit 305 extracts the pilot signal from the signal sent from the demodulating and decoding unit 302. After that, the pilot extracting unit 305 outputs the extracted pilot signal to the synchronization controlling unit 306 and the radio link quality measuring and calculating unit 310. For example, when an LTE system is used, the pilot signal is a Reference Signal (RS).

The synchronization signal extracting unit 307 extracts the synchronization signals transmitted by the base station 1 as the PSS and the SSS, from the signal sent from the demodulating and decoding unit 302 for each of the CCs. After that, the synchronization signal extracting unit 307 outputs the synchronization signals to the cell ID extracting unit 308 and the synchronization controlling unit 306.

The synchronization controlling unit 306 detects the timing of the radio frame and the timing of the slot on the basis of the synchronization signals extracted by the synchronization signal extracting unit 307. After that, the synchronization controlling unit 306 notifies the terminal setting controlling unit 321 and the pilot extracting unit 305 of the detected timing of the radio frame and the slot. Further, the synchronization controlling unit 306 feeds the detected timing of the radio frame and the slot back to the synchronization signal extracting unit 307.

Further, the synchronization controlling unit 306 receives an input of the pilot calculated by the pilot calculating unit 312. After that, on the basis of the pilot signal extracted by the pilot extracting unit 305 and the pilot calculated by the pilot calculating unit 312, the synchronization controlling unit 306 performs a symbol synchronization process. The symbol synchronization process is to realize synchronization by using the timing at the head of symbols.

The cell ID extracting unit 308 receives an input of the synchronization signals from the synchronization signal extracting unit 307. Subsequently, the cell ID extracting unit 308 identifies the cell ID from the PSS and the SSS used by the base station 1. More specifically, on the basis of the two synchronization signals, namely the PSS and the SSS transmitted from the base station 1, the cell ID extracting unit 308 is able to derive the cell ID. After that, the cell ID extracting unit 308 outputs the identified cell ID to the synchronization signal generating unit 311, the pilot calculating unit 312, and the cell selection controlling unit 322.

The synchronization signal generating unit 311 receives an input of the cell ID from the cell ID extracting unit 308. Further, the synchronization signal generating unit 311 generates a synchronization signal on the basis of the obtained cell ID. Subsequently, the synchronization signal generating unit 311 outputs the generated synchronization signal to the synchronization controlling unit 306.

The pilot calculating unit 312 receives an input of the cell ID from the cell ID extracting unit 308. After that, on the basis of the obtained cell ID, the pilot calculating unit 312 calculates a pilot. Further, the pilot calculating unit 312 outputs the calculated pilot to the synchronization controlling unit 306 and the radio link quality measuring and calculating unit 310.

Next, a synchronization process will be explained in detail. In the following sections, an example in which the communication terminal 3 synchronizes with the base station 1 will be explained. For the radio link quality measuring process performed by the radio link quality measuring and calculating unit 310, the synchronization controlling unit 306 performs, in advance, a synchronization process to synchronize with the base station 1 subject to the measuring process. The synchronization process is performed for the purpose of discriminating the pilot signal from other signals or identifying the pilot signal itself.

According to a synchronization method, the synchronization controlling unit 306 identifies the head of the radio frame on the basis of the synchronization signals transmitted from the base station 1. This process may be referred to as a frame synchronization process. Further, by using the synchronization signals, the synchronization controlling unit 306 identifies the head of the radio frame or the head of subframes or the head of slots structuring the radio frame. The process of identifying the head of the subframes or the head of the slots structuring the radio frame may be referred to as a frame synchronization process or a slot synchronization process.

According to a synchronization signal generating method that is shared in advance between the base station 1 and the communication terminal 3, the synchronization controlling unit 306 identifies a synchronization signal sequence by calculating a correlation between the synchronization signal generated by the synchronization signal generating unit 311 and the synchronization signals received from the base station 1 and further finds the head of the sequence. As a result, the synchronization controlling unit 306 calculates the head of the frames or the slots. In this situation, the synchronization signal is usually structured with a plurality of signals and is a signal sequence that is not structured with one signal (one symbol) but is structured with a plurality of symbols. For example, in an LTE system, the communication terminal 3 is able to either calculate or identify cell information by identifying the synchronization signal sequence. In the present example, the synchronization signal sequence includes a CCell ID and a Physical Cell Identification (PCell-ID).

Further, the synchronization controlling unit 306 performs a symbol synchronization process by using the pilot signal. In this situation, the method for calculating the pilot signal sequence is shared in advance between the base station 1 and the communication terminal 3, similarly to the process of identifying the synchronization signal. After that, the synchronization controlling unit 306 performs a symbol synchronization process by making a comparison and calculating a correlation between the pilot signal received from the base station 1 and the pilot calculated by the pilot calculating unit 312.

In an LTE system, the pilot calculating unit 312 is able to calculate the pilot signal on the basis of the cell ID derived from the synchronization signal by the cell ID extracting unit 308. It is therefore possible to shorten the time period spent on the symbol synchronization process. In other words, the time period spent on the symbol synchronization process would become longer, if the cell ID were not derived by receiving the synchronization signal.

Further, when having received an instruction to execute the synchronization process from the radio link quality measuring and calculating unit 310, the pilot extracting unit 305, the synchronization controlling unit 306, and the synchronization signal extracting unit 307 perform the synchronization process by receiving synchronization signals and pilot signals from peripheral cells.

From the signal sent from the demodulating and decoding unit 302, the terminal capability information request extracting unit 309 extracts the terminal capability information request transmitted from the base station 1. After that, the terminal capability information request extracting unit 309 outputs the extracted terminal capability information request to a terminal capability information controlling unit 326.

The radio link quality measuring and calculating unit 310 receives an input of the pilot calculated by the pilot calculating unit 312. Further, the radio link quality measuring and calculating unit 310 receives an input of the pilot signal from the pilot extracting unit 305. After that, by using the obtained pilot signal and the pilot calculated by the pilot calculating unit 312, the radio link quality measuring and calculating unit 310 measures the radio link quality. In this situation, as the radio link quality, the radio link quality measuring and calculating unit 310 measures, for example, a pilot reception power level (RSRP), a pilot reception quality level (RSRQ), radio link quality (channel quality), and a Signal to Interference Ratio (SIR) and further calculates the radio link quality from the measuring results. As an index indicating the reception quality, for example, a radio link quality index called a Channel Quality Indicator (CQI) or a Signal to Interference and Noise Ratio (SINR) may be used. After that, the radio link quality measuring and calculating unit 310 notifies a radio link quality information generating unit 334 of the measuring and calculating result of the radio link quality. Further, the radio link quality measuring and calculating unit 310 feeds the measuring and calculating result of the radio link quality back to the pilot extracting unit 305.

Further, by using the pilot signal, the radio link quality measuring and calculating unit 310 measures a reception power level (a reception electric field strength). After that, the radio link quality measuring and calculating unit 310 notifies the cell selection controlling unit 322 of the measuring result.

In an LTE system, defined as pilot signals are: a common-to-cell pilot signal that is common to a plurality of terminals in the cell (called a Cell-specific Reference Signal [CRS]) and an individual pilot signal assigned to each individual terminal (called a Dedicated Reference Signal [DRS]). Further, in an LTE system, a pilot signal used for measuring positions (called a Positioning Reference Signal [PRS]) and a pilot used for measuring radio link quality (radio link state information) (called a Channel State Information Reference Signal [CSI RS]) are defined. In this situation, the common pilot may be referred to as a common reference signal, a cell-specific pilot, or a common pilot. Further, the individual pilot may be referred to as a dedicated pilot or a UE-specific RS. Further, the pilot used for measuring positions may be referred to as a positioning pilot or a positioning RS. Further, the pilot signal used for measuring the radio link quality may be referred to as a channel state information pilot.

The radio link quality measuring and calculating unit 310 may perform the measuring and calculating process by using any of these pilot signals. In other words, the radio link quality measuring and calculating unit 310 may measure and calculate the radio link quality by using a known signal, i.e., a signal that is determined in advance either between the base station 1 or 2 and the communication terminal 3 or in the radio communication system.

Regular pilot signals may be a signal used for the purpose of demodulation or a signal used for the purpose of measuring radio link quality. The signal used for the purpose of demodulation may be referred to as an individual pilot signal. Further, the signal used for the purpose of measuring radio link quality may be referred to as a common pilot signal.

Either when the radio link control request is obtained from the radio link control information extracting unit 304 or when a periodic cycle to measure the radio link quality has arrived, the radio link quality measuring and calculating unit 310 instructs the synchronization controlling unit 306 and the synchronization signal extracting unit 307 to perform the synchronization process, via the pilot extracting unit 305.

The controlling unit 32 includes the terminal setting controlling unit 321, the cell selection controlling unit 322, the system information storing unit 323, the radio link controlling unit 324, a terminal capability information storing unit 325, and the terminal capability information controlling unit 326.

The terminal setting controlling unit 321 receives an input of the system information from the system information extracting unit 303. Further, the terminal setting controlling unit 321 exercises control as described below, on the basis of the system information.

On the basis of the control information designated by the radio link controlling unit 324, the terminal setting controlling unit 321 judges the radio resource allocated to the communication terminal 3, and also, judges the modulating and encoding schemes being applied. After that, the terminal setting controlling unit 321 controls operations of the reception radio unit 301, the demodulating and decoding unit 302, a transmission radio unit 331, and an encoding and modulating unit 332.

Further, the terminal setting controlling unit 321 receives the unlicensed band use notification from the radio link controlling unit 324. After that, the terminal setting controlling unit 321 determines that the communication terminal 3 is to use a radio resource in an unlicensed band. After that, the terminal setting controlling unit 321 configures a frequency setting corresponding to the unlicensed band into the reception radio unit 301, the demodulating and decoding unit 302, the transmission radio unit 331, and the encoding and modulating unit 332.

The cell selection controlling unit 322 receives an input of the system information from the system information extracting unit 303. After that, the cell selection controlling unit 322 exercises control as described below, on the basis of the system information. In this situation, the cell selection controlling unit 322 may obtain, prior to the selecting of a cell, the control information indicating the measured bandwidth and the priority level for selecting cells from the received system information, so as to use the obtained pieces of information for the selecting of a cell.

The cell selection controlling unit 322 receives an input of the measuring and calculating result of the radio link quality from the radio link quality measuring and calculating unit 310. Further, the cell selection controlling unit 322 receives an input of the cell ID from the cell ID extracting unit 308. Further, the cell selection controlling unit 322 obtains the control information of the communication terminal 3 extracted by the radio link control information extracting unit 304.

By using the measuring and calculating result of the radio link quality, the cell IDs, and the control information of the communication terminal 3 that were input thereto, the cell selection controlling unit 322 identifies the cell ID of a cell having the best radio link quality. More specifically, the cell selection controlling unit 322 performs the cell selecting process by using at least one selected from between the RSRP and the RSRQ described above which were measured by the radio link quality measuring and calculating unit 310. Further, the cell selection controlling unit 322 outputs the cell ID of the selected cell to the radio link controlling unit 324. In this situation, the cell selection controlling unit 322 repeatedly performs the cell selecting process until a cell satisfying cell selection conditions is found. In the present embodiment, an example will be explained in which the cell selection controlling unit 322 selects the cell 10 of the base station 1.

For example, in an LTE system, the cell selection controlling unit 322 selects a base station having the best radio link quality by using the RSRP and the RSRQ. The cell 10 to which a link connection as the first link is made by the cell selection controlling unit 322 will serve as a PCell. Subsequently, the communication terminal 3 performs a standby process and a link connecting process in the cell 10. In a W-CDMA system or an LTE system, the standby process is called a "camp on" process. Further, the radio communication system according to the present embodiment performs a CA process, so that the cell selection controlling unit 322 selects and makes a connection as the second link, to the cell 20 which will serve as an SCell.

The radio link controlling unit 324 obtains the cell ID extracted by the cell ID extracting unit 308. Further, the radio link controlling unit 324 obtains the control information extracted by the radio link control information extracting unit 304. Further, the radio link controlling unit 324 receives an input of the cell ID of the cell selected as a connection destination, from the cell selection controlling unit 322. Further, the radio link controlling unit 324 receives an input of the system information from the system information extracting unit 303. After that, the radio link controlling unit 324 exercises control as described below, on the basis of the system information.

For example, the radio link controlling unit 324 receives an input of the cell ID from the radio link control information extracting unit 304. After that, the radio link controlling unit 324 judges whether or not the cell ID provided in the notification issued by the base station 1 or 2 is the same as the calculated cell ID. When the two cell IDs are the same as each other, the radio link controlling unit 324 stores information about the cell into the system information storing unit 323.

After that, when a connection is to be made to a licensed band, the radio link controlling unit 324 instructs the radio link quality information generating unit 334 to generate radio link quality information.

In contrast, when a connection is to be made to an unlicensed band, the radio link controlling unit 324 obtains, from the system information extracting unit 303, the system information broadcast from the cell 20 having the cell ID obtained from the radio link control information extracting unit 304. After that, the radio link controlling unit 324 compares network identification information received from the cell 10 with network identification information received from the cell 20. When the network identification information from the cell 10 is not the same as the network identification information from the cell 20, the radio link controlling unit 324 notifies the radio link quality measuring and calculating unit 310 that radio link quality of a cell in another unlicensed band is to be measured.

On the contrary, when the network identification information from the cell 10 is the same as the network identification information from the cell 20, the radio link controlling unit 324 instructs the radio link quality information generating unit 334 to generate radio link quality information.

Further, as the control information extracted by the radio link control information extracting unit 304, the radio link controlling unit 324 obtains the control information related to random access. After that, when data to be transmitted has accrued during a standby in the cell 10 (i.e., when a call is to be made), the radio link controlling unit 324 controls implementation of the random access on the basis of the control information related to the random access. More specifically, the radio link controlling unit 324 selects a random access preamble from among a plurality of preambles determined in advance. After that, the radio link controlling unit 324 transmits the selected random access preamble to the base station 1.

Subsequently, as the control information extracted by the radio link control information extracting unit 304, the radio link controlling unit 324 obtains a random access response. After that, the radio link controlling unit 324 exercises control to transmit a scheduled transmission according to the random access response. Subsequently, the radio link controlling unit 324 instructs a radio link control information generating unit 333 to generate the scheduled transmission.

Further, when having received, from the radio link control information extracting unit 304, control information used for establishing a radio link, such as the dedicated preamble transmitted from the cell 10 and the control information used for the random access, the radio link controlling unit 324 exercises control as described below. The radio link controlling unit 324 implements random access with the cell 10 or 20 from which a control signal was transmitted, by using the dedicated preamble. When the dedicated preamble is used, because there is no possibility that another communication terminal may use the preamble at the same time, no preamble collision will occur. For this reason, the radio link controlling unit 324 performs a "non-contention based random access procedure", which is different from the "contention based random access procedure" that is performed when the communication terminal 3 selects the preamble as described above. In this situation, a message notifying the terminal of the dedicated preamble transmitted from the cell 10 serves as message 0 and is called a "random access preamble assignment".

The radio link controlling unit 324 instructs the radio link control information generating unit 333 to transmit a random access preamble to the cell 20 by using a dedicated preamble.

The terminal capability information storing unit 325 stores therein information indicating whether or not the communication terminal 3 is capable of using an unlicensed band.

The system information storing unit 323 receives an input of the system information transmitted from the base station 1, from the system information extracting unit 303. After that, the system information storing unit 323 stores the obtained system information therein.

The terminal capability information controlling unit 326 obtains the terminal capability information request extracted by the terminal capability information request extracting unit 309. After that, the terminal capability information controlling unit 326 obtains the information indicating whether or not the communication terminal 3 is capable of using an unlicensed band, from the terminal capability information storing unit 325. Subsequently, the terminal capability information controlling unit 326 instructs a terminal capability information generating unit 335 to transmit the terminal capability information to the base station 1, together with the information indicating whether or not the communication terminal 3 is capable of using an unlicensed band.

The transmitting unit 33 includes the transmission radio unit 331, the encoding and modulating unit 332, the radio link control information generating unit 333, the radio link quality information generating unit 334, and the terminal capability information generating unit 335. The transmitting unit 33 and the receiving unit 31 correspond to examples of the "second communicating unit".

The radio link control information generating unit 333 receives information indicating generation of the scheduled transmission from the radio link controlling unit 324. After that, the radio link control information generating unit 333 generates the scheduled transmission according to the control exercised by the radio link controlling unit 324. Subsequently, the radio link control information generating unit 333 outputs the scheduled transmission to the encoding and modulating unit 332 so as to transmit the scheduled transmission to the base station 1.

Further, when the cell 20 is to be connected, the radio link control information generating unit 333 receives the instruction from the radio link controlling unit 324 instructing that the random access preamble be transmitted by using the dedicated preamble. After that, the radio link control information generating unit 333 transmits the random access preamble to the cell 20 by using the dedicated preamble. In this situation, the contents of the random access preamble may only be the dedicated preamble.

The radio link quality information generating unit 334 receives an input of the measuring result of the radio link quality from the radio link quality measuring and calculating unit 310. Subsequently, the radio link quality information generating unit 334 generates control information (a measuring report) indicating reception quality from the measuring result of the radio link quality. As the measuring report, for example, a Channel Quality Indication (CQI) expressing the reception quality by using a discrete value may be used.

The terminal capability information generating unit 335 receives the instruction from the terminal capability information controlling unit 326 instructing that the terminal capability information be transmitted to the base station 1, together with the unlicensed band use capability/incapability information. After that, the terminal capability information generating unit 335 generates terminal capability information including the unlicensed band use capability/incapability information, according to the instruction. After that, the terminal capability information generating unit 335 outputs the generated terminal capability information to the encoding and modulating unit 332 so as to transmit the terminal capability information to the base station 1.

The encoding and modulating unit 332 receives inputs of signals from the baseband processing unit 34, the radio link control information generating unit 333, the radio link quality information generating unit 334, and the terminal capability information generating unit 335. After that, the encoding and modulating unit 332 encodes each of the received signals. Further, the encoding and modulating unit 332 performs a modulating process on each of the encoded signals. The encoding and modulating unit 332 performs the encoding process and the modulating process by using either predetermined modulating and encoding schemes or methods corresponding to modulating and encoding schemes instructed by the terminal setting controlling unit 321. After that, the encoding and modulating unit 332 outputs the signals resulting from the processes, to the transmission radio unit 331.

The transmission radio unit 331 receives an input of each of the signals processed by the encoding and modulating unit 332. Further, the transmission radio unit 331 receives an instruction about the frequency band used for transmission from the terminal setting controlling unit 321. After that, the transmission radio unit 331 amplifies the signal and further converts the baseband signal into a signal on a radio frequency. After that, the transmission radio unit 331 transmits the signal converted onto the radio frequency to the base stations 1 and 2 via an antenna.

The baseband processing unit 34 receives an input of the baseband signal from the demodulating and decoding unit 302. After that, the baseband processing unit 34 processes the signal in accordance with the processing designated in the received signal. For example, the baseband processing unit 34 stores the data into a storing location designated in the received signal. In another example, the baseband processing unit 34 converts the signal into audio and outputs the audio through a speaker.

When transmitting the signal, the baseband processing unit 34 obtains data according to an instruction input from an operator. For example, the baseband processing unit 34 reads the data from a memory. After that, the baseband processing unit 34 outputs a signal containing the obtained data to the encoding and modulating unit 332. In another example, the baseband processing unit 34 receives an input of audio from a microphone, converts the audio into a signal, and outputs the signal to the encoding and modulating unit 332.

Figure 10:
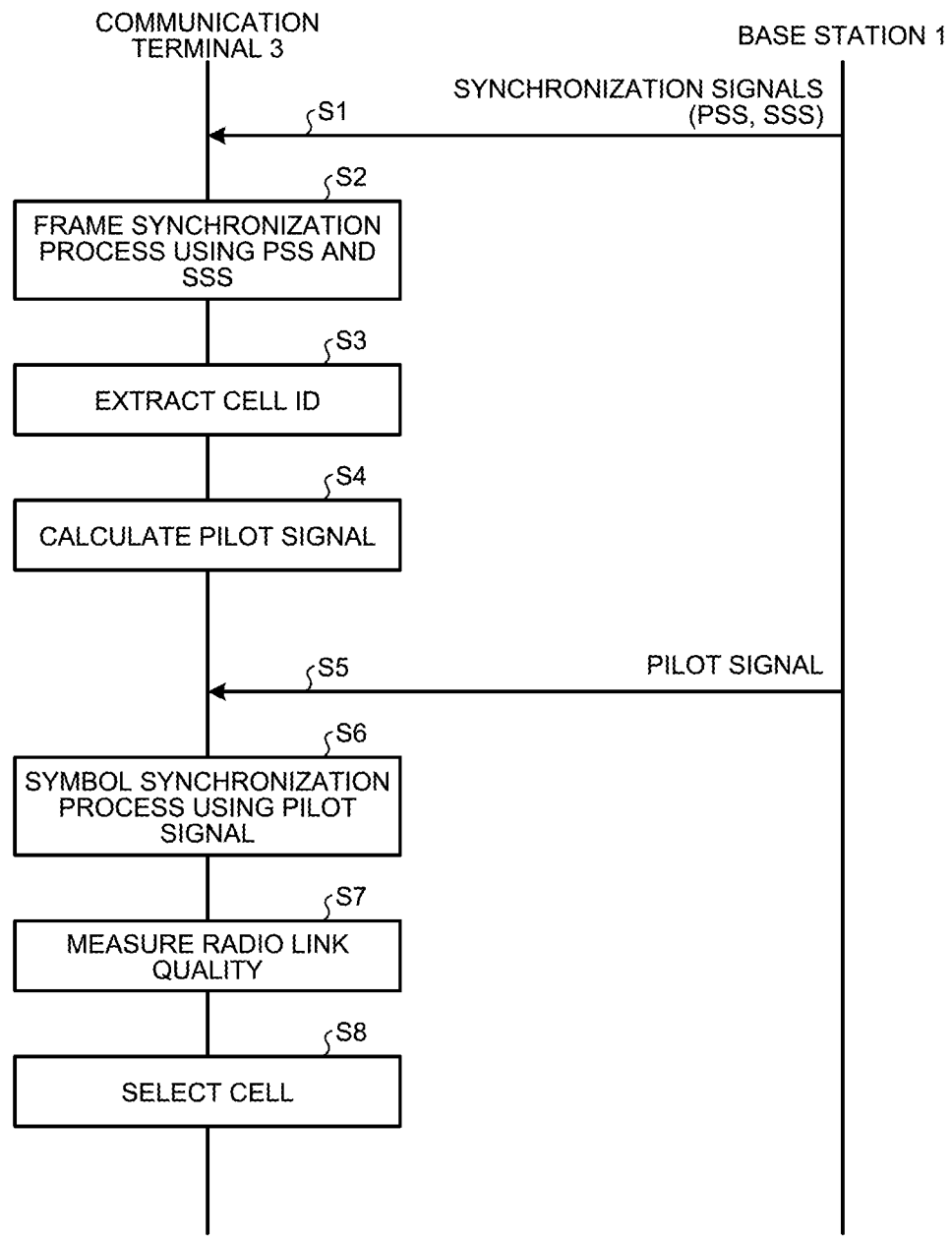
FIG. 10 is a sequence chart of a synchronization process and a radio link quality measuring process.

Next, a flow in the synchronization process and the radio link quality measuring process will be explained with reference to FIG. 10. FIG. 10 is a sequence chart of the synchronization process and the radio link quality measuring process. In the following sections, an example will be explained in which the communication terminal 3 connects to the cell 10 of the base station 1.

The synchronization signal generating unit 162 of the base station 1 transmits a PSS and an SSS serving as synchronization signals, to the communication terminal 3 (step S1).

The synchronization controlling unit 306 included in the communication terminal 3 performs a frame synchronization process by using the PSS and the SSS extracted by the synchronization signal extracting unit 307 (step S2).

Subsequently, the cell ID extracting unit 308 included in the communication terminal 3 extracts a cell ID by using the PSS and the SSS (step S3).

Subsequently, the pilot calculating unit 312 included in the communication terminal 3 calculates a pilot signal on the basis of the cell ID (step S4).

The pilot generating unit 161 included in the base station 1 generates a pilot signal and transmits the generated pilot signal to the communication terminal 3 (step S5).

The synchronization controlling unit 306 included in the communication terminal 3 performs a symbol synchronization process by using the pilot signal extracted by the pilot extracting unit 305 (step S6).

Subsequently, the radio link quality measuring and calculating unit 310 included in the communication terminal 3 measures and calculates radio link quality by using the radio link control information extracted by the radio link control information extracting unit 304 (step S7).

Subsequently, the cell selection controlling unit 322 included in the communication terminal 3 selects a cell to be connected, by using the radio link quality measured and calculated by the radio link quality measuring and calculating unit 310 (step S8).

Figure 11A:
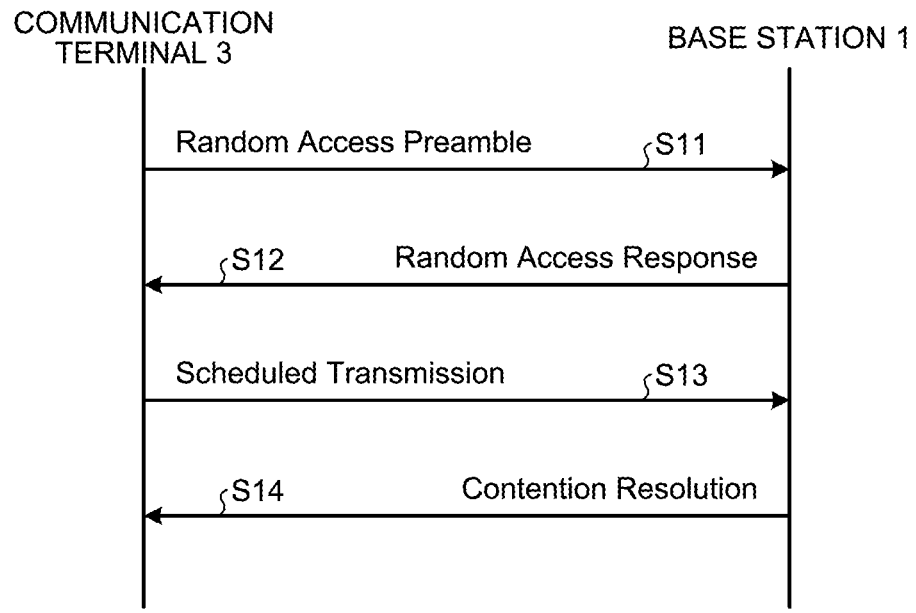
FIG. 11A is a sequence chart of a contention based random access procedure.
Figure 11B:
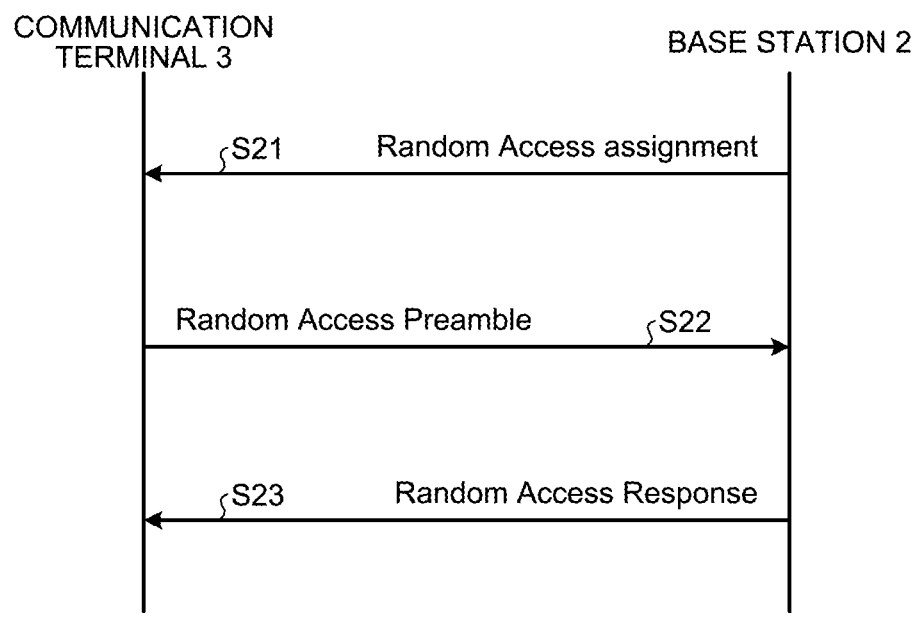
FIG. 11B is a sequence chart of a non-contention based random access procedure.

Next, a flow in random access procedures will be explained with reference to FIGS. 11A and 11B. FIG. 11A is a sequence chart of a contention based random access procedure. FIG. 11B is a sequence chart of a non-contention based random access procedure. In the following sections, the flow will be explained while using the communication terminal 3 and the base stations 1 and 2 as the subjects of the operation. In actuality, however, the functional units described above perform the operation.

When performing the contention based random access procedure, the communication terminal 3 transmits a random access preamble to the base station 1 (step S11).

When having received the random access preamble, the base station 1 transmits a random access response to the communication terminal 3 (step S12).

When having received the random access response, the communication terminal 3 transmits a scheduled transmission to the base station 1 (step S13).

When having received the scheduled transmission, the base station 1 returns a contention resolution to the communication terminal 3 (step S14). As a result, a connection has been established between the communication terminal 3 and the base station 1.

In contrast, when performing a non-contention based random access procedure, the base station 2 transmits a random access assignment to the communication terminal 3 (step S21).

When having received the random access assignment, the communication terminal 3 transmits a random access preamble to the base station 2 (step S22).

When having received the random access preamble, the base station 2 transmits a random access response to the communication terminal 3 (step S23). As a result, a connection has been established between the communication terminal 3 and the base station 2.

Figure 12:
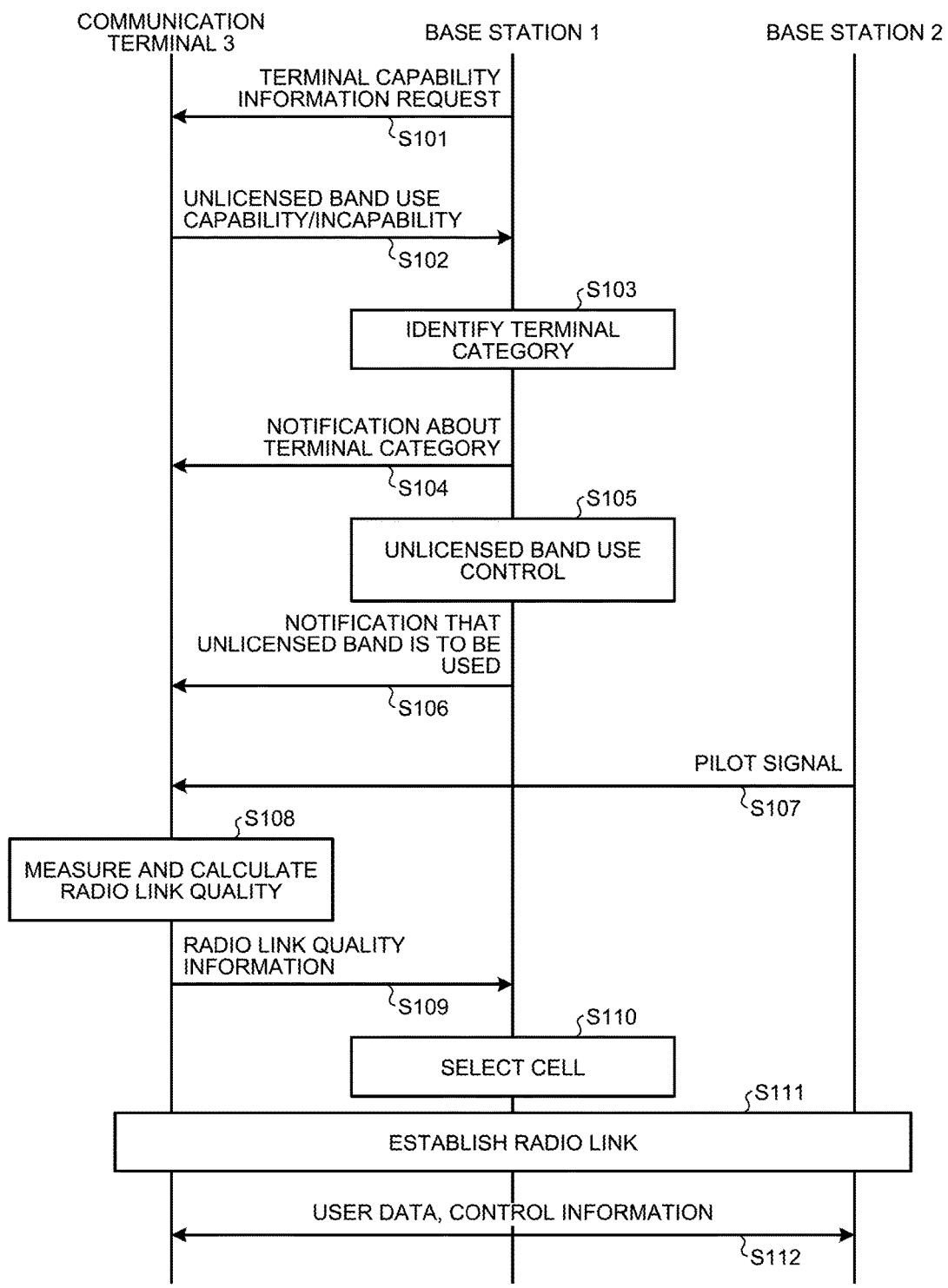
FIG. 12 is a sequence chart of an SCell connection in the radio communication system according to the first embodiment.

Next, a flow in an SCell connection in the radio communication system according to the present embodiment will be explained, with reference to FIG. 12. FIG. 12 is a sequence chart of the SCell connection in the radio communication system according to the first embodiment.

The terminal capability information request generating unit 164 included in the base station 1 transmits a terminal capability information request to the communication terminal 3 (step S101).

The terminal capability information controlling unit 326 included in the communication terminal 3 receives the terminal capability information request extracted by the terminal capability information request extracting unit 309 and obtains the information indicating whether or not the communication terminal 3 is capable of using an unlicensed band, from the terminal capability information storing unit 325. After that, the terminal capability information generating unit 335 generates terminal capability information including the unlicensed band use capability/incapability information provided in the notification issued by the terminal capability information controlling unit 326. Subsequently, the terminal capability information generating unit 335 notifies the base station 1 of the unlicensed band use capability/incapability by transmitting the generated terminal capability information to the base station 1 (step S102). In the following sections, an example will be explained in which the communication terminal 3 is capable of using an unlicensed band.

The radio link controlling unit 157 included in the base station 1 receives the unlicensed band use capability/incapability information from the terminal capability information controlling unit 156. After that, the radio link controlling unit 157 identifies the terminal category of the communication terminal 3 on the basis of the unlicensed band use capability/incapability information (step S103).

Having received an instruction from the radio link controlling unit 157, the radio link control information generating unit 160 included in the base station 1 notifies the communication terminal 3 of the terminal category of the communication terminal 3 (step S104).

Further, the radio link controlling unit 157 included in the base station 1 exercises unlicensed band use control including a process of judging whether or not an unlicensed band is to be used and a process of generating a request to measure the radio link quality of the unlicensed band (step S105). After that, the radio link controlling unit 157 instructs the radio link control information generating unit 160 to notify the communication terminal 3 that an unlicensed band is to be used.

When having received the instruction from the radio link controlling unit 157, the radio link control information generating unit 160 included in the base station 1 generates control information used for issuing a notification that an unlicensed band is to be used. After that, the radio link control information generating unit 160 notifies the communication terminal 3 that an unlicensed band is to be used, by transmitting the generated control information to the communication terminal 3 (step S106).

The pilot generating unit 261 of the base station 2 calculates and generates a pilot signal. After that, the pilot generating unit 261 transmits the pilot signal to the communication terminal 3 (step S107).

By using the pilot signal transmitted from the base station 2, the radio link quality measuring and calculating unit 310 included in the communication terminal 3 measures and calculates the radio link quality to and from the base station 2 (step S108). After that, the radio link quality measuring and calculating unit 310 outputs the measuring and calculating result of the radio link quality to the radio link quality information generating unit 334.

The radio link quality information generating unit 334 generates radio link quality information by using the received measuring and calculating result of the radio link quality. After that, the radio link quality information generating unit 334 transmits the generated radio link quality information to the base station 1 (step S109).

The radio link controlling unit 157 included in the base station 1 obtains the radio link quality information between the communication terminal 3 and the base station 2, from the radio link quality information extracting unit 154. Also, the radio link controlling unit 157 similarly obtains radio link quality information from other peripheral base stations of the communication terminal 3 using an unlicensed band. After that, the radio link controlling unit 157 selects a cell on the basis of the obtained radio link quality information (step S110). In the following sections, an example will be explained in which the radio link controlling unit 157 has selected the base station 2.

When the radio link controlling unit 157 has selected the base station 2, it means that a random access procedure is performed among the base stations 1 and 2 and the communication terminal 3, and a radio link is established to connect the communication terminal 3 and the base station 2 to each other (step S111).

Subsequently, the base station 2 and the communication terminal 3 transmit and receive user data and control information by using the established radio link (step S112).

Figure 13:
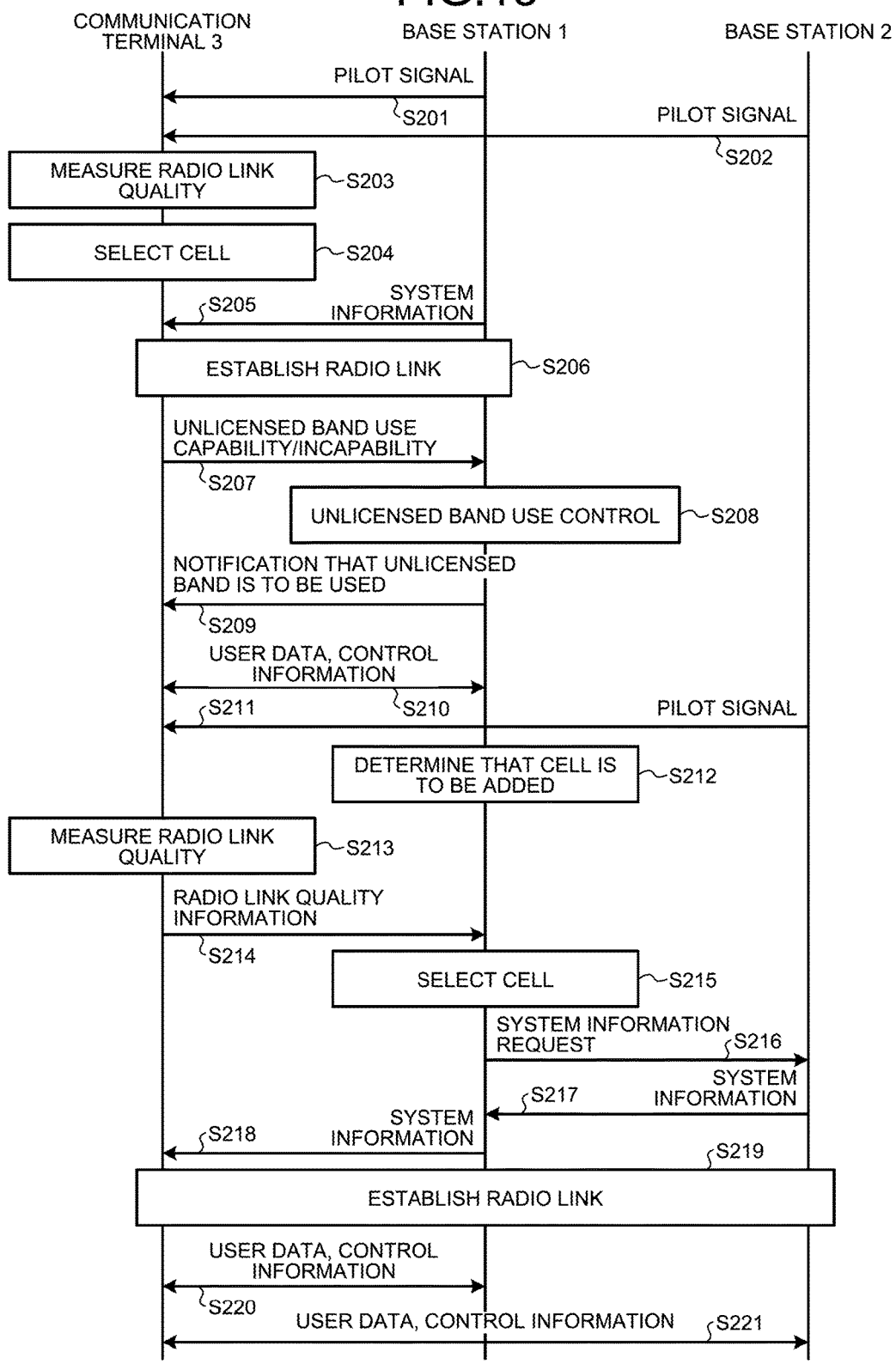
FIG. 13 is a sequence chart illustrating a schematic configuration of a CA process performed in the radio communication system according to the first embodiment.

Next, a flow in a CA process performed in the radio communication system according to the present embodiment will be explained, with reference to FIG. 13. FIG. 13 is a sequence chart illustrating a schematic configuration of the CA process performed in the radio communication system according to the first embodiment. To illustrate the schematic configuration of the flow in the entire CA process, detailed processes such as the synchronization process and the category notifying process, for example, are omitted from FIG. 13.

The pilot generating unit 161 included in the base station 1 generates a pilot signal and transmits the pilot signal to the communication terminal 3 (step S201). Further, the pilot generating unit 261 of the base station 2 generates a pilot signal and transmits the pilot signal to the communication terminal 3 (step S202).

The radio link quality measuring and calculating unit 310 of the communication terminal 3 measures and calculates the radio link quality to and from the base stations 1 and 2 by using the pilot signals transmitted from the base stations 1 and (step S203). The cell selection controlling unit 322 selects a cell by using the measuring and calculating result of the radio link quality obtained by the radio link quality measuring and calculating unit 310 (step S204). In the present example, the cell selection controlling unit 322 selects the cell 10 as a PCell.

After that, the system information generating unit 163 included in the base station 1 transmits the system information to the communication terminal 3 (step S205).

The base station 1 and the communication terminal 3 perform a random access procedure and establish a radio link (step S206).

Subsequently, the terminal capability information controlling unit 326 of the communication terminal 3 obtains the unlicensed band use capability/incapability information of the communication terminal 3 from the terminal capability information storing unit 325. After that, the terminal capability information generating unit 335 generates terminal capability information including the unlicensed band use capability/incapability information provided in the notification issued by the terminal capability information controlling unit 326. Subsequently, the terminal capability information generating unit 335 notifies the base station 1 of the unlicensed band use capability/incapability by transmitting the generated terminal capability information to the base station 1 (step S207). In the following sections, an example will be explained in which the communication terminal 3 is capable of using an unlicensed band.

The radio link controlling unit 157 included in the base station 1 receives the notification about the unlicensed band use capability/incapability. After that, the radio link controlling unit 157 exercises unlicensed band use control including a process of judging whether or not an unlicensed band is to be used and a process of generating a request to measure the radio link quality of the unlicensed band (step S208). After that, the radio link controlling unit 157 instructs the radio link control information generating unit 160 to notify the communication terminal 3 that an unlicensed band is to be used.

Having received the instruction from the radio link controlling unit 157, the radio link control information generating unit 160 included in the base station 1 generates control information used for issuing a notification that an unlicensed band is to be used. After that, by transmitting the generated control information to the communication terminal 3, the radio link control information generating unit 160 notifies the communication terminal 3 that an unlicensed band is to be used (step S209).

Subsequently, the base station 1 and the communication terminal 3 transmit and receive user data and control information by using the established radio link (step S210).

Subsequently, the pilot generating unit 261 included in the base station 2 generates a pilot signal and transmits the pilot signal to the communication terminal 3 (step S211).

The base station 1 determines to add a cell on the basis of the data volume and link quality to and from the communication terminal 3 (step S212).

The radio link quality measuring and calculating unit 310 included in the communication terminal 3 measures and calculates the radio link quality to and from the base station 2 by using the pilot signal transmitted from the base station 2 (step S213). After that, the radio link quality measuring and calculating unit 310 outputs the measuring and calculating result of the radio link quality to the radio link quality information generating unit 334.

The radio link quality information generating unit 334 generates radio link quality information by using the received measuring and calculating result of the radio link quality. After that, the radio link quality information generating unit 334 transmits the generated radio link quality information to the base station 1 (step S214).

The radio link controlling unit 157 obtains the radio link quality information between the communication terminal 3 and the base station 2 and the radio link quality information between the communication terminal 3 and another base station extracted by the radio link quality information extracting unit 154. After that, the radio link controlling unit 157 selects the cell 20 of the base station 2 as a cell to perform communication using an unlicensed band (step S215). In the present example, the radio link controlling unit 157 selects the cell 20 as an SCell.

After that, the, radio link controlling unit 157 instructs the radio link control information generating unit 160 to transmit a system information request to the base station 2.

Having received the instruction from the radio link controlling unit 157, the radio link control information generating unit 160 generates control information used for making a system information request. After that, the radio link control information generating unit 160 transmits the system information request to the base station 2, by transmitting the generated control information to the base station 2 (step S216).

The system information generating unit 263 included in the base station 2 generates system information by using the information stored in the system information managing and storing unit 258. After that, the system information generating unit 263 transmits the generated system information to the base station 1 (step S217). The radio link controlling unit 157 included in the base station 1 transmits the received system information of the base station 2 to the communication terminal 3 via the radio link control information generating unit 160 (step S218).

The base station 2 and the communication terminal 3 perform a random access procedure and establish a radio link (step S219).

Subsequently, the base station 1 and the communication terminal 3 transmit and receive user data and control information by using the radio link established between the base station 1 and the communication terminal 3 (step S220). Further, the base station 2 and the communication terminal 3 transmit and receive user data and control information by using the radio link established between the base station 2 and the communication terminal 3 (step S221).

Figure 14:
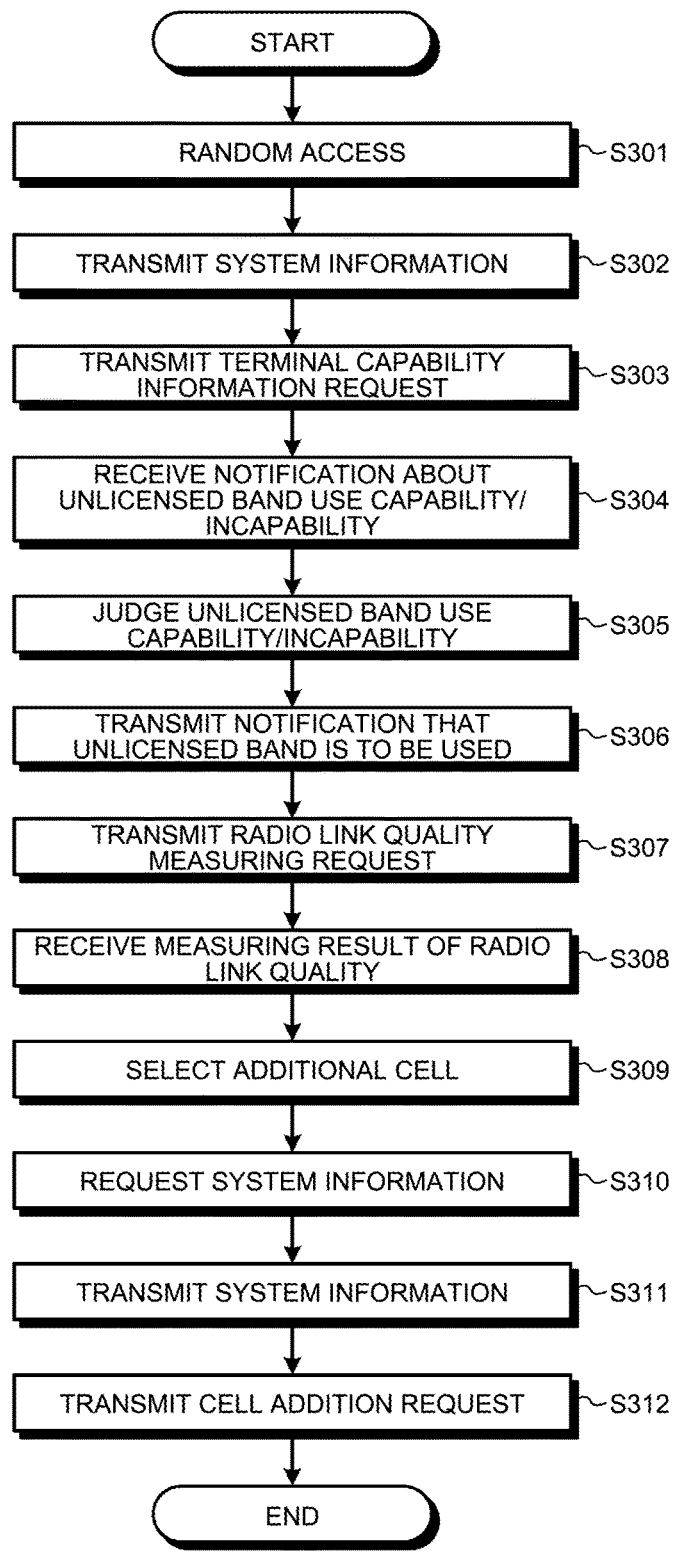
FIG. 14 is a flowchart illustrating CA process performed by a base station according to the first embodiment.

Next, a flow in the CA process performed by the base station 1 according to the present embodiment will be explained, with reference to FIG. 14. FIG. 14 is a flowchart illustrating the CA process performed by the base station according to the first embodiment.

The radio link controlling unit 157, the pilot generating unit 161, the synchronization signal generating unit 162, and the radio link control information generating unit 160 implement random access with the communication terminal 3 (step S301). As a result, a radio link is established between the base station 1 and the communication terminal 3.

Subsequently, the system information generating unit 163 generates system information by using the information stored in the system information managing and storing unit 158. After that, the system information generating unit 163 transmits the generated system information to the base station 1 (step S302).

Subsequently, the terminal capability information request generating unit 164 generates a terminal capability information request. After that, the terminal capability information request generating unit 164 transmits the generated terminal capability information request to the communication terminal 3 (step S303).

Subsequently, the radio link controlling unit 157 receives, from the terminal capability information controlling unit 156, the unlicensed band use capability/incapability information included in the terminal capability information received from the communication terminal 3 (step S304). After that, the radio link controlling unit 157 judges the unlicensed band use capability/incapability (step S305). Subsequently, the radio link controlling unit 157 instructs the radio link control information generating unit 160 to notify the communication terminal 3 that an unlicensed band is to be used. The radio link control information generating unit 160 notifies the communication terminal 3 that an unlicensed band is to be used (step S306).

Having received the instruction from the radio link controlling unit 157, the radio link control information generating unit 160 generates a radio link quality measuring request to the communication terminal 3 about the radio links between the communication terminal 3 and peripheral base stations thereof including the base station 2 each used for communication using an unlicensed band. After that, the radio link control information generating unit 160 transmits the generated radio link quality measuring request to the communication terminal 3 (step S307).

Subsequently, the radio link controlling unit 157 receives radio link quality measuring results from the peripheral base stations of the communication terminal 3 including the base station 2 (step S308).

After that, the radio link controlling unit 157 selects an additional cell on the basis of the received radio link quality measuring results (step S309). In the following sections, an example will be explained in which the radio link controlling unit 157 has selected the cell 20 of the base station 2.

Having received the instruction from the radio link controlling unit 157, the radio link control information generating unit 160 generates control information used for making a system information request to the base station 2. After that, the radio link control information generating unit 160 makes the system information request to the base station 2, by transmitting the generated control information to the base station 2 (step S310).

The radio link controlling unit 157 obtains the system information transmitted from the base station 2, from the radio link control information extracting unit 155. After that, the radio link controlling unit 157 transmits the obtained system information of the base station 2 to the communication terminal 3 via the radio link control information generating unit 160 (step S311).

Subsequently, the radio link controlling unit 157 instructs the radio link control information generating unit 160 to transmit a cell addition request to the communication terminal 3. The radio link control information generating unit 160 generates control information used for making the cell addition request. After that, the radio link control information generating unit 160 transmits the cell addition request to the communication terminal 3 by transmitting the generated control information to the communication terminal 3 (step S312).

Figure 15:
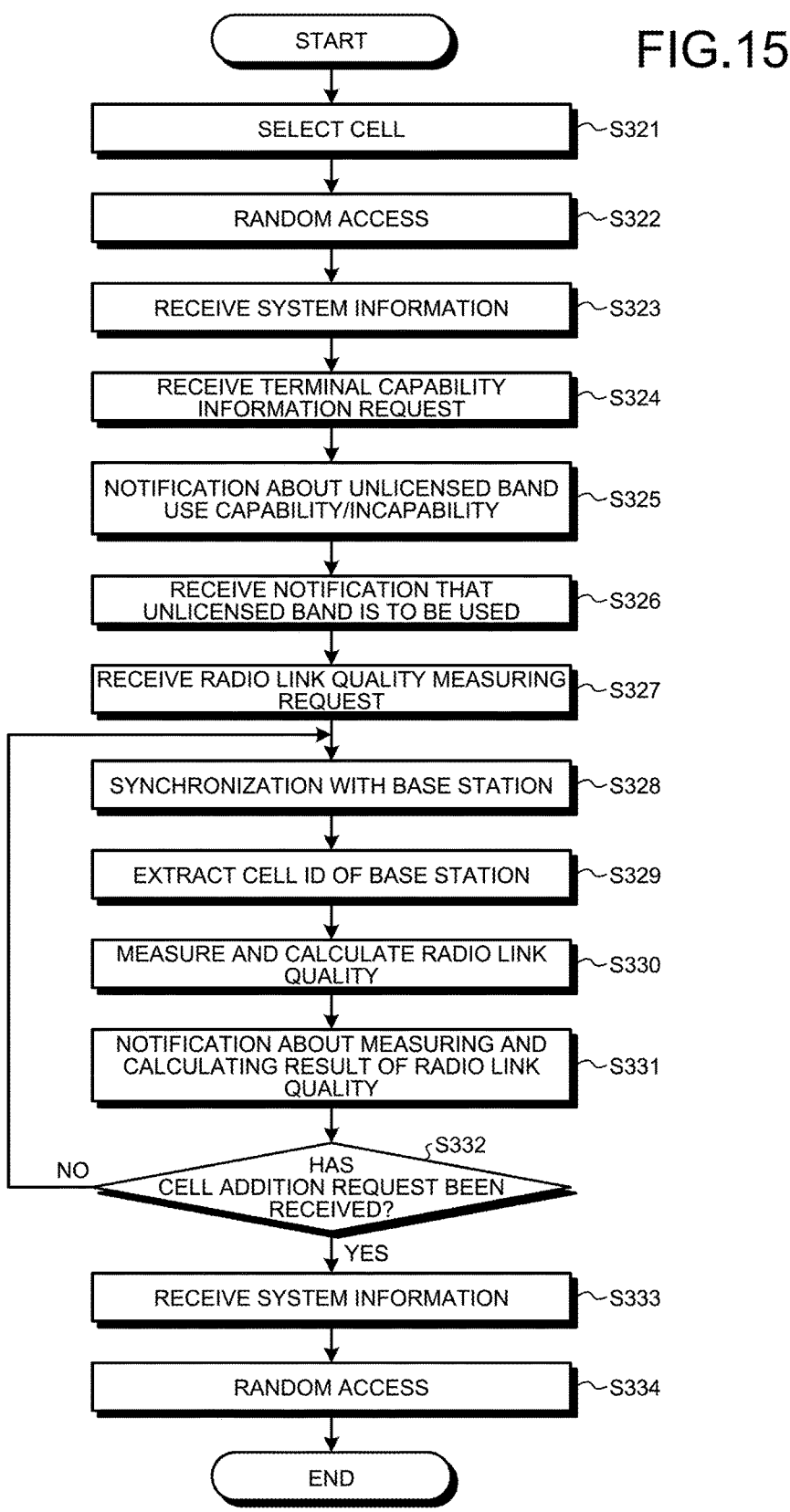
FIG. 15 is a flowchart illustrating a CA process performed by a communication terminal according to the first embodiment.

Next, a flow in a CA process performed by the communication terminal 3 according to the present embodiment will be explained, with reference to FIG. 15. FIG. 15 is a flowchart illustrating the CA process performed by the communication terminal according to the first embodiment.

The cell selection controlling unit 322 performs a cell selecting process to select a PCell by using pilot signals received from the peripheral base stations including the base station 1 (step S321). In the present example, the cell selection controlling unit 322 selects the cell 10 of the base station 1 as a PCell.

After that, the pilot extracting unit 305, the synchronization controlling unit 306, the synchronization signal extracting unit 307, the cell ID extracting unit 308, the terminal setting controlling unit 321, and the radio link controlling unit 324 implement random access with the base station 1 (step S322). As a result, a radio link is established between the communication terminal 3 and the base station 1.

Subsequently, the radio link controlling unit 324 receives the system information of the base station 1 extracted by the system information extracting unit 303 (step S323).

Subsequently, the terminal capability information controlling unit 326 receives a terminal capability information request from the terminal capability information request extracting unit 309 (step S324). The terminal capability information controlling unit 326 obtains the information indicating whether or not the communication terminal 3 is capable of using an unlicensed band from the terminal capability information storing unit 325. After that, the terminal capability information controlling unit 326 instructs the terminal capability information generating unit 335 to transmit terminal capability information including the unlicensed band use capability/incapability information, to the base station 1.

Having received the instruction from the terminal capability information controlling unit 326, the terminal capability information generating unit 335 generates the terminal capability information including the unlicensed band use capability/incapability information. After that, the terminal capability information generating unit 335 notifies the base station 1 of the unlicensed band use capability/incapability, by transmitting the generated terminal capability information to the base station 1 (step S325).

Subsequently, the radio link controlling unit 324 receives the notification about using an unlicensed band transmitted from the base station 1, from the radio link control information extracting unit 304 (step S326).

After that, the radio link controlling unit 324 receives the radio link quality measuring request transmitted from the base station 1, from the radio link control information extracting unit 304 (step S327).

The pilot extracting unit 305, the synchronization controlling unit 306, and the synchronization signal extracting unit 307 perform a synchronization process with the base station (step S328). Subsequently, the cell ID extracting unit 308 extracts the cell ID of the base station 2 (step S329). After that, the radio link quality measuring and calculating unit 310 measures and calculates the radio link quality to and from the base station 2 (step S330).

Subsequently, the radio link quality measuring and calculating unit 310 instructs the radio link quality information generating unit 334 to notify the base station 1 of the radio link quality. The radio link quality information generating unit 334 notifies the base station 1 of the measuring and calculating result of the radio link quality, according to the instruction from the radio link quality measuring and calculating unit 310 (step S331).

The radio link controlling unit 324 judges whether or not a cell addition request has been received from the base station 1 (step S332). When no cell addition request has been received (step S332: No), the process returns to step S328.

On the contrary, when a cell addition request has been received (step S332: Yes), the terminal setting controlling unit 321 receives the system information of the base station 2 from the system information extracting unit 303 (step S333).

After that, the pilot extracting unit 305, the synchronization controlling unit 306, the synchronization signal extracting unit 307, the cell ID extracting unit 308, the terminal setting controlling unit 321, and the radio link controlling unit 324 implement random access with the base station 2 (step S334). As a result, a radio link is established between the communication terminal 3 and the base station 2.

In the description above, the example is explained in which, having received the terminal capability information request from the base station 1, the communication terminal 3 sends the terminal capability information including the unlicensed band use capability/incapability information to the base station 1; however, the timing of the sending is not limited to the timing in this example. For instance, the communication terminal 3 may send pieces of terminal capability information to the base station 1 in a predetermined periodic cycle. In that situation, the base station 1 may wait for a piece of terminal capability information to be sent from the communication terminal 3, without sending the terminal capability information request to the communication terminal 3.

Further, in the description above, the example is explained in which the base station 1 obtains the capability information of the communication terminal 3, judges the unlicensed band use capability/incapability, and transmits the notification about using an unlicensed band and the system information of the base station 2 to the communication terminal 3; however, other configurations are also possible. For instance, another arrangement is also acceptable in which the base station 2 obtains the capability information of the communication terminal 3, judges the unlicensed band use capability/incapability, and transmits the notification about using an unlicensed band and the system information of the base station 2 to the communication terminal 3. In that situation, it is desirable to configure the base station 2 to have the same configuration as that of the base station 1 according to the first embodiment. Also, in that situation, the base station 1 may have the same configuration as that of the base station in a second embodiment described below.

<A Hardware Configuration>

Figure 16:
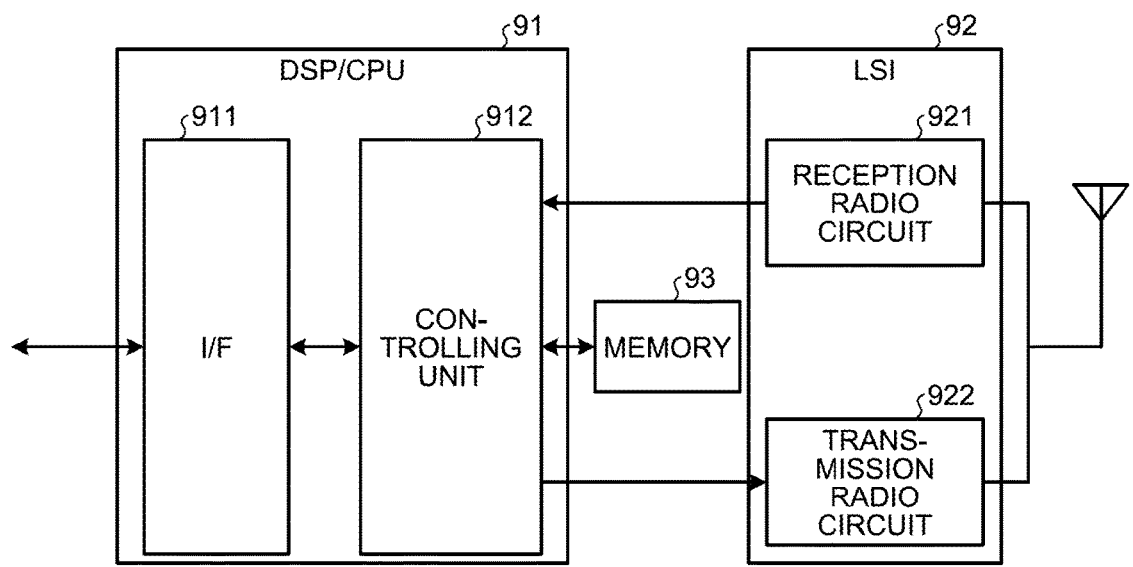
FIG. 16 is a hardware diagram of a base station.

Next, hardware configurations of the base stations 1 and 2 and the communication terminal 3 according to the present embodiment will be explained. FIG. 16 is a hardware diagram of a base station. For example, the base stations 1 and 2 each have the hardware configuration illustrated in FIG. 16.

As illustrated in FIG. 16, each of the base stations 1 and 2 includes a Digital Signal Processor (DSP)/Central Processing Unit (CPU) 91, a Large Scale Integration (LSI) 92, and a memory 93.

The DSP/CPU 91 includes an Interface (I/F) 911 and a controlling unit 912. The I/F 911 is a communication interface for the controlling unit 912 and a upper layer network.

When being included in the base station 1, the memory 93 stores therein various types of computer programs (hereinafter, "programs") including programs that realize the functions of the terminal capability information controlling unit 156, the radio link controlling unit 157, the system information managing and storing unit 158, and the upper layer processing unit 159 illustrated in FIG. 3. Further, the memory 93 realizes the functions of the system information managing and storing unit 158.

Further, when being included in the base station 1, the controlling unit 912 realizes the functions of the terminal capability information controlling unit 156, the radio link controlling unit 157, the system information managing and storing unit 158, and the upper layer processing unit 159, by reading and executing the various types of programs stored in the memory 93.

Further, when being included in the base station 2, the memory 93 stores therein various types of programs including programs that realize the functions of the radio link controlling unit 257, the system information managing and storing unit 258, and the upper layer processing unit 259 illustrated in FIG. 8. Further, the memory 93 realizes the functions of the system information managing and storing unit 258.

Further, when being included in the base station 2, the controlling unit 912 realizes the functions of the radio link controlling unit 257, the system information managing and storing unit 258, and the upper layer processing unit 259, by reading and executing the various types of programs stored in the memory 93.

The LSI 92 includes a reception radio circuit 921 and a transmission radio circuit 922. When being included in the base station 1, the reception radio circuit 921 realizes the functions of the reception radio unit 151, the demodulating and decoding unit 152, the terminal capability information extracting unit 153, the radio link quality information extracting unit 154, and the radio link control information extracting unit 155 illustrated in FIG. 3. Further, when being included in the base station 1, the transmission radio circuit 922 realizes the functions of the terminal capability information request generating unit 164, the radio link control information generating unit 160, the pilot generating unit 161, the synchronization signal generating unit 162, the system information generating unit 163, the transmission radio unit 165, and the encoding and modulating unit 166.

Further, when being included in the base station 2, the reception radio circuit 921 realizes the functions of the reception radio unit 251, the demodulating and decoding unit 252, the radio link quality information extracting unit 254, and the radio link control information extracting unit 255 illustrated in FIG. 8. Further, when being included in the base station 2, the transmission radio circuit 922 realizes the functions of the radio link control information generating unit 260, the pilot generating unit 261, the synchronization signal generating unit 262, the system information generating unit 263, the transmission radio unit 265, and the encoding and modulating unit 266.

Figure 17:
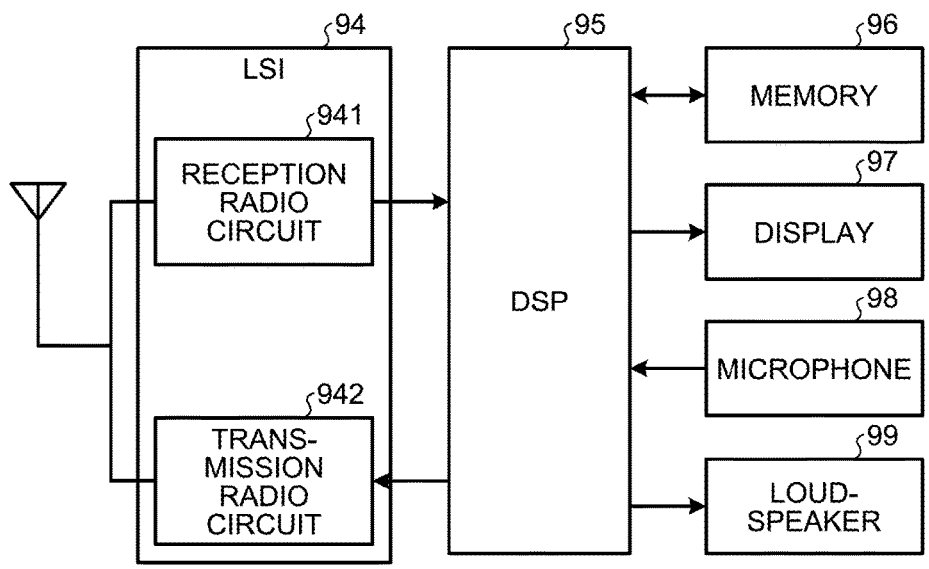
FIG. 17 is a hardware diagram of a communication terminal.

FIG. 17 is a hardware diagram of the communication terminal. The communication terminal 3 includes an LSI 94, a DSP 95, a memory 96, a display 97, a microphone 98, and a loudspeaker 99. The LSI 94 includes a reception radio circuit 941 and a transmission radio circuit 942.

The display 97 is a display device such as a liquid crystal screen. Further, the microphone 98 is a device to which the operator inputs audio when performing audio communication or the like. Further, the loudspeaker 99 is a device such as a speaker that provides the operator with audio when performing audio communication or the like.

The reception radio circuit 941 realizes the functions of the reception radio unit 301, the demodulating and decoding unit 302, the system information extracting unit 303, the radio link control information extracting unit 304, the pilot extracting unit 305, the synchronization controlling unit 306, the synchronization signal extracting unit 307, and the cell ID extracting unit 308 illustrated in FIG. 9. Further, the reception radio circuit 941 realizes the functions of the terminal capability information request extracting unit 309, the synchronization signal generating unit 311, the pilot calculating unit 312, and the radio link quality measuring and calculating unit 310 illustrated in FIG. 9.

The transmission radio circuit 942 includes the transmission radio unit 331, the encoding and modulating unit 332, the radio link control information generating unit 333, the radio link quality information generating unit 334, and the terminal capability information generating unit 335 illustrated in FIG. 9.

The memory 96 stores therein various types of programs including programs that realizes the functions of the terminal setting controlling unit 321, the cell selection controlling unit 322, the radio link controlling unit 324, and the terminal capability information controlling unit 326. Further, the memory 96 realizes the functions of the system information storing unit 323 and the terminal capability information storing unit 325.

Further, the DSP 95 realizes the functions of the terminal setting controlling unit 321, the cell selection controlling unit 322, the radio link controlling unit 324, and the terminal capability information controlling unit 326 by reading and executing the various types of programs from the memory 96. Further, the DSP 95 realizes the functions of the baseband processing unit 34. Further, although FIG. 17 illustrates the configuration using the DSP 95, the configuration may be realized by using a CPU.

As explained above, in the radio communication system according to the present embodiment, the base station notifies the communication terminal of the frequency of the unlicensed band as the frequency to be used for the communication, so that the communication terminal performs the communication using the unlicensed band according to the provided information. With this arrangement, it is possible to perform the communication while ensuring that the unlicensed band is used. Further, it is possible to implement the carrier aggregation process while using the unlicensed band for the SCell. As a result, by using the unlicensed band, the radio communication system according to the present embodiment is able to increase the frequencies that are usable. It is therefore possible to improve the transfer speeds.

Further, in the above description, the example is explained in which the PCell and the SCell are connected to each other by radio (in a wireless manner); however, the connecting method may be another method. For example, the PCell and the SCell may be connected to each other in a wired manner. In that situation, between the PCell and the SCell, signals are transferred by using an interface between the base stations, or signals are transferred after converting radio signals to optical signals.

Further, the data transfer between the PCell and the SCell is performed by using PDCP SDUs. In this regard, as a radio access scheme, in the fields of LTE and LTE-Advanced, a femto using LTE and LTE-Advanced is called an "HeNB". In contrast, in the fields other than the fields of LTE and LTE-Advanced, the term "femto" refers to communication using Wi-Fi, and not LTE. In Wi-Fi communication, PDCP is not present, and only MAC is present of which operations are different from those of the MAC in LTE and LTE-Advanced. For this reason, it is difficult to transfer data in units of PDCP SDUs. As a result, it is possible to divide data of the same service into pieces and transmit the pieces of data from a base station and from a femto.

Second Embodiment

Next, a second embodiment will be explained. A radio communication system according to the second embodiment is different from the first embodiment in that a communication terminal transmits a terminal category to a base station. A base station serving as a PCell in the present embodiment may also be illustrated in FIG. 2. Further, a communication terminal according to the present embodiment may also be illustrated in FIG. 9. In the following sections, explanations of some of the functional units having the same functions as those in the first embodiment will be omitted.

The terminal capability information controlling unit 156 stores therein a list of terminal categories indicating a category classification organized according to capabilities of communication terminals as illustrated in FIG. 18A. FIG. 18A is a table illustrating examples of the terminal categories. The "Maximum number of DL-SCH transport block bits received within a TTI" indicates the maximum number of bits that can be transmitted through a downlink shared channel at a time. The "Maximum number of bits of a DL-SCH transport block received within a TTI" indicates a value of, for example, the maximum number of bits that can be transferred at a time through a shared channel when MIMO is not implemented. In another example, the value may be the maximum number of bits that can be transferred at a time through a shared channel, when two layers, i.e., 2×2 MIMO is implemented. In yet another example, the value may be the maximum number of bits that can be transferred at a time through a supply channel when four layers, i.e., 4×4 MIMO is implemented. The "Total number of soft channel bits" indicates the maximum number of bits when a previously-received signal is combined with a newly-received signal. The "Maximum number of supported layers for spatial multiplexing in DL" indicates the number of streams in "spatial multiplexing", i.e., MIMO. For example, when the "Maximum number of supported layers for spatial multiplexing in DL" is four, the transmission is performed in four streams (4×4 MIMO). Further, indicated under the heading "Unlicensed band" is the unlicensed band use capability/incapability. In other words, the terminal categories stored in the terminal capability information controlling unit 156 include categorization using the unlicensed band use capability/incapability.

Further, the illustration in FIG. 18A is merely an example. As long as an element used for judging the unlicensed band use capability/incapability is included, the elements of the categorization in FIG. 18A may include one or more other elements and does not need to include any other elements. For example, FIG. 18B illustrates another example of terminal categories. In the terminal categories illustrated in FIG. 18B, the terminals are further categorized according to the unlicensed band use capability/incapability depending on the frequency band being used.

The terminal capability information controlling unit 156 obtains the terminal capability information of the communication terminal 3 extracted by the terminal capability information extracting unit 153. After that, the terminal capability information controlling unit 156 obtains the terminal category to which the communication terminal 3 belongs, on the basis of the terminal capability information.

The terminal capability information controlling unit 156 judges whether or not the communication terminal 3 is capable of using an unlicensed band on the basis of the obtained terminal category. After that, the terminal capability information controlling unit 156 notifies the radio link controlling unit 157 of whether or not the communication terminal 3 is capable of using an unlicensed band. In this situation, in the present embodiment, because the judging process is performed by using the terminal categories illustrated in FIG. 18A, it is simply judged whether or not the communication terminal 3 is capable of using an unlicensed band. In contrast, for example, when the terminal categories illustrated in FIG. 18B are used, the terminal capability information controlling unit 156 judges whether or not the communication terminal 3 is capable of using an unlicensed band, depending on the frequency to be used in the unlicensed band.

The terminal capability information storing unit 325 included in the communication terminal 3 stores therein the terminal category to which the communication terminal 3 belongs.

The terminal capability information controlling unit 326 obtains the terminal capability information request extracted by the terminal capability information request extracting unit 309. Further, the terminal capability information controlling unit 326 obtains the terminal category to which the device of its own belongs, from the terminal capability information storing unit 325. Subsequently, the terminal capability information controlling unit 326 transmits the obtained terminal category to the terminal capability information generating unit 335, and also, instructs the terminal capability information generating unit 335 to notify the base station 1 of the terminal capability information.

The terminal capability information generating unit 335 obtains the terminal category of the device of its own from the terminal capability information controlling unit 326. After that, the terminal capability information generating unit 335 generates terminal capability information including the terminal category. After that, the terminal capability information generating unit 335 transmits the generated terminal capability information to the base station 1 and notifies the base station 1 of the terminal category of the device of its own.

Figure 19A:
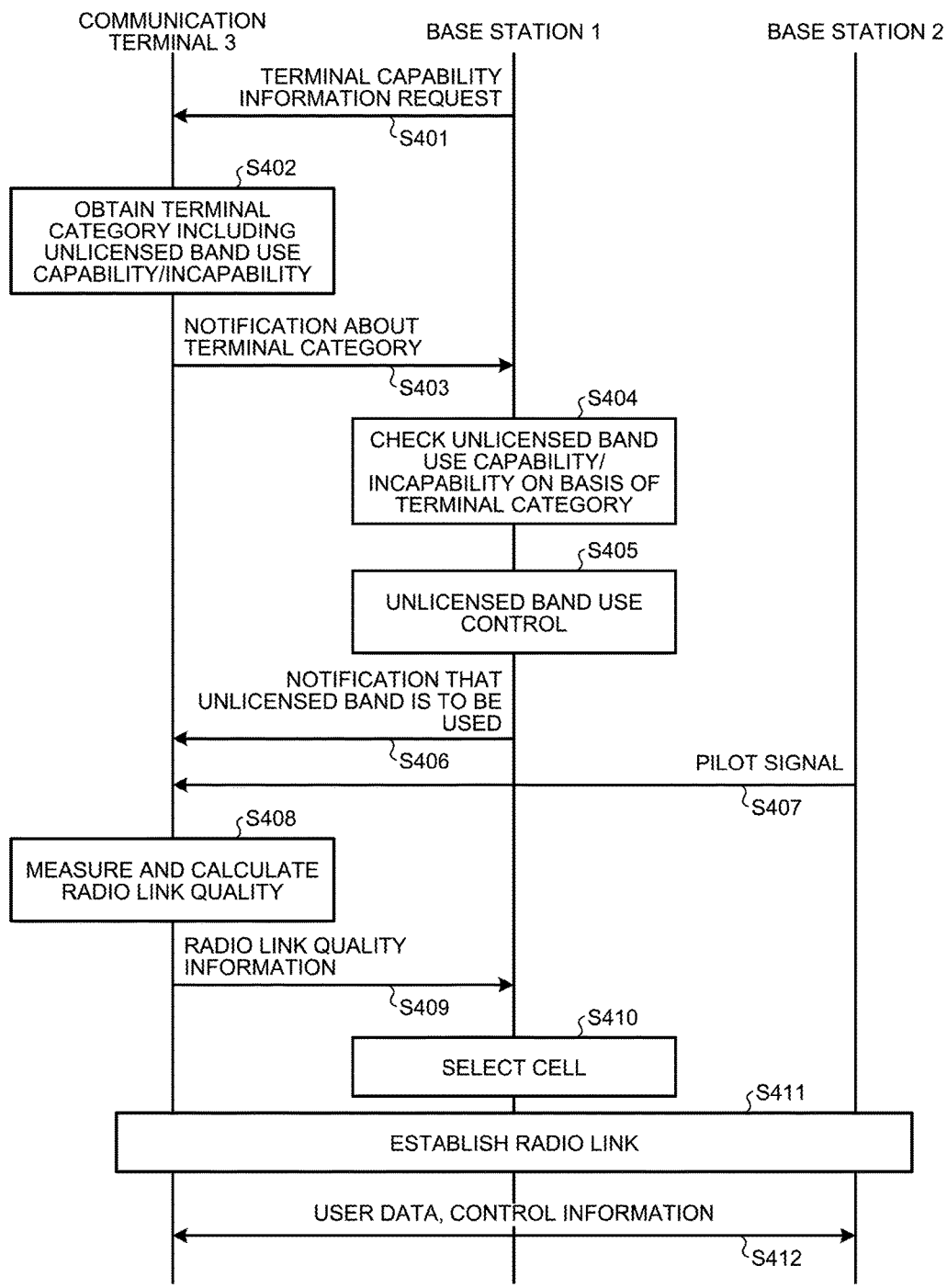
FIG. 19A is a sequence chart illustrating an SCell connection in a radio communication system according to a second embodiment.

Next, a flow in an SCell connection in a radio communication system according to the present embodiment will be explained, with reference to FIG. 19A. FIG. 19A is a sequence chart of the SCell connection in the radio communication system according to the second embodiment.

The terminal capability information request generating unit 164 included in the base station 1 transmits a terminal capability information request to the communication terminal 3 (step S401).

The terminal capability information controlling unit 326 included in the communication terminal 3 receives the terminal capability information request extracted by the terminal capability information request extracting unit 309 and obtains, from the terminal capability information storing unit 325, the terminal category of the communication terminal 3 of which the categorization includes the unlicensed band use capability/incapability (step S402). After that, the terminal capability information generating unit 335 generates terminal capability information including the terminal category provided in the notification issued by the terminal capability information controlling unit 326. Subsequently, the terminal capability information generating unit 335 notifies the base station 1 of the terminal category of the communication terminal 3 by transmitting the generated terminal capability information to the base station 1 (step S403). In the following sections, an example will be explained in which the communication terminal 3 is capable of using an unlicensed band.

The radio link controlling unit 157 included in the base station 1 receives the information about the terminal category of the communication terminal 3 from the terminal capability information controlling unit 156. After that, the radio link controlling unit 157 checks to see whether or not the communication terminal 3 is capable of using an unlicensed band, on the basis of the terminal category of the communication terminal 3 (step S404).

The radio link controlling unit 157 included in the base station 1 exercises unlicensed band use control including a process of judging whether or not an unlicensed band is to be used and a process of generating a request to measure the radio link quality of the unlicensed band (step S405). After that, the radio link controlling unit 157 instructs the radio link control information generating unit 160 to notify the communication terminal 3 that an unlicensed band is to be used.

Having received the instruction from the radio link controlling unit 157, the radio link control information generating unit 160 included in the base station 1 generates control information used for issuing the notification that an unlicensed band is to be used. After that, the radio link control information generating unit 160 notifies the communication terminal 3 that an unlicensed band is to be used, by transmitting the generated control information to the communication terminal 3 (step S406).

The pilot generating unit 261 included in the base station 2 calculates and generates a pilot signal. After that, the pilot generating unit 261 transmits the pilot signal to the communication terminal 3 (step S407).

The radio link quality measuring and calculating unit 310 included in the communication terminal 3 measures and calculates the radio link quality to and from the base station 2 by using the pilot signal transmitted from the base station 2 (step S408). After that, the radio link quality measuring and calculating unit 310 outputs the measuring and calculating result of the radio link quality to the radio link quality information generating unit 334.

The radio link quality information generating unit 334 generates radio link quality information by using the received measuring and calculating result of the radio link quality. After that, the radio link quality information generating unit 334 transmits the generated radio link quality information to the base station 1 (step S409).

The radio link controlling unit 157 included in the base station 1 obtains the radio link quality information between the communication terminal 3 and the base station 2 from the radio link quality information extracting unit 154. Also, the radio link controlling unit 157 similarly obtains radio link quality information from other peripheral base stations of the communication terminal using an unlicensed band. After that, the radio link controlling unit 157 selects a cell on the basis of the obtained radio link quality information (step S410). In the following sections, an example will be explained in which the radio link controlling unit 157 has selected the base station 2.

When the radio link controlling unit 157 has selected the base station 2, a random access procedure is performed among the base stations 1 and 2 and the communication terminal 3, and a radio link is established to connect the communication terminal 3 and the base station 2 to each other (step S411).

Subsequently, the base station 2 and the communication terminal 3 transmit and receive user data and control information by using the established radio link (step S412).

Figure 19B:
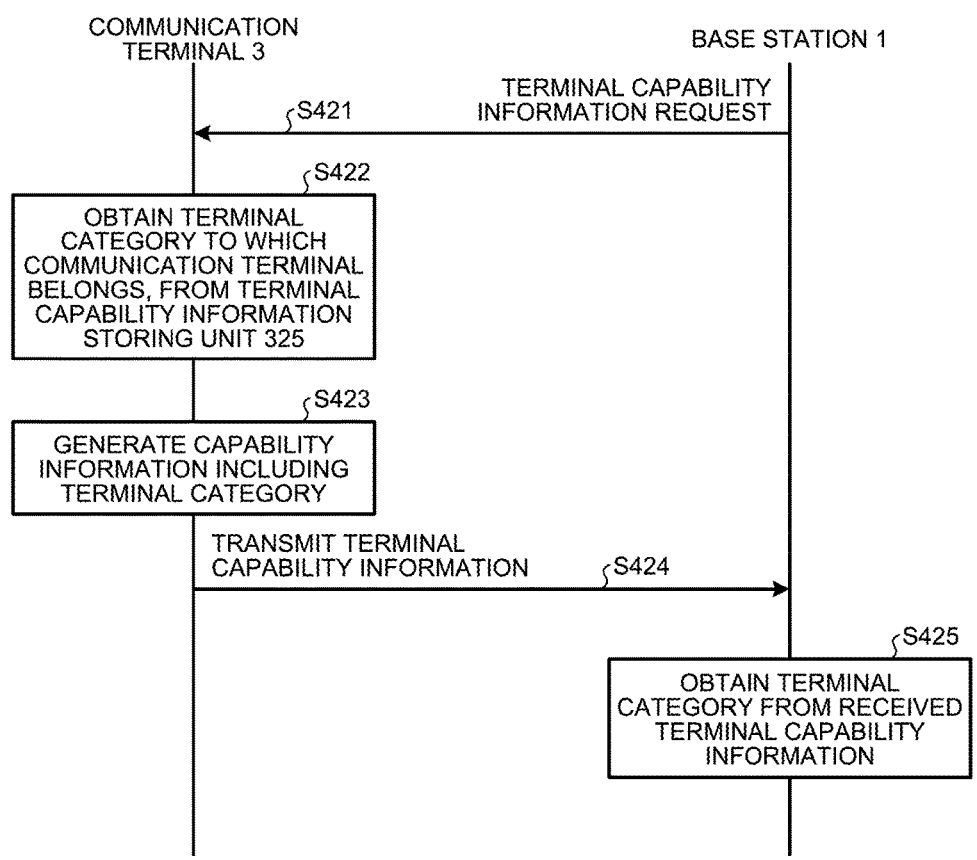
FIG. 19B is a sequence chart illustrating details of a terminal category notifying process.

Next, the notification about the terminal category will be explained in detail, with reference to FIG. 19B. FIG. 19B is a sequence chart illustrating details of the terminal category notifying process.

The terminal capability information request extracting unit 309 included in the communication terminal 3 extracts a terminal capability information request from the signal transmitted from the base station 1 (step S421). Subsequently, the terminal capability information controlling unit 326 receives the terminal capability information request extracted by the terminal capability information request extracting unit 309. After that, having received the terminal capability information request, the terminal capability information controlling unit 326 obtains the terminal category to which the communication terminal 3, which is the device of its own, belongs, from the terminal capability information storing unit 325 (step S422). The terminal category includes the unlicensed band use capability/incapability.

Subsequently, the terminal capability information generating unit 335 obtains the information about the terminal category from the terminal capability information controlling unit 326. After that, the terminal capability information generating unit 335 generates capability information including the terminal category (step S423).

Subsequently, the terminal capability information generating unit 335 transmits the capability information including the terminal category to the base station 1 (step S424).

The terminal capability information extracting unit 153 included in the base station 1 extracts the terminal capability information from the signal sent from the communication terminal 3. Subsequently, the terminal capability information controlling unit 156 obtains the terminal capability information of the communication terminal 3 from the terminal capability information extracting unit 153. After that, from the terminal capability information, the terminal capability information controlling unit 156 obtains the terminal category to which the communication terminal 3 belongs (step S425).

Next, a flow in a CA process performed by the base station 1 according to the present embodiment will be explained, with reference to FIG. 20. FIG. 20 is a flowchart illustrating the CA process performed by the base station according to the second embodiment.

The radio link controlling unit 157, the radio link control information generating unit 160, the pilot generating unit 161, and the synchronization signal generating unit 162 implement random access with the communication terminal 3 (step S501). As a result a radio link is established between the base station 1 and the communication terminal 3.

Subsequently, the system information generating unit 163 generates system information by using the information stored in the system information managing and storing unit 158. After that, the system information generating unit 163 transmits the generated system information to the base station 1 (step S502).

Subsequently, the terminal capability information request generating unit 164 generates a terminal capability information request including a terminal category transmission request. After that, the terminal capability information request generating unit 164 requests that the terminal category be transmitted by transmitting the generated terminal capability information request to the communication terminal 3 (step S503).

Subsequently, the radio link controlling unit 157 receives the information about the terminal category of the communication terminal 3 included in the terminal capability information received from the communication terminal 3, from the terminal capability information controlling unit 156 (step S504). After that, the radio link controlling unit 157 judges whether or not the communication terminal 3 is capable of using an unlicensed band (step S505). Subsequently, the radio link controlling unit 157 instructs the radio link control information generating unit 160 to notify the communication terminal 3 that an unlicensed band is to be used. The radio link control information generating unit 160 notifies the communication terminal 3 that an unlicensed band is to be used (step S506).

Having received the instruction from the radio link controlling unit 157, the radio link control information generating unit 160 generates a radio link quality measuring request to the communication terminal 3 about the radio links between the communication terminal 3 and peripheral base stations thereof including the base station 2 each used for communication using an unlicensed band. After that, the radio link control information generating unit 160 transmits the generated radio link quality measuring request to the communication terminal 3 (step S507).

Subsequently, the radio link controlling unit 157 receives the radio link quality measuring results from the peripheral base stations of the communication terminal 3 including the base station 2 (step S508).

After that, the radio link controlling unit 157 selects an additional cell on the basis of the received radio link quality measuring results (step S509). In the following sections, an example will be explained in which the radio link controlling unit 157 has selected the cell 20 of the base station 2.

Having received the instruction from the radio link controlling unit 157, the radio link control information generating unit 160 generates control information used for requesting the system information from the base station 2. After that, the radio link control information generating unit 160 requests the system information from the base station 2 by transmitting the generated control information to the base station 2 (step S510).

The radio link controlling unit 157 obtains the system information transmitted from the base station 2, from the radio link control information extracting unit 155. After that, the radio link controlling unit 157 transmits the obtained system information of the base station 2 to the communication terminal 3 via the radio link control information generating unit 160 (step S511).

Subsequently, the radio link controlling unit 157 instructs the radio link control information generating unit 160 to transmit a cell addition request to the communication terminal 3. The radio link control information generating unit 160 generates control information for making the cell addition request. After that, the radio link control information generating unit 160 transmits the cell addition request to the communication terminal 3 by transmitting the generated control information to the communication terminal 3 (step S512).

Next, a flow in a CA process performed by the communication terminal 3 according to the present embodiment will be explained with reference to FIG. 21A. FIG. 21A is a flowchart illustrating the CA process performed by the communication terminal according to the second embodiment.

The cell selection controlling unit 322 performs a cell selecting process to select a PCell by using pilot signals received from the peripheral base stations including the base station 1 (step S521). In the present example, the cell selection controlling unit 322 selects the cell 10 of the base station 1 as a PCell.

After that, the pilot extracting unit 305, the synchronization controlling unit 306, the synchronization signal extracting unit 307, the cell ID extracting unit 308, the terminal setting controlling unit 321, and the radio link controlling unit 324 implement random access with the base station 1 (step S522). As a result, a radio link is established between the communication terminal 3 and the base station 1.

Subsequently, the radio link controlling unit 324 receives the system information of the base station 1 extracted by the system information extracting unit 303 (step S523).

Subsequently, the terminal capability information controlling unit 326 receives a terminal capability information request from the terminal capability information request extracting unit 309 (step S524). The terminal capability information controlling unit 326 obtains the information about the terminal category of the communication terminal 3 from the terminal capability information storing unit 325. After that, the terminal capability information controlling unit 326 instructs the terminal capability information generating unit 335 to transmit terminal capability information including the information about the terminal category, to the base station 1.

Having received the instruction from the terminal capability information controlling unit 326, the terminal capability information generating unit 335 generates terminal capability information including the information about the terminal category. After that, the terminal capability information generating unit 335 notifies the base station 1 of the terminal category, by transmitting the generated terminal capability information to the base station 1 (step S525).

Subsequently, the radio link controlling unit 324 receives the notification about using an unlicensed band transmitted from the base station 1, from the radio link control information extracting unit 304 (step S526).

Subsequently, the radio link controlling unit 324 receives the radio link quality measuring request transmitted from the base station 1 from the radio link control information extracting unit 304 (step S527).

The pilot extracting unit 305, the synchronization controlling unit 306, and the synchronization signal extracting unit 307 perform a synchronization process with the base station (step S528). Subsequently, the cell ID extracting unit 308 extracts the cell ID of the base station 2 (step S529). After that, the radio link quality measuring and calculating unit 310 measures and calculates the radio link equality to and from the base station 2 (step S530).

Subsequently, the radio link quality measuring and calculating unit 310 instructs the radio link quality information generating unit 334 to notify the base station 1 of the radio link quality. According to the instruction from the radio link quality measuring and calculating unit 310, the radio link quality information generating unit 334 notifies the base station 1 of the measuring and calculating result of the radio link quality (step S531).

The radio link controlling unit 324 judges whether or not a cell addition request has been received from the base station 1 (step S532). When no cell addition request has been received (step S532: No), the process returns to step S528.

On the contrary, when a cell addition request has been received (step S532: Yes), the terminal setting controlling unit 321 receives the system information of the base station 2 from the system information extracting unit 303 (step S533).

After that, the pilot extracting unit 305, the synchronization controlling unit 306, the synchronization signal extracting unit 307, the cell ID extracting unit 308, the terminal setting controlling unit 321, and the radio link controlling unit 324 implement random access with the base station 2 (step S534). As a result, a radio link is established between the communication terminal 3 and the base station 2.

Figure 21B:
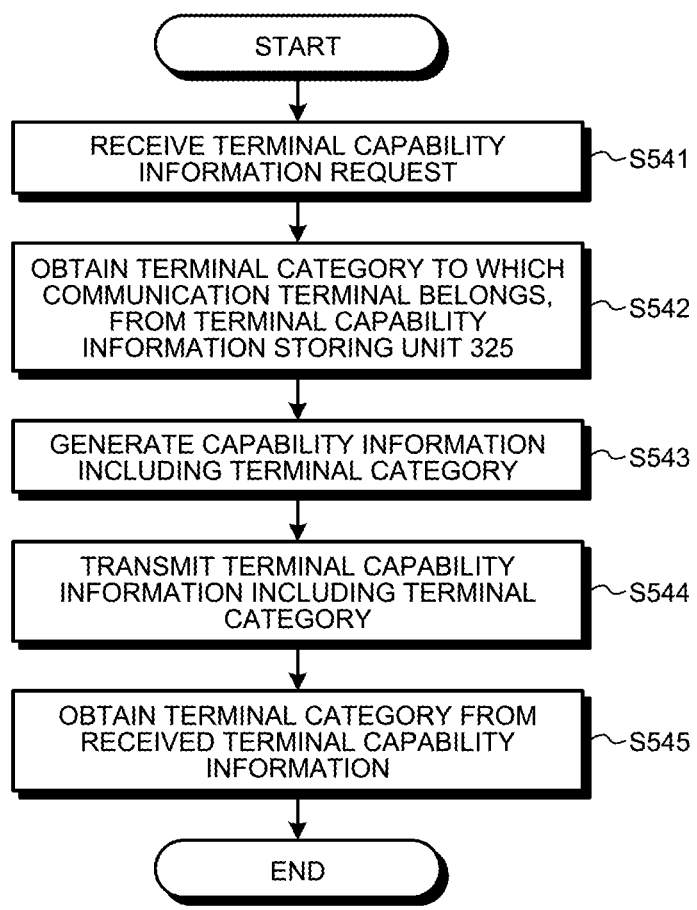
FIG. 21B is a flowchart illustrating details of a terminal category notifying process.

Next, the notification about the terminal category will be explained in detail, with reference to FIG. 21B. FIG. 21B is a flowchart illustrating details of the terminal category notifying process.

The terminal capability information request extracting unit 309 included in the communication terminal 3 extracts the terminal capability information request from the signal transmitted from the base station 1. Subsequently, the terminal capability information controlling unit 326 receives the terminal capability information request extracted by the terminal capability information request extracting unit 309 (step S541).

After that, having received the terminal capability information request, the terminal capability information controlling unit 326 obtains the terminal category to which the communication terminal 3, which is the device of its own, belongs, from the terminal capability information storing unit 325 (step S542). The terminal category includes the unlicensed band use capability/incapability information.

Subsequently, the terminal capability information generating unit 335 obtains the information about the terminal category from the terminal capability information controlling unit 326. After that, the terminal capability information generating unit 335 generates capability information including the terminal category (step S543).

Subsequently, the terminal capability information generating unit 335 transmits the capability information including the terminal category to the base station 1 (step S544).

The terminal capability information extracting unit 153 included in the base station 1 extracts the terminal capability information from the signal sent from the communication terminal 3. Subsequently, the terminal capability information controlling unit 156 obtains the terminal capability information of the communication terminal 3 from the terminal capability information extracting unit 153. After that, from the terminal capability information, the terminal capability information controlling unit 156 obtains the terminal category to which the communication terminal 3 belongs (step S545).

As explained above, in the radio communication system according to the present embodiment, the communication terminal notifies the base station of the terminal category thereof. Subsequently, the base station notifies the communication terminal of the frequency of the unlicensed band as the frequency to be used in the communication. With this arrangement, it is possible to perform the communication while ensuring that an unlicensed band is used.

Third Embodiment

Figure 23:
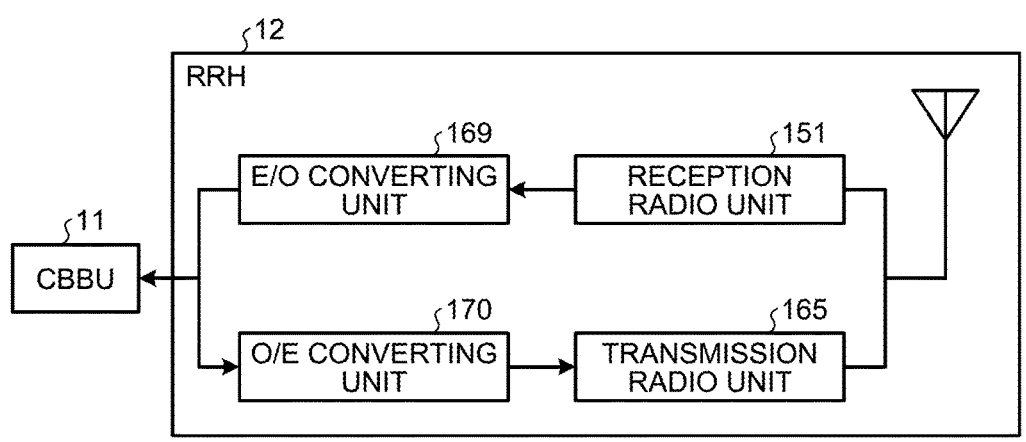
FIG. 23 is a block diagram of a Remote Radio Head (RRH) of the base station according to the third embodiment.

Next, a third embodiment will be explained. A radio communication system according to the present embodiment is different from those in the first and the second embodiments in that a base station is separated into two devices, namely a Centralized Base Band Unit (CBBU) and a Remote Radio Head (RRH). FIG. 22 is a block diagram of the CBBU of the base station according to the third embodiment. FIG. 23 is a block diagram of the RRH of the base station according to the third embodiment. In the following sections, explanations of some of the functional units having the same functions as those in the first or the second embodiment will be omitted.

A CBBU 11 included in the base station 1 according to the present embodiment has an Electrical/Optical (E/O) converting unit 167, in the position of the reception radio unit 151 included in the base station 1 according to the first embodiment. Further, the CBBU 11 has an Optical/Electrical (O/E) converting unit 168, in the position of the transmission radio unit 165 included in the base station 1 according to the first embodiment.

The E/O converting unit 167 receives an optical signal sent thereto from an RRH 12. After that, the E/O converting unit 167 converts the received optical signal to an electrical signal. Subsequently, the E/O converting unit 167 outputs the electrical signal resulting from the conversion, to the demodulating and decoding unit 152.

The demodulating and decoding unit 152 performs a demodulating process and a decoding process on the signal input thereto from the E/O converting unit 167 and sends out the result.

The encoding and modulating unit 166 performs an encoding process and a modulating process on the received signal and outputs the result to the O/E converting unit 168.

The O/E converting unit 168 converts the signal (the electrical signal) input thereto from the encoding and modulating unit 166 into an optical signal. After that, the O/E converting unit 168 transmits the optical signal resulting from the conversion to the RRH 12.

The RRH 12 includes an E/O converting unit 169 and an O/E converting unit 170, in addition to the reception radio unit 151 and the transmission radio unit 165 included in the base station 1 according to the first embodiment.

The E/O converting unit 169 receives a signal from the reception radio unit 151. After that, the E/O converting unit 169 converts the received signal (the electrical signal) into an optical signal. Subsequently, the E/O converting unit 169 transmits the optical signal resulting from the conversion to the CBBU 11.

The O/E converting unit 170 receives a signal from the CBBU 11. After that, the O/E converting unit 170 converts the received signal (the optical signal) into an electrical signal. Subsequently, the O/E converting unit 170 outputs the electrical signal resulting from the conversion to the transmission radio unit 165.

As explained above, the base station according to the present embodiment is separated into the CBBU and the RRH. In this manner, even when the base station is separated into two units, the base station is able to operate in the same manner as in the first and the second embodiments. It is therefore possible to perform the communication while ensuring that an unlicensed band is used.

Fourth Embodiment

Figure 24:
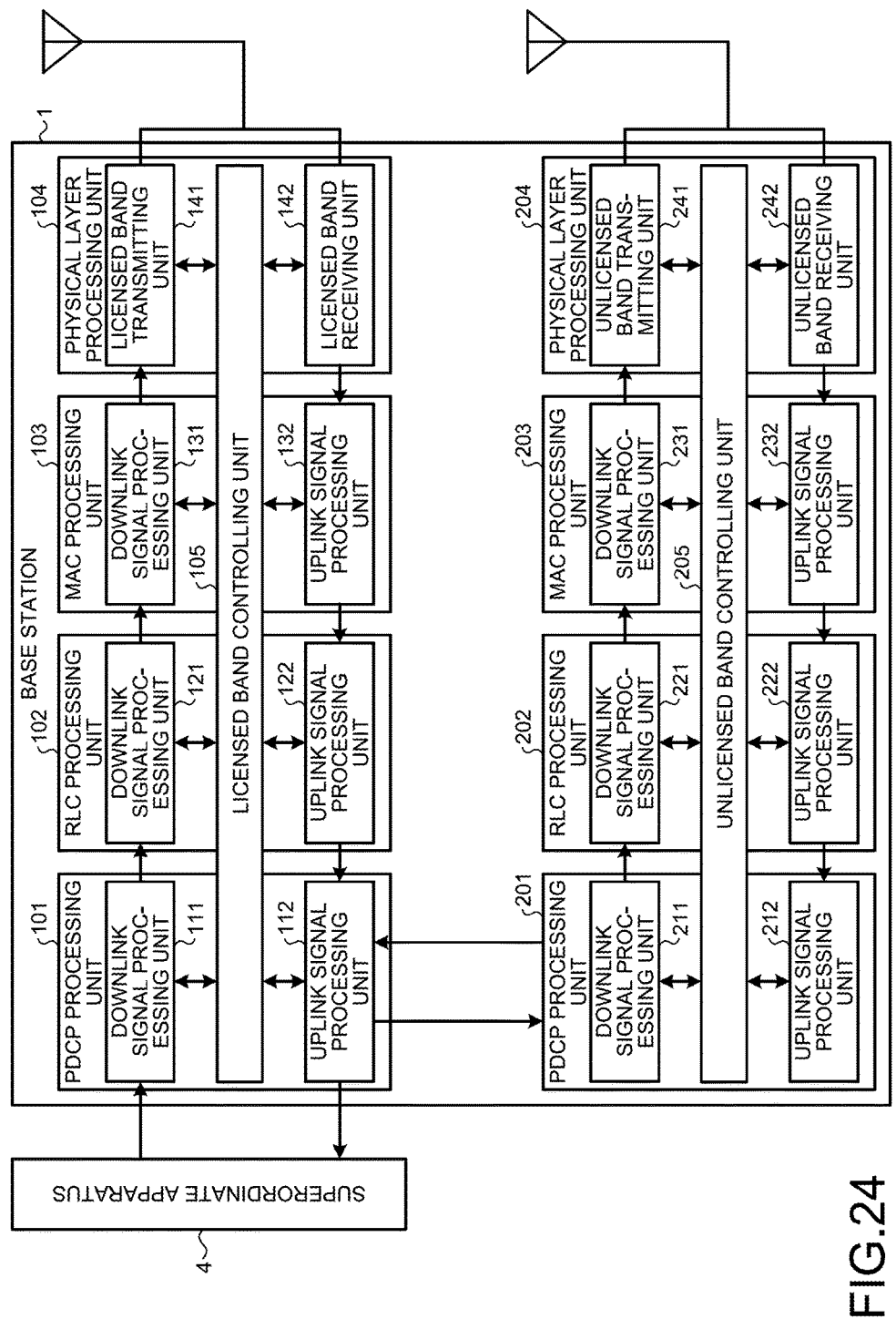
FIG. 24 is a block diagram of a base station according to a fourth embodiment.

Next, a fourth embodiment will be explained. A radio communication system according to the present embodiment is different from that in the first or the second embodiment in that one base station has a PCell and an SCell. FIG. 24 is a block diagram of a base station according to the fourth embodiment. In the following sections, explanations of some of the functional units having the same functions as those in the first or the second embodiment will be omitted.

The base station 1 according to the present embodiment includes, as illustrated in FIG. 24, the PDCP processing unit 101, the RLC processing unit 102, the MAC processing unit 103, and the physical layer processing unit 104. Further, the base station 1 includes the PDCP processing unit 201, the RLC processing unit 202, the MAC processing unit 203, and the physical layer processing unit 204 that perform communication while using the cell 20, which is an SCell.

The PDCP processing unit 101, the RLC processing unit 102, the MAC processing unit 103, and the physical layer processing unit 104 perform communication while using the cell 10. In other words, when the communication terminal 3 has selected the cell 10 as a PCell, the PDCP processing unit 101, the RLC processing unit 102, the MAC processing unit 103, and the physical layer processing unit 104 perform communication with the communication terminal 3 as the PCell.

The PDCP processing unit 201, the RLC processing unit 202, the MAC processing unit 203, and the physical layer processing unit 204 perform communication by using the cell 20 while using an unlicensed band. In other words, when the communication terminal 3 has selected the cell 20 as an SCell, the PDCP processing unit 201, the RLC processing unit 202, the MAC processing unit 203, and the physical layer processing unit 204 perform communication with the communication terminal 3 as the SCell.

As explained above, it is possible to provide within the one base station (the base station 1), both the function of performing communication by using the PCell and the function of performing communication by using the SCell. In this situation also, the physical layer processing units 104 and 204 have the same functions as those in the first or the second embodiment. As a result, even when the one base station has the PCell and the SCell as explained in the present embodiment, it is possible to perform communication while ensuring that an unlicensed band is used.

Further, even when the one base station has the PCell and the SCell as explained in the present embodiment, it is also possible to separate the base station into a CBBU and an RRH, as explained in the third embodiment.

Fifth Embodiment

Figure 25:
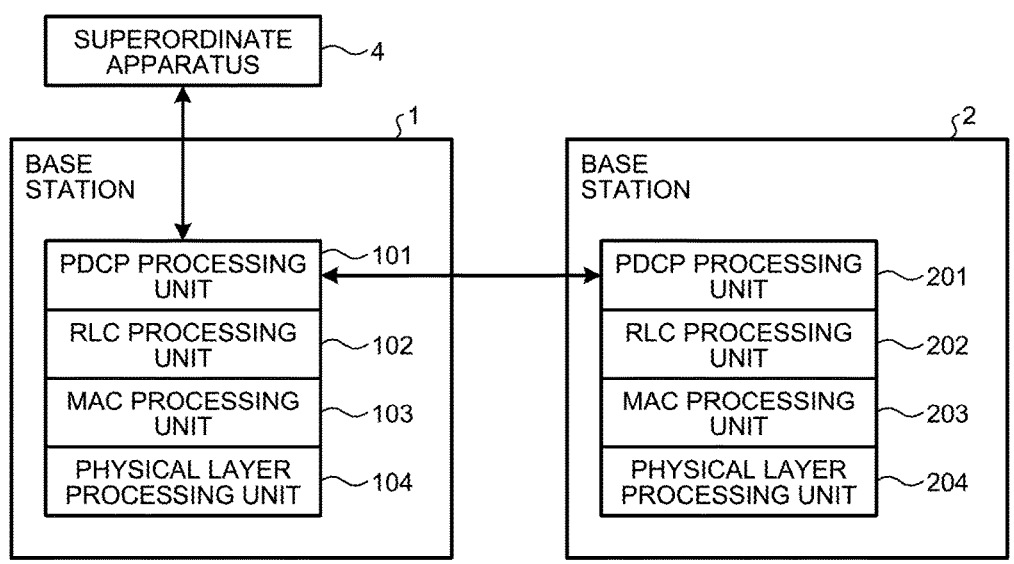
FIG. 25 is a schematic diagram illustrating processing units corresponding to layers in base stations having a PCell and an SCell and a data transfer process.

Next, a fifth embodiment will be explained. In the embodiments described above, the example is explained in which, as illustrated in FIG. 25, the base station 1 having the PCell and the base station 2 having the SCell each have the processing units corresponding to the layers. FIG. 25 is a schematic diagram illustrating the processing units corresponding to the layers in the base stations having the PCell and the SCell, respectively, and a data transfer process. Further, the data transfer between the base station 1 having the PCell and the base station 2 having the SCell was explained above by using the example in which the PDCP processing unit 101 and the PDCP processing unit 201 transfer data therebetween by using the PDCP SDUs. However, the configurations of the processing units corresponding to the layers and the data transfer method are not limited to those explained above.

Figure 26A:
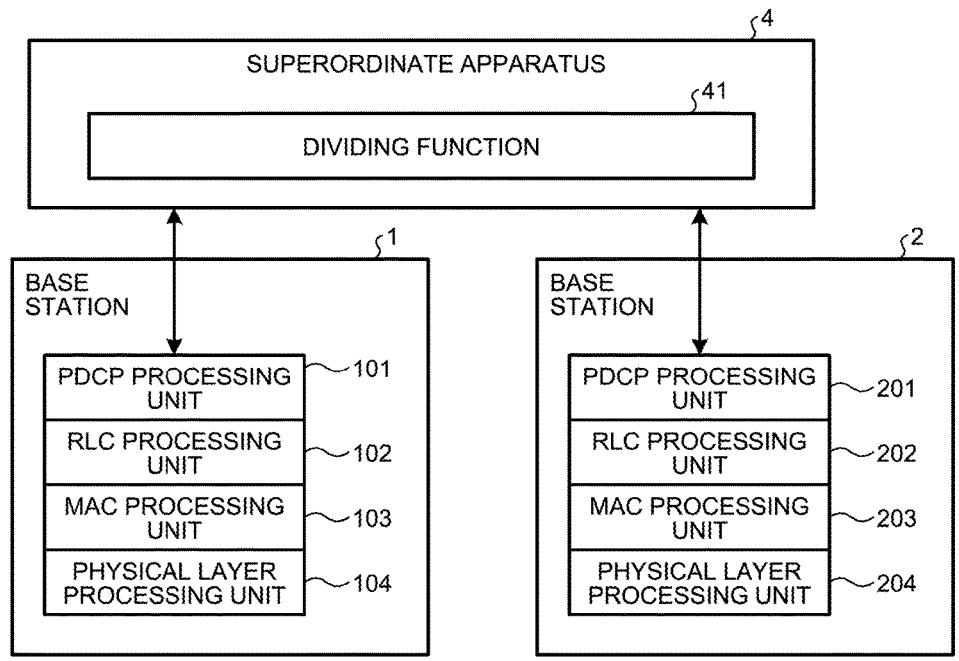
FIG. 26A is a diagram illustrating a configuration in which data is divided in a upper layer apparatus.

Further, it is also possible to vary the data transfer positions. For example, as illustrated in FIG. 26A, it is also possible to divide data in the upper layer apparatus 4 to the base stations 1 and 2, by using a dividing function 41, for example. FIG. 26A is a diagram illustrating a configuration in which data is divided in the upper layer apparatus. In other words, the upper layer apparatus 4 may include the dividing function 41 that divides the data into pieces to be output in downlink transfer and that concatenates together pieces of data received in uplink transfer, for the base station 1 using a licensed band and for the base station 2 using an unlicensed band. For example, when a conventional HeNB (femto) is used as the base station 2, no data transfer is performed between the base station 1 and the HeNB (the femto). In other words, for example, the S-GW serving as the upper layer apparatus 4 of the base stations 1 and 2 is different from the S-GW of the HeNB. In that situation, it is desirable to use the configuration illustrated in FIG. 26A.

Further, it is also possible to combine together two or more functions selected from among the functions corresponding to the layers in the base station 1 using a licensed band and the functions corresponding to the layers in the base station 2 using an unlicensed band.

Figure 26B:
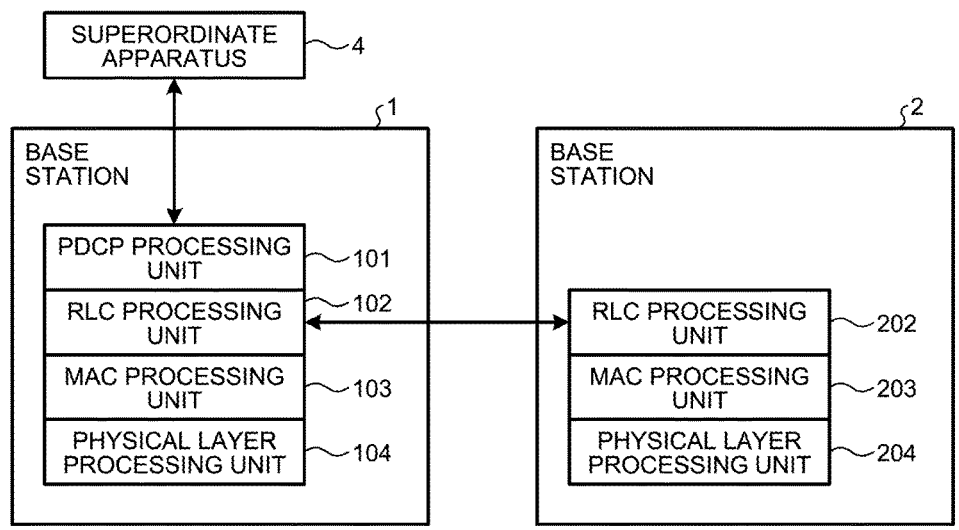
FIG. 26B is a diagram illustrating a configuration in which a Packet Data Convergence Protocol (PDCP) processing unit is used in common.

For example, when PDCP is used in common, it is possible to arrange the PDCP processing unit 101 to be used in common, as illustrated in FIG. 26B. FIG. 26B is a diagram illustrating a configuration in which the PDCP processing unit is used in common. When the PDCP is used in common, the data transfer is performed between the base station 1 and the base station 2, by using either RLC SDUs (PDCP PDUs) or RLC PDUs (PDCP SDUs). In that situation, the RLC processing units 102 and 202 each have a new RLC function to which a data transfer function has newly been added.

Figure 26C:
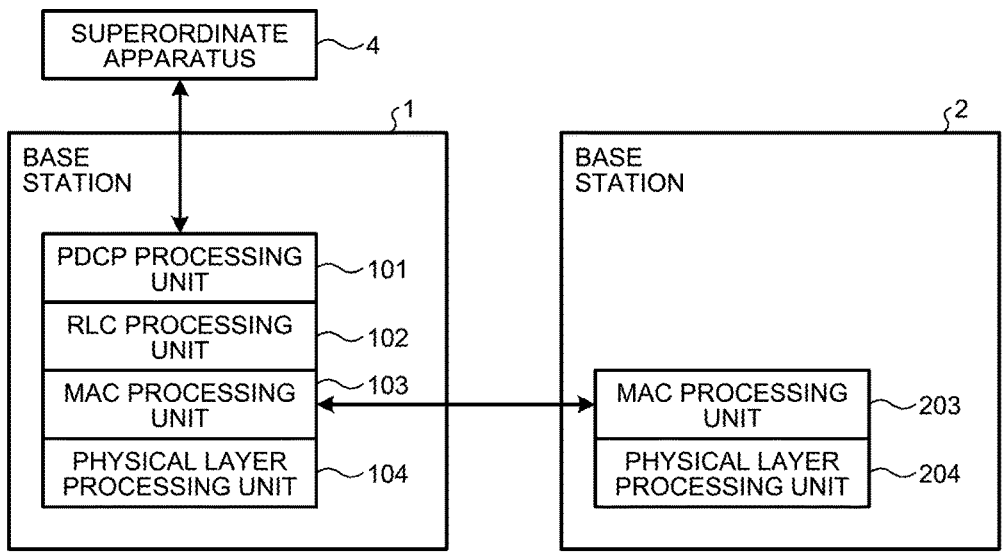
FIG. 26C is a diagram illustrating a configuration in which a PDCP processing unit and a Radio Link Control (RLC) processing unit are used in common.

Further, when PDCP and RLC are used in common, it is possible to arrange the PDCP processing unit 101 and the RLC processing unit 102 to be used in common, as illustrated in FIG. 26C. FIG. 26C is a diagram illustrating a configuration in which the PDCP processing unit and the RLC processing unit are used in common. When the PDCP and the RLC are used in common, the data transfer between the base station functions is performed by using either MAC SDUs (RLC PDUs) or MAC PDUs (RLC SDUs). In that situation, the MAC processing units 103 and 203 each have a new MAC function to which a data transfer function has newly been added.

Figure 26D:
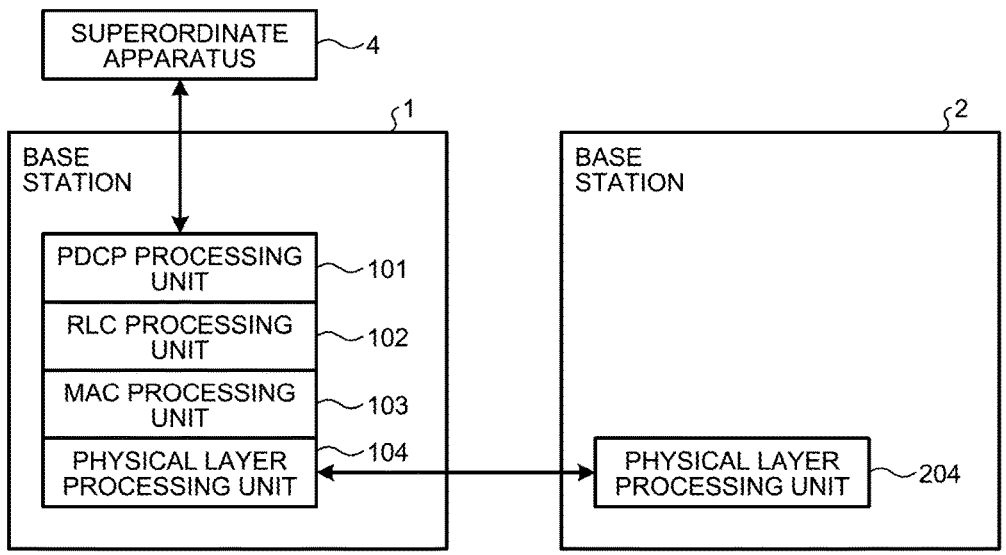
FIG. 26D is a diagram illustrating a configuration in which a PDCP processing unit, an RLC processing unit, and a Media Access Control (MAC) processing unit are used in common.

Further, when PDCP, RLC, and MAC are used in common, it is possible to arrange the PDCP processing unit 101, the RLC processing unit 102, and the MAC processing unit 103 to be used in common, as illustrated in FIG. 26D. FIG. 26D is a diagram illustrating a configuration in which the PDCP processing unit, the RLC processing unit, and the MAC processing unit are used in common. When PDCP, RLC, MAC are used in common, the data transfer between the base station functions is performed by using MAC PDUs. In that situation, the physical layer processing units 104 and 204 each have a new function to which a data transfer function has newly been added.

In these situations, when any of the configurations illustrated in FIGS. 26A to 26D is used, there is a high possibility that it may be impossible to re-send the data at conventional HARQ re-sending time intervals. Accordingly, it is desirable to implement new MAC that is different from the conventional MAC and that, in particular, exercises different HARQ control. Further, because the frequency being used is different and because Listen Before Talk (LBT) (CSMA/CA) is implemented, it is desirable to use a new physical layer that is different from the conventional physical layer.

Figure 27A:
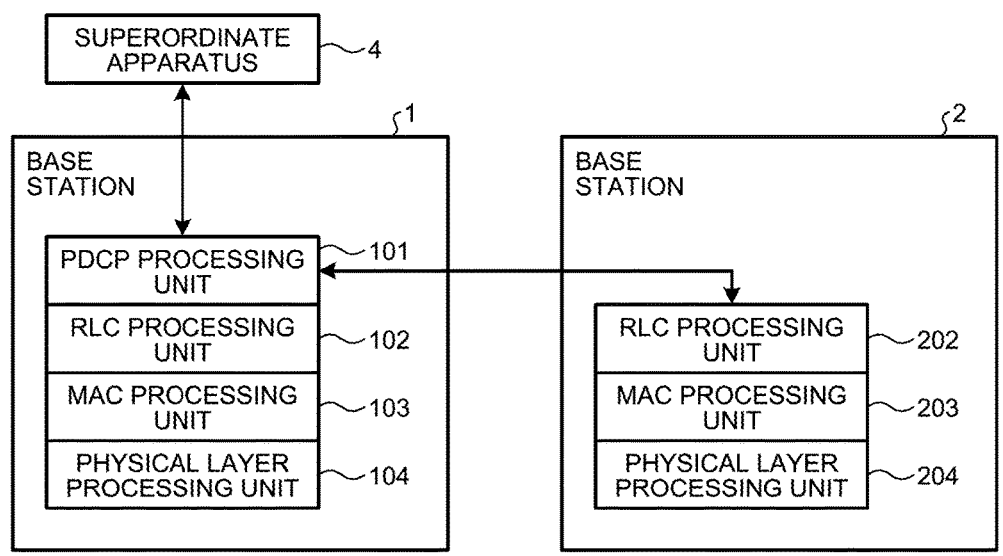
FIG. 27A is a diagram illustrating a configuration in which data is transferred from a PDCP processing unit of a base station using a licensed band to an RLC processing unit of a base station using an unlicensed band.

Further, as illustrated in FIG. 27A, it is also possible to transfer data from the PDCP processing unit 101 of the base station 1 using a licensed band to the RLC processing unit 202 of the base station 2 using an unlicensed band. FIG. 27A is a diagram illustrating a configuration in which data is transferred from the PDCP processing unit of the base station using a licensed band to the RLC processing unit of the base station using an unlicensed band. In this situation, the RLC processing unit 202 has a new RLC processing function that includes both the conventional PDCP processing function and the conventional RLC processing function.

Figure 27B:
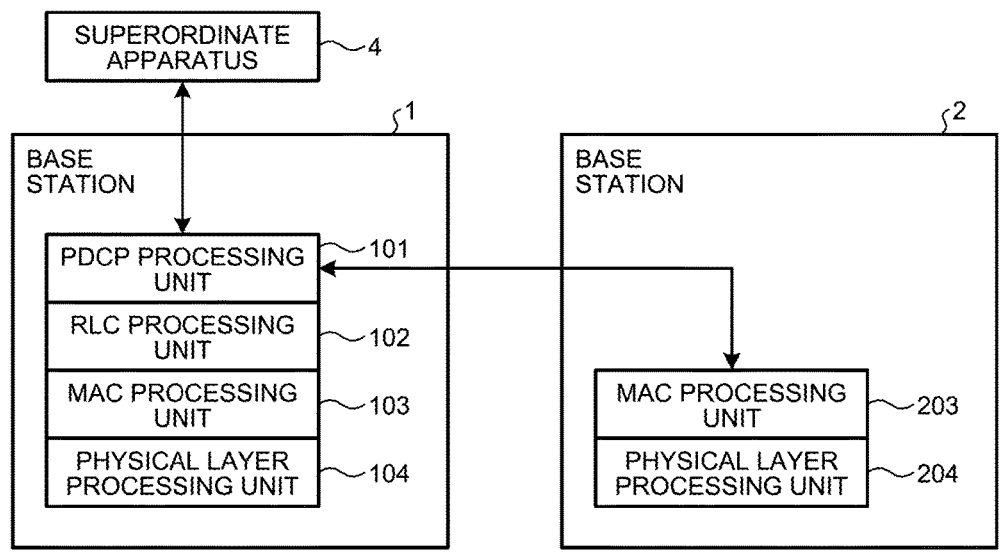
FIG. 27B is a diagram illustrating a configuration in which data is transferred from a PDCP processing unit of a base station using a licensed band to an MAC processing unit of a base station using an unlicensed band.

Further, as illustrated in FIG. 27B, it is also possible to transfer data from the PDCP processing unit 101 of the base station 1 using a licensed band to the MAC processing unit 203 of the base station 2 using an unlicensed band. FIG. 27B is a diagram illustrating a configuration in which data is transferred from the PDCP processing unit of the base station using a licensed band to the MAC processing unit of the base station using an unlicensed band. In this situation, the RLC processing unit 202 and the MAC processing unit 203 have a new RLC processing function and a new MAC processing function, respectively, that include all of the conventional PDCP processing functions, the conventional RLC processing functions, and the conventional MAC processing functions.

As explained above, by arranging a part of the functions of the base station using the licensed band and the functions of the base station using the unlicensed band to be used in common, it is possible to arrange the single base station to have a part of the functions of the base station using the licensed band and the functions of the base station using the unlicensed band. Consequently, it is possible to reduce the circuit scale of the base station and to decrease electric power consumption. Further, it is possible to make the base station compact. By making the base station compact, it is possible to reduce the installation cost of the base station.

Further, in the above description, the example is explained in which the base station 1 using a licensed band and the base station 2 using an unlicensed band are separate base stations. However, it is also possible, as illustrated in FIGS. 28A to 28D, to incorporate the function of performing communication by using an unlicensed band into one of the base stations (the base station 1, in the present example).

Figure 28A:
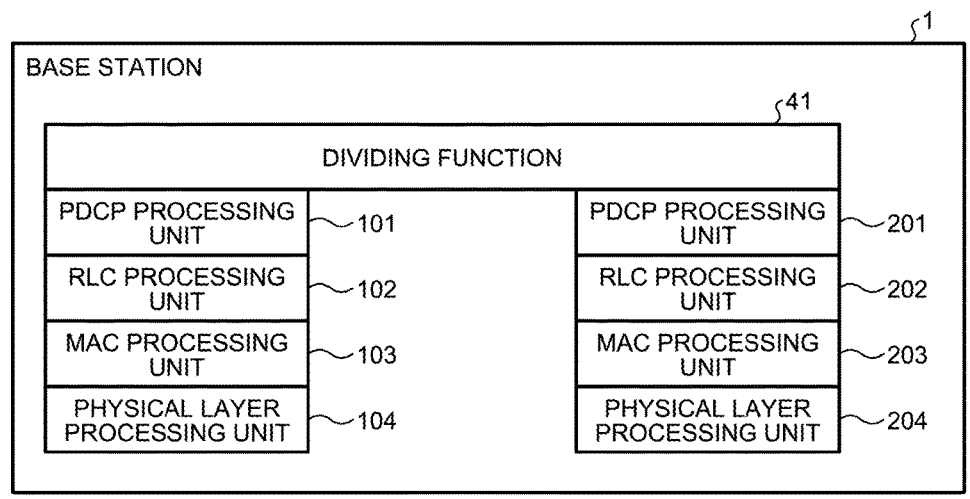
FIG. 28A is a diagram illustrating a configuration in which data is divided in a upper layer apparatus within one base station.
Figure 28B:
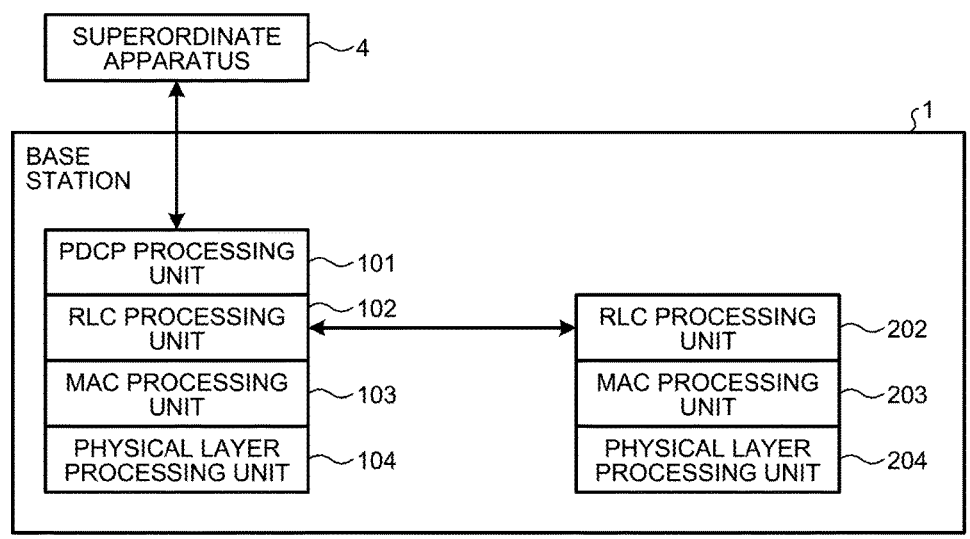
FIG. 28B is a diagram illustrating a configuration in which a PDCP processing unit is used in common within one base station.
Figure 28C:
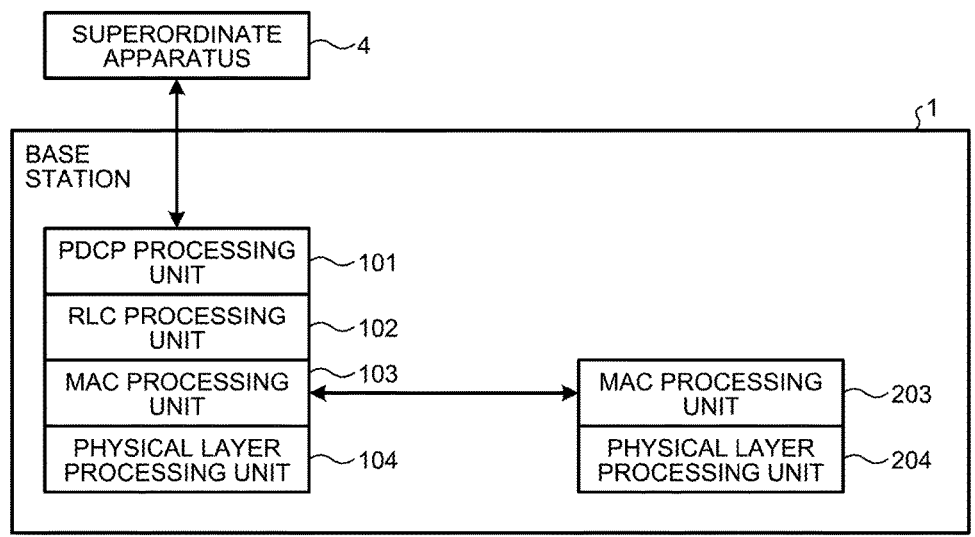
FIG. 28C is a diagram illustrating a configuration in which a PDCP processing unit and an RLC processing unit are used in common within one base station.

FIG. 28A is a diagram illustrating a configuration in which data is divided in a upper layer apparatus within one base station. FIG. 28B is a diagram illustrating a configuration in which a PDCP processing unit is used in common within one base station. FIG. 28C is a diagram illustrating a configuration in which a PDCP processing unit and an RLC processing unit are used in common within one base station.

Figure 28D:
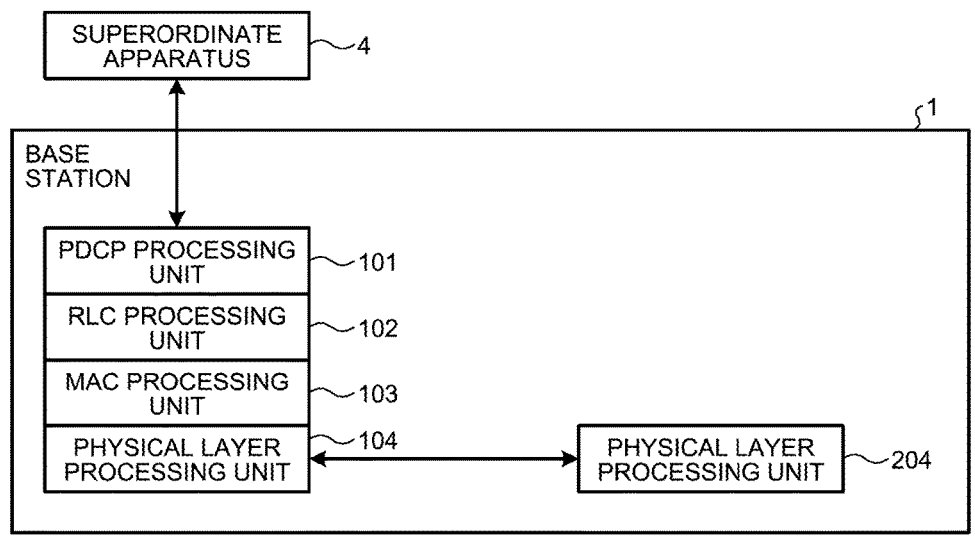
FIG. 28D is a diagram illustrating a configuration in which a PDCP processing unit, an RLC processing unit, and a MAC processing unit are used in common within one base station.

FIG. 28D is a diagram illustrating a configuration in which a PDCP processing unit, an RLC processing unit, and a MAC processing unit are used in common within one base station.

Further, when the functions of the base station using a licensed band and the functions of the base station using an unlicensed band are configured into separate apparatuses, wiring equipment such as an interface and an optical line to connect these apparatuses to each other would be provided. In contract, when a part of the functions of the base station using a licensed band and the functions of the base station using an unlicensed band are configured into one apparatus, there is no need to provide the interface or the wiring equipment. It is therefore possible to reduce the costs.

According to at least one aspect of the radio communication system, the base station, the communication terminal, and the radio communication system controlling method of the present disclosure, an advantageous effect is achieved where it is possible to perform communication while ensuring that an unlicensed band is used. Further, because it is possible to perform communication while ensuring that an unlicensed band is used, another advantageous effect is achieved where it is possible to realize a high-speed transfer. Further, it is possible to implement the carrier aggregation process while using the unlicensed band for the SCell. In addition, by using the unlicensed band, it is possible to increase the frequencies that are usable. It is therefore possible to improve the transfer speeds. Furthermore, it is possible to divide data of mutually the same service into pieces of data and to transmit the pieces of data from a base station and from a femto.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication system including a base station and a communication terminal, wherein
the base station comprises:
a first communicator that receives from the communication terminal a capability information of the communication terminal, the capability information including whether or not a first frequency is to be used for communication, the first frequency being used in either uplink communication or downlink communication; and
a controller that controls whether or not the first frequency is to be used for communication; wherein,
the first communicator that, when the first frequency is not to be used for the communication, performs communication by using a second frequency, that, when the first frequency is to be used for the communication, performs communication by using the first frequency and the second frequency at a same time; and that notifies, when the first frequency is to be used for the communication, the communication terminal of the first frequency, and the communication terminal comprises:
a second communicator that transmits to the base station the capability information; wherein,
the second communicator, when being notified of the first frequency by the notifying unit, performs communication by using the first frequency and the second frequency.

2. The radio communication system according to claim 1, wherein the first frequency is a frequency of which use is unlicensed, whereas the second frequency is a frequency of which use is licensed.

3. The radio communication system according to claim 1, wherein
the first communicator notifies the communication terminal of the first frequency by notifying the communication terminal of first identification information while using the second frequency, the first identification information indicating that the first frequency is a frequency to be used for communication to and from the base station, and
the second communicator, on a basis of the first identification information, performs communication by using the first frequency.

4. The radio communication system according to claim 1, wherein
the first communicator notifies the communication terminal of second identification information while using the second frequency, the second identification information indicating that the second frequency is a frequency to be used for communication to and from the base station, and
the second communicator, on a basis of the second identification information, performs communication by using the second frequency.

5. A base station comprising:
a first communicator that receives from a communication terminal a capability information of the communication terminal, the capability information including whether or not a first frequency is to be used for communication, the first frequency being used in either uplink communication or downlink communication; and
a controller that controls whether or not a first frequency is to be used for communication; wherein
the first communicator that, when the first frequency is to be used for the communication, performs communication by using the first frequency and a second frequency at a same time; and notifies, when the first frequency is to be used for the communication, a communication terminal that the first frequency is to be used.

6. A communication terminal comprising:
a communicator that transmits to a base station capability information of the communication terminal, the capability information including whether or not a first frequency is to be used for communication, the first frequency being used in either uplink communication or downlink communication; and performs communication by using the first frequency and a second frequency at a same time when being notified by a base station that a first frequency is to be used; and
a receiver that receives a notification that the first frequency is to be used for the communication from the base station.

* * * * *